US006992644B1

(12) United States Patent
Itaba et al.

(10) Patent No.: US 6,992,644 B1
(45) Date of Patent: Jan. 31, 2006

(54) PERIPHERAL DEVICE OF A PROGRAMMABLE CONTROLLER AND MONITORING METHOD OF THE PERIPHERAL DEVICE

(75) Inventors: Yusuke Itaba, Tokyo (JP); Kyoko Tanaka, Tokyo (JP); Toshihiko Kayukawa, Tokyo (JP); Tamaki Saburi, Tokyo (JP); Koichi Ishida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 536 days.

(21) Appl. No.: 09/712,175

(22) Filed: Nov. 15, 2000

Related U.S. Application Data

(63) Continuation of application No. PCT/JP98/02309, filed on May 27, 1998.

(51) Int. Cl.
G09G 5/00 (2006.01)

(52) U.S. Cl. .................. 345/1.1; 345/156; 715/803
(58) Field of Classification Search ............. 345/146, 345/156, 169, 172, 676, 810, 1.1, 3.1, 9, 345/803, 700, 717, 759, 763, 6; 715/803
See application file for complete search history.

(56) References Cited

U.S. PATENT DOCUMENTS

| | | | |
|---|---|---|---|
| 5,739,821 A | * | 4/1998 | Ho et al. .................. 345/807 |
| 6,163,318 A | * | 12/2000 | Fukuda et al. ............. 345/803 |
| 6,493,002 B1 | * | 12/2002 | Christensen ............... 345/779 |

FOREIGN PATENT DOCUMENTS

| JP | 57-60413 | | 4/1982 |
|---|---|---|---|
| JP | 61052749 | A | 3/1986 |
| JP | 02110627 | A | 4/1990 |
| JP | 7-64613 | | 3/1995 |
| JP | 07064613 | A | 3/1995 |

* cited by examiner

*Primary Examiner*—Ricardo Osorio
*Assistant Examiner*—Mansour M. Said
(74) *Attorney, Agent, or Firm*—Leydig, Voit & Mayer, Ltd.

(57) ABSTRACT

A conventional peripheral device of a programmable controller has a problem that the frequency of data communications between the PC and the peripheral device and between the peripheral device and a display increases and the updating rate of results of monitoring processes lowers so much as the number of programs for execution of monitoring processes increases.

In view of the above, according to the invention, there are provided display means on which a plurality of windows are displayed; input means for specifying an arbitrary one of the plurality of windows; and managing means for outputting, to a programmable controller that is to display a processing result of a monitoring process to the specified window, monitoring request data for execution of the monitoring process, and for receiving a processing result of the monitoring process that is based on the monitoring request data. A processing result of the monitoring process that is output from the programmable controller and input via the managing means is displayed in the window that was specified by the input means.

5 Claims, 44 Drawing Sheets

FIG.4

Ⅱ. PERIODS OF RESPECTIVE PROGRAM NAMES

| PROGRAM NAME | PERIOD [ms] |
|---|---|
|  |  |
|  |  |
|  |  |
|  |  |
|  |  |

Ⅰ. SETTING STATE

| SETTING STATE |
|---|

00: ORDINARY MONITORING
01: ACTIVE-ONLY MONITORING
02: MONITORING PERIOD SETTING
03: AUTOMATIC PERIOD SETTING
04: ACTIVE WINDOW PREFERENTIAL

FIG.10

II. PERIODS OF RESPECTIVE PROGRAM NAMES

| PROGRAM NAME | PERIOD [ms] |
|---|---|
| A | 10 |
| B | 20 |
| C | 50 |
| | |

I. SETTING STATE

| 02 |
|---|

00:ORDINARY MONITORING
01:ACTIVE-ONLY MONITORING
02:MONITORING PERIOD SETTING
03:AUTOMATIC PERIOD SETTING
04:ACTIVE WINDOW PREFERENTIAL

FIG.15

EXAMPLE OF DATA OF TOTAL MONITORING CONDITIONS IN AUTOMATIC PERIOD SETTING TYPE MONITORING

I. SETTING STATE

03

00:ORDINARY MONITORING
01:ACTIVE-ONLY MONITORING
02:MONITORING PERIOD SETTING
03:AUTOMATIC PERIOD SETTING
04:ACTIVE WINDOW PREFERENTIAL

II. PERIODS OF RESPECTIVE PROGRAM NAMES

| PROGRAM NAME | PERIOD [ms] |
|---|---|
| A | 10 |
| B | 20 |
| C | 50 |
| | |
| | |

III. REFERENCE MONITORING PERIOD TIME 10 ms

STATE OF ACTIVE STATE WATCHING DATA

| PROGRAM NAME | ACTIVE TIME | PRESENCE CONFIRMATION FLAG |
|---|---|---|
| A | 60 | 1 |
| B | 20 | 1 |
| C | 20 | 1 |

MONITORING PERIOD OF WINDOW HAVING LONGER ACTIVE TIME IS SHORTENED.

ACTIVE TIMES OF RESPECTIVE PROGRAMS:

PROGRAM A:60 %
PROGRAM B:20 %
PROGRAM C:20 %

FIG.22

EXAMPLE OF DATA OF TOTAL MONITORING CONDITIONS IN ACTIVE-WINDOW-PREFERENTIAL MONITORING

I. SETTING STATE

04

00:ORDINARY MONITORING
01:ACTIVE-ONLY MONITORING
02:MONITORING PERIOD SETTING
03:AUTOMATIC PERIOD SETTING
04:ACTIVE WINDOW PREFERENTIAL

II. PERIODS OF RESPECTIVE PROGRAM NAMES

| PROGRAM NAME | PERIOD [ms] |
|---|---|
| A | 10 |
| B | 50 |
| C | 50 |
| | |
| | |

III. ACTIVE-WINDOW-PREFERENTIAL MONITORING PERIODS

| ACTIVE MONITORING TIME | IN ACTIVE MONITORING TIME |
|---|---|
| 10 | 50 |

IMAGE DIAGRAM OF CHARACTER MEMORY

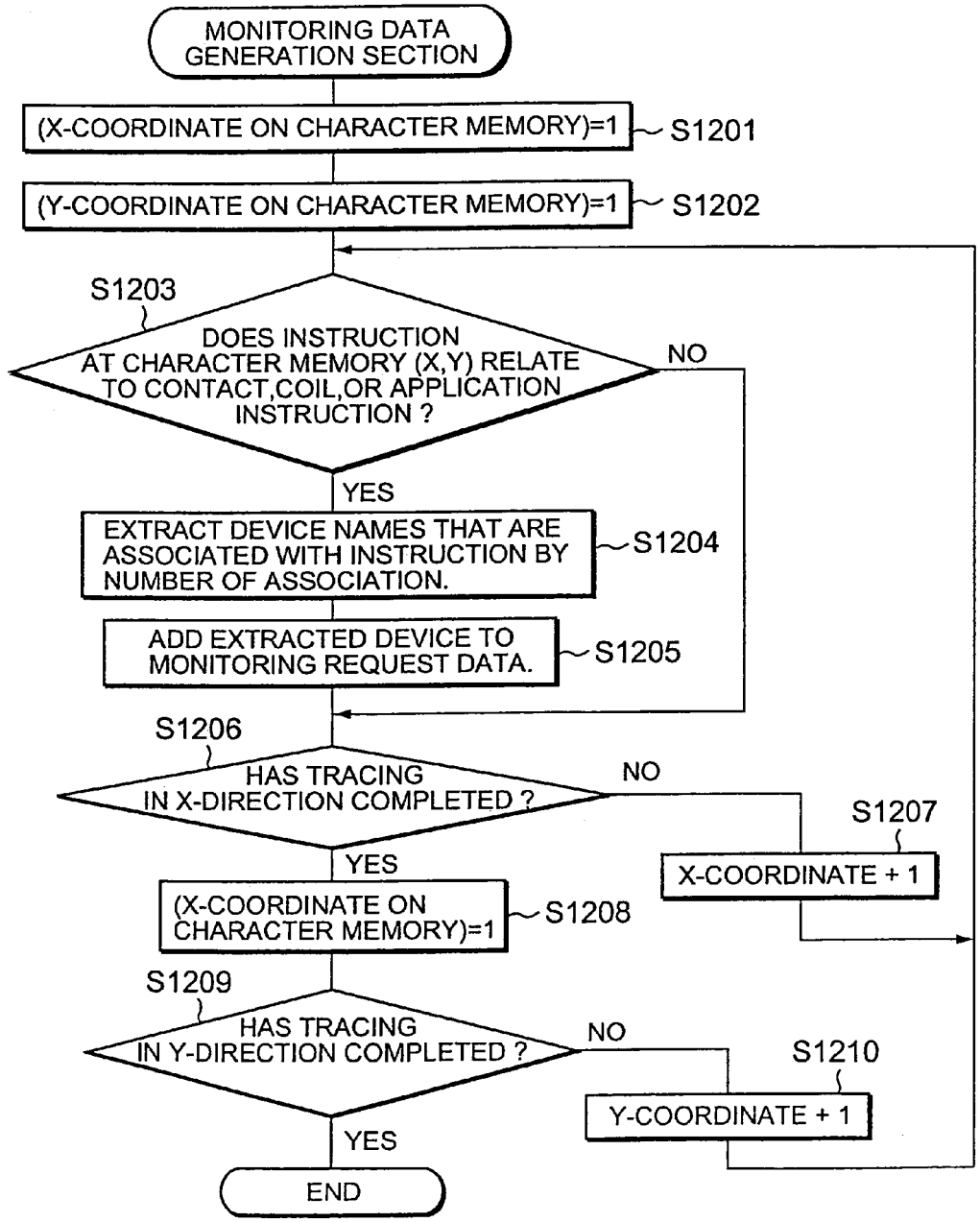

PERIPHERAL DEVICE OF A PROGRAMMABLE CONTROLLER AND MONITORING METHOD OF THE PERIPHERAL DEVICE

TECHNICAL FIELD

The present invention relates to a peripheral device of a programmable controller. In particular, the invention relates to a peripheral device of a programmable controller in which the updating rate of a monitoring result that is displayed on its display is high, as well as to a monitoring method of the peripheral device.

BACKGROUND OF THE INVENTION

FIG. 37 shows an exemplary peripheral device of a programmable controller (hereinafter referred to as "PC").

FIG. 37 is a configuration diagram showing the configuration of a conventional peripheral device of a PC.

In FIG. 37, numeral 1 denotes a PC. Numeral 2 denotes a PC interface (hereinafter referred to as "i/F") section, which is connected to the PC 1. The PC i/F section 2 performs data exchange with the PC 1. Numeral 3 denotes a program transfer control section, which is connected to the PC i/F section 2. Numeral 4 denotes a program storage section, which is connected to the program transfer control section 3. Numeral 5 denotes an auxiliary storage i/F section, which is connected to the program transfer control section 3. Numeral 6 denotes an auxiliary storage device, which is connected to the auxiliary storage i/F section 5.

Numeral 7 denotes a window management section, which is connected to the program transfer control section 3 and the program storage section 4. The window management section 7 manages and controls windows that are displayed on a display 9. Numeral 8 denotes an operator i/F, which is connected to the window management section 7. Numeral 9 denotes the display, which is connected to the operator i/F 8. Numeral 10 denotes a mouse, which is connected to the operator i/F 8 and receives an input from an operator. Numeral 11 denotes a keyboard, which is connected to the operator i/F 8 and receives an input from an operator. A program for execution of a monitoring process and data in a character memory corresponding to the program are edited by an operator's manipulating the mouse 10 and the keyboard 11.

Numeral 12 denotes a program monitoring section, which is connected to the PC i/F section 2 and the window management section 7. The program monitoring section 12 extracts data relating to monitoring items from a character memory generation section 13. Further, the program monitoring section 12 causes a window on the display 9 to reflect a monitoring result that is acquired from the PC 1 via the PC i/F section 2. Numeral 13 denotes the character memory generation section, which is connected to the program monitoring section 12 and the program storage section 4. The character memory generation section 13 generates, in a character memory, character data to be used for displaying, as a ladder diagram, an execution status of a monitoring process according to programs stored in the program storage section 4 and the auxiliary storage device 6.

Numeral 14 denotes a program editing section, which is connected to the character memory generation section 13 and the program storage section 4. Numeral 15 denotes a window display control section, which is connected to the window management section 7, the program monitoring section 12, the character memory generation section 13, and the program editing section 14. Numeral 16 denotes a program monitoring window section, which has, for each arbitrary program stored in the program storage section 4, the program monitoring section 12, the character memory generation section 13, the program editing section 14, and the window display control section 15.

Numeral 17 denotes a peripheral device of the PC 1, which has the PC i/F section 2, the program transfer control section 3, the auxiliary storage device i/F section 5, the auxiliary storage device 6, the program storage section 4, the window management section 7, the operator i/F section 9, the program monitoring window section 16, the display 9, the mouse 10, and the keyboard 11. The peripheral device 17 of the PC 1 may have a plurality of program monitoring window sections 16.

Next, referring to FIG. 38, a description will be made of a display example a window display that is based on character data that is generated in the character memory of the conventional peripheral device of a PC. The character memory is part of the character memory generation section 13. Window display based on character data is performed on the display 9.

FIG. 38 shows a display example of window display that is based on character data.

In this display example of window display that is based on character data, n-row/m-column divisional regions are displayed.

Next, the data structure of character data will be described with reference to FIG. 39.

FIG. 39 is a structure diagram showing the data structure of character data.

In this data structure of character data, a total-number-of-rows data portion and row data portions of a number that is based on the number of rows recorded in the total-number-of-rows data portion are arranged in prescribed order. The data structure of each row data portion is such that a total-number-of-columns data portion and character memory data portions of a number that is based on the number of columns recorded in the total-number-of-columns data portion are arranged a prescribed order.

Next, the data structure of one character memory data to be recorded in a character memory data portion will be described with reference to FIG. 40.

FIG. 40 is a structure diagram showing the data structure of one character memory data to be recorded in each character memory data portion.

One character memory data consists of four portions: a branching symbol, a circuit symbol, an address, and an instruction code, recorded in each constituent portion a prescribed order.

Next, another display example of window display that is based on character data generated in the character memory of the conventional peripheral device of a PC will be described with reference to FIG. 41.

FIG. 41 shows another display example of window display that is based on character data.

Data relating to a window display to be made on the display 9 is generated in the character memory of the character memory generation section 13. A window display is made on the display 9 in such a manner that the window display control section 15 performs control based on the character data generated on the character memory of the character memory generation section 13.

An example of a window display to be made on the display 9 is a ladder diagram as shown in FIG. 41. Differences in output results of respective circuit symbols (X0 to X70, etc.) shown in FIG. 41 occur one after another according to a monitoring process that is based on a prescribed program. The monitoring process according to a prescribed program is executed by the PC 1. The program monitoring section 12 is activated every predetermined period by the window management section 7. The monitoring process according to a program is executed based on activation of the program monitoring section 12 by the window management section 7.

An operation for displaying a ladder diagram as shown in FIG. 41 on the display 9 will be described below with reference to FIGS. 42 to 45.

FIG. 42 is a flowchart showing a control operation of the conventional peripheral device of a PC that is performed by the program monitoring section 12 of the conventional peripheral device of a PC.

At step (hereinafter referred to as "S") 1101, the program monitoring section 12 checks whether monitoring request data has been generated. If monitoring request data has been generated, the process goes to S1102. If no monitoring request data has been generated, the process goes to S1103.

At S1102, the program monitoring section 12 checks whether the character data has been altered. If the character data has been altered, the process goes to S1103. If the character data has not been altered, the process goes to S1105.

At S1103, the program monitoring section 12 generates monitoring request data. After completion of S1103, the process goes to S1104.

At S1104, the program monitoring section 12 transfers, to the PC 1, the monitoring request data that was generated at S1103. The monitoring request data that has been transferred to the PC 1 is registered in the PC 1. After completion of S1104, the process goes to S1105.

At S1105, the program monitoring section 12 transfers a monitoring request to the PC 1. The above monitoring request data is to register, in the PC 1, items to be monitored. On the other hand, the monitoring request is to order execution of the monitoring that relates to the items registered by using the monitoring request data. Once monitoring items are registered in the PC 1 by using monitoring request data, no monitoring request data is used again unless character data is altered in connection with, for example, alteration of monitoring items.

At S1106, the program monitoring section 12 waits for an event that monitoring result data, corresponding to the monitoring request that was transferred from the program monitoring section 12 to the PC 1 at S1105, is output from the PC 1 and input to the program monitoring section 12. If monitoring result data is input to the program monitoring section 12, the process goes to S1107. If it is not input, the program monitoring section 12 continues to wait for an input.

At S1107, the program monitoring section 12 causes, via the window display control section 15, the display 9 to reflect the monitoring result data while referring to the received monitoring result data and the character data.

The left part of FIG. 43 shows the structure of monitoring request data to be checked by the program monitoring section 12 at S1101. The left part of FIG. 43 is a structure diagram showing the data structure of monitoring request data. The monitoring request data includes a header portion, a number-of-monitoring-request-points portion, and individual device portions showing respective device locations that are based on the number of monitoring points that is recorded in the number-of-monitoring-request-points portion, arranged in a prescribed order. The header portion of the monitoring request data designates the PC 1 that executes the monitoring process, as well as a data packet type of the monitoring request data. The number-of-monitoring-request-points portion specifies the number of monitoring locations to be monitored. Each individual device portion designates a device name indicating a monitor location to be monitored.

The right part of FIG. 43 shows the structure of monitoring result data to be checked by the program monitoring section 12 at S1106. The right part of FIG. 43 is a structure diagram showing the data structure of monitoring result data. The monitoring result data includes a header portion, a number-of-monitoring-result-points portion, and individual device result portions showing individual device results at respective device locations that are based on the number of monitoring result points that is recorded in the number-of-monitoring-result-points portion, arranged in a prescribed order. The header portion of the monitoring result data specifies the PC 1 that has executed the monitoring process. The number-of-monitoring-result-points portion specifies the number of monitoring locations that have been monitored. Monitoring result data of each monitoring location that has been monitored is recorded in each individual device result portion in a prescribed data size.

Next, the left part of FIG. 44 shows a specific example of monitoring request data that is output from the program monitoring section 12 to the PC 1 to display a ladder diagram shown in FIG. 41 on the display 9. The right part of FIG. 44 shows a specific example of monitoring result data that is output from the PC 1 to the program monitoring section 12 in response to the monitoring request data shown in the left part of FIG. 44. FIG. 44 is a structure diagram showing a specific data structure of monitoring request data that is output from the program monitoring section 12 to the PC 1 and a specific data structure of monitoring result data that is output from the PC 1 to the program monitoring section 12.

Next, a monitoring request data generation process that is executed at S1103 in FIG. 42 will be described with reference to FIG. 45. FIG. 45 is a flowchart showing a monitoring request data generation process.

First, at S1201, the program monitoring section 12 initializes, to "1," an X counter that indicates an X-coordinate position in a window display that is based on character data. This initialization can render the program monitoring section 12 in a state that it can recognize, for example, the left-end position of the window display that is based on the character data. After completion of S1201, the process goes to S1202.

At S1202, the program monitoring section 12 initializes, at "1," a Y counter that indicates a Y-coordinate position of the window display that is based on the character data. This initialization can render the program monitoring section 12 in a state that it can recognize, for example, the top position of the window display that is based on the character data. After completion of S1202, the process goes to S1203.

At S1203, the program monitoring section 12 starts tracing in which checks are made in increasing order of the X-coordinate of the window display that is based on the character data.

The tracing means checks whether an instruction relating to an input/output device or an internal variable is set as an instruction at an arbitrary position, indicated by the X counter and the Y counter, of the window display that is based on the character data.

Examples of the input/output device are a contact, a coil indicating an output result, and an application instruction for manipulating data.

If an instruction relating to an input/output device or an internal variable is set as an instruction at the traced position, the process goes to S1204. If not, the process goes to S1206.

That is, if no instruction relating to an input/output device or an internal variable is set as an instruction at the traced position, no setting is made of monitoring request data.

At S1204, the program monitoring section 12 extracts the input/output device name or the internal variable name that is set in the instruction that was found at S1203. After completion of S1204, the process goes to S1205.

At S1205, the program monitoring section 12 sets, in the monitor request data, the input/output device name or the internal variable name that was extracted at S1204. After completion of S1205, the process goes to S1206.

At S1206, the program monitoring section 12 judges whether tracing of the X-coordinate end position for the prescribed Y-coordinate has finished. If the X-coordinate end position for the prescribed Y-coordinate has finished, the process goes to S1208. If the tracing of the end position has not been traced yet, the process goes to S1207.

At S1207, the program monitoring section 12 adds 1 to the X counter. The process then returns to step S1203 to trace the next position of the window display that is based on the character data.

At S1208, the program monitoring section 12 initializes the X counter to "1." The process then goes to S1209.

At S1209, the program monitoring section 12 judges whether tracing of the Y-coordinate end position has finished. If the tracing of the Y-coordinate end position has finished, the execution of the series of steps is finished. If the tracing of the Y-coordinate end position has not finished yet, the process goes to S1210.

At S1210, the program monitoring section 12 adds 1 to the Y counter. The process then returns to S1203 to trace the next position of the window display that is based on the character data.

Another conventional example is a programming device of a programmable controller that is disclosed in Japanese Patent Laid-Open No. Hei. 5-241619. In the programming device of a programmable controller that is disclosed in this patent publication, execution results of programs obtained by execution of the programs by a plurality of programmable controllers are uniformly monitored by using one display device. The monitoring is performed on all contacts that are displayed on the display device.

A further conventional example is an input/output signal monitoring scheme of a PC that is disclosed in Japanese Patent Laid-Open No. Hei. 5-81205. In the input/output signal monitoring scheme of a PC that is disclosed in this publication, sampling periods are set for respective input/output signals of the PC and a high-rate monitoring process and a low-rate monitoring process are executed in accordance with the sampling periods of the input/output signals.

As described above, in the conventional peripheral devices of a programmable controller, when plural processing results of monitoring processes according to arbitrary programs are monitored by using a display of the peripheral device, all monitoring results are updated uniformly.

This results in a problem that the frequency of data communications between the PC and the peripheral device and between the peripheral device and the display increases and the updating rate of results of monitoring processes declines as the number of programs for execution of monitoring processes increases.

DISCLOSURE OF THE INVENTION

The present invention has been made to solve the above problem, and an object of the invention is therefore to provide a peripheral device of a programmable controller which reduces the frequency of data communication between the PC and the peripheral device and between the peripheral device and a display and increases the updating rate of results of monitoring processes.

A peripheral device of a programmable controller according to the invention comprises display means on which a plurality of windows are displayed; and managing means for outputting, to programmable controllers corresponding to the windows, processing requests that request execution of monitoring processes in the programmable controllers, and for outputting, when receiving a processing result of the monitoring processes in the programmable controllers that are based on the processing requests, the received processing result to the windows, wherein the processing requests are output at output periods that are different for the respective programmable controllers corresponding to the respective windows.

The peripheral device of a programmable controller according to the invention comprises input means in which the output periods of the processing requests that are output from the managing means are set for the respective programmable controllers corresponding to the respective windows, wherein the managing means outputs the processing requests to the programmable controllers based on the output periods that have been set in the input means.

The peripheral device of a programmable controller according to the invention comprises input means for selecting an arbitrary window from the plurality of windows, wherein the managing means outputs a processing request to only a programmable controller corresponding to the selected window.

The peripheral device of a programmable controller according to the invention comprises input means for selecting an arbitrary window from the plurality of windows, wherein the managing means switches the output period of the processing request that is output to the programmable controller in accordance with whether the programmable controller corresponds to the window that has been selected by the input means.

The peripheral device of a programmable controller according to the invention is such that an output period of a processing request that is output to a programmable controller corresponding to the window that has been selected by the input means is shorter than an output period of a processing request that is output to a programmable controller corresponding to a window that has not been selected.

The peripheral device of a programmable controller according to the invention comprises input means for selecting an arbitrary window from the plurality of windows; and a timer for measuring, for each of the plurality of windows, a time during which the arbitrary window is selected by the input means, wherein the managing means outputs the processing requests to the respective programmable controllers corresponding to the respective windows at output periods that are based on the times that have been measured by the timer.

The peripheral device of a programmable controller according to the invention is such that the output period of the processing request that is output to the programmable controller corresponding to the arbitrary window is obtained by selecting a maximum value from the times during which the respective windows have been selected by the input means and that have been calculated by the timer, dividing the selected maximum value by the time of the arbitrary window, and multiplying a resulting quotient by a reference period that is input through the input means.

Another peripheral device of a programmable controller according to the invention comprises display means on which a window is displayed; input means for specifying an arbitrary portion of the window; and managing means for outputting, to a programmable controller corresponding to the window, a processing request that requests the programmable controller to execute a monitoring process relating to only the specified portion of the window, and for outputting, when receiving a processing result of the monitoring process in the programmable controller that is based on the processing request and relates to only the specified portion of the window, the received processing result to the window.

The peripheral device of a programmable controller according to the invention is such that the specified portion of the window is a portion where an output result is indicated.

The peripheral device of a programmable controller according to the invention is such that the processing results of the monitoring processes in the programmable controllers that are output to the windows are updated at updating periods that are different for the respective programmable controllers based on the output periods of the processing requests that were output from the managing means to the programmable controllers.

A monitoring method of a peripheral device of a programmable controller according to the invention comprises a first step of outputting processing requests that request execution of monitoring processes in programmable controllers corresponding to respective windows being displayed on display means to the programmable controllers at output periods that are different for the respective programmable controllers; a second step of receiving, based on the output periods, processing results of the monitoring processes in the programmable controllers that are based on the processing requests; and a third step of outputting the received processing results to the windows.

The monitoring method of a peripheral device of a programmable controller according to the invention comprises a fourth step of setting, with input means, the output periods of the processing requests for the respective programmable controllers corresponding to the respective windows, wherein the first step outputs the processing requests based on the output periods that have been set with the input means.

The monitoring method of a peripheral device of a programmable controller according to the invention comprises a fourth step of selecting, with input means, an arbitrary window from the plurality of windows, wherein the first step outputs a processing request to only a programmable controller corresponding to the selected window.

The monitoring method of a peripheral device of a programmable controller according to the invention comprises a fourth step of selecting, with input means, an arbitrary window from the plurality of windows, wherein the first step outputs the processing requests while switching the output period of the processing request that is output to the programmable controller in accordance with whether the programmable controller corresponds to the window that has been selected with the input means.

The monitoring method of a peripheral device of a programmable controller according to the invention comprises a fourth step of selecting, with input means, an arbitrary window from the plurality of windows; and a fifth step of measuring and accumulating, with a timer, for each of the plurality of windows, a time during which the arbitrary window is selected with the input means, wherein the first step outputs the processing requests at output periods that are based on the times that have been measured with the timer.

The monitoring method of a peripheral device of a programmable controller according to the invention comprises a fourth step of specifying, with input means, an arbitrary portion of a window, wherein the first step outputs a processing request that requests a programmable controller corresponding to the window having the specified portion to execute a monitoring process relating to the specified portion.

BRIEF DESCRIPTION OF THE DRAWINGS

FIG. 4(I) is a conceptual chart showing a setting state table that is held by a whole monitoring conditions storage section 22 of the PC peripheral device according to the invention, and FIG. 4(II) is a conceptual chart showing a table of periods of respective program names that is held by the whole monitoring conditions storage section 22 according to the invention;

FIG. 10 shows an example of recording in a table of periods of respective program names and a setting state table that are held by the whole monitoring conditions storage section in a case where an operator has selected a set period monitoring process and has set arbitrary monitoring periods in the PC peripheral device according to the invention;

FIG. 15 shows an example of recording in the table of periods of respective program names, the setting state table, and the reference monitoring period time table that are held by the whole monitoring conditions storage section in a case where an operator has selected the automatic period setting type monitoring process and has set an arbitrary reference monitoring period in the PC peripheral device according to the invention;

FIG. 22 shows an example of recording in the table of periods of respective program names, the setting state table, and an active-window-preferential monitoring period table in a case where an operator has selected the active-window-preferential monitoring process and has set various monitoring periods in the PC peripheral device according to the invention;

FIG. 45 is a flowchart showing a monitoring request data generation process in the program monitoring section of the conventional PC peripheral device.

BEST MODE FOR CARRYING OUT THE INVENTION

Next, an embodiment of the present invention will be hereinafter described.

Figure 1:
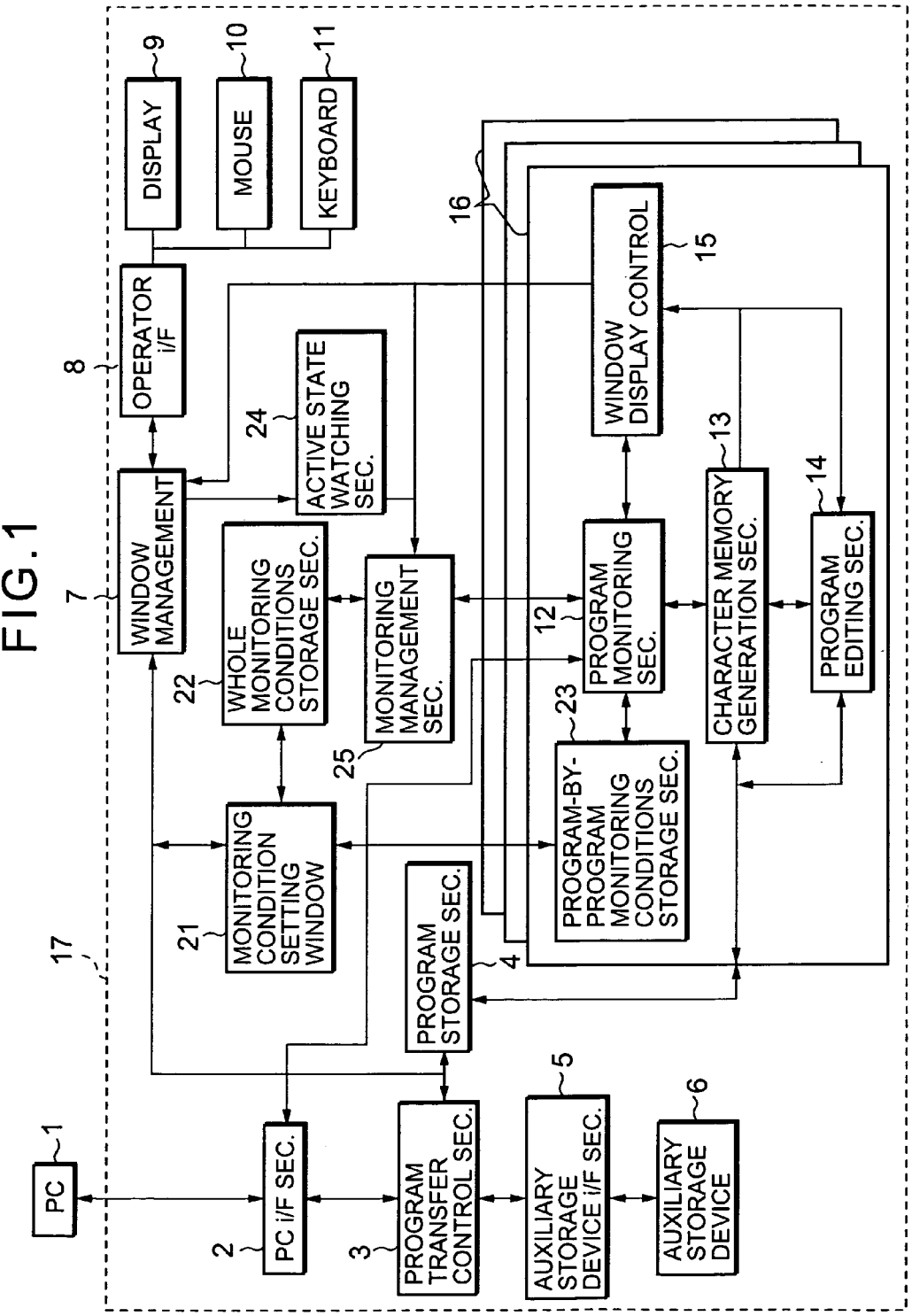
FIG. 1 is a configuration diagram showing the configuration of a PC peripheral device according to the invention.

The embodiment of a peripheral device of a PC according to the invention will be described with reference to FIG. 1. FIG. 1 is a configuration diagram showing the configuration of the peripheral device of a PC according to the embodiment.

In FIG. 1, numeral 21 denotes a monitoring condition setting window section, which is connected to a program transfer control section 3, a program storage section 4, and a window management section 7. Numeral 22 denotes a whole monitoring conditions storage section, which is connected to the monitoring condition setting window section 21. Numeral 23 denotes a program-by-program monitoring conditions storage section, which is connected to the monitoring condition setting window section 21.

Numeral 24 denotes an active state watching section, which is connected to the window management section 7. The active state watching section 24 checks, based on window-active-state-related information that is acquired from the window management section 7, the window of which program is active. Numeral 25 denotes a monitoring management section, which is connected to the window management section 7, the whole monitoring conditions storage section 22, and the active state watching section 24. The monitoring management section 25 activates the program monitoring section 26 of each program based on setting contents of the whole monitoring conditions storage section 22, watching data that is held by the active state watching section 24, and the window-active-state-related information that is obtained from the window management section 7.

Numeral 26 denotes the program monitoring section, which is connected to the program-by-program monitoring conditions storage section 23 and the monitoring management section 25. The program monitoring section 26 extracts data relating to items to be monitored from a character memory generation section 13. The extraction of data from the character memory generation section 13 is performed by the program monitoring section 26 in response to an instruction sent from the monitoring management section 25. Data that is extracted from the character memory generation section 13 conforms to the storage contents of the program-by-program monitoring conditions storage section 23. Further, the program monitoring section 26 causes a window on the display 9 to reflect a monitoring result that is acquired from a PC 1.

The program-by-program monitoring conditions storage section 23 and the program monitoring section 26 are provided in each program monitoring window section 16. A peripheral device 17 serves to develop a program for causing the PC 1 to operate, as well as to obtain monitoring results of a monitoring process according to the program.

Further, the peripheral device 17 serves to debug a developed program. A plurality of windows can be displayed on a display of the peripheral device 17 to perform, through the windows on the display, development of a program, output of monitoring results, debugging, etc.

Figure 37:
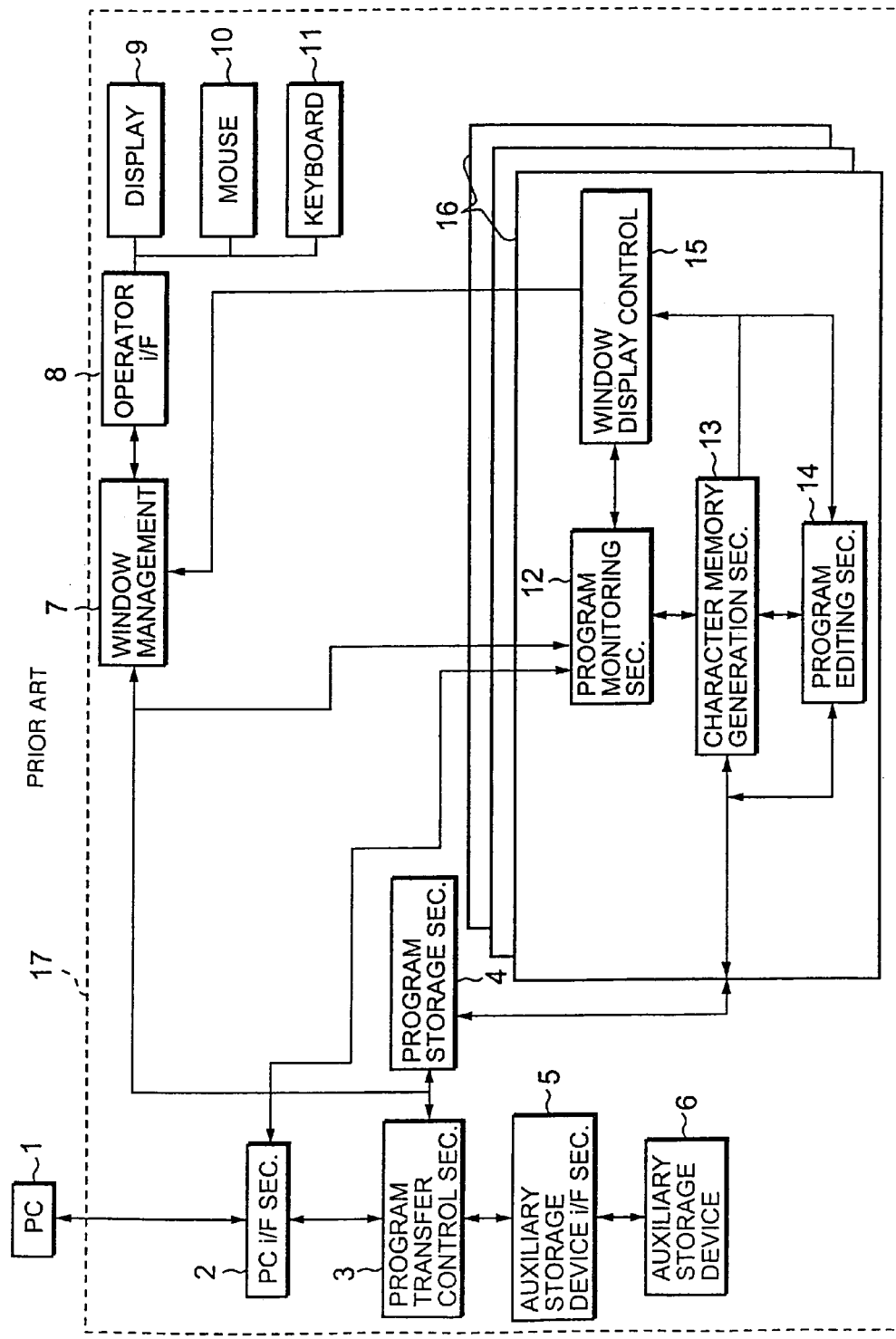
FIG. 37 is a configuration diagram showing the configuration of a conventional peripheral device of a PC.
Figure 38:
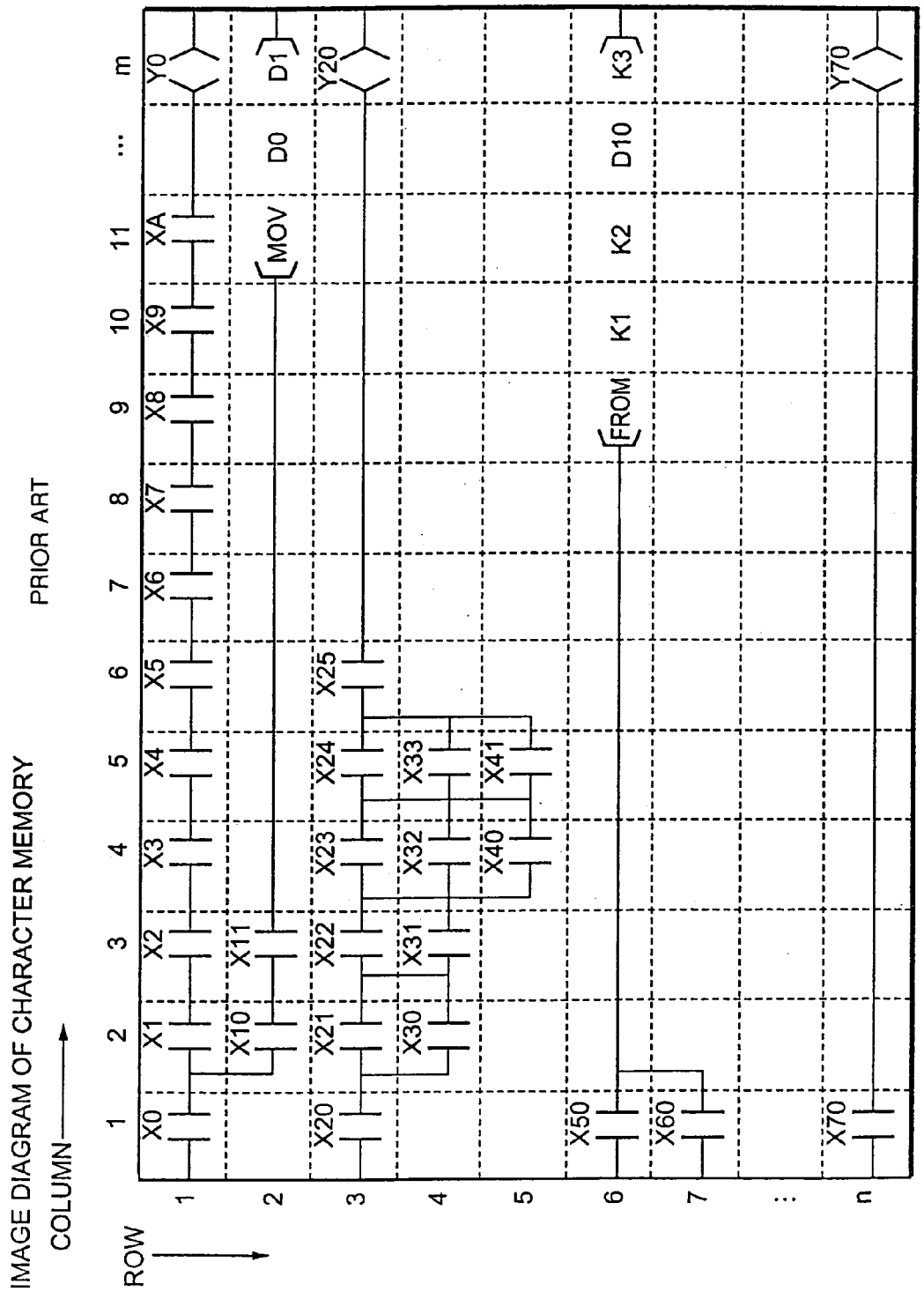
FIG. 38 shows a display example of window display that is based on character data in the conventional PC peripheral device.
Figure 39:
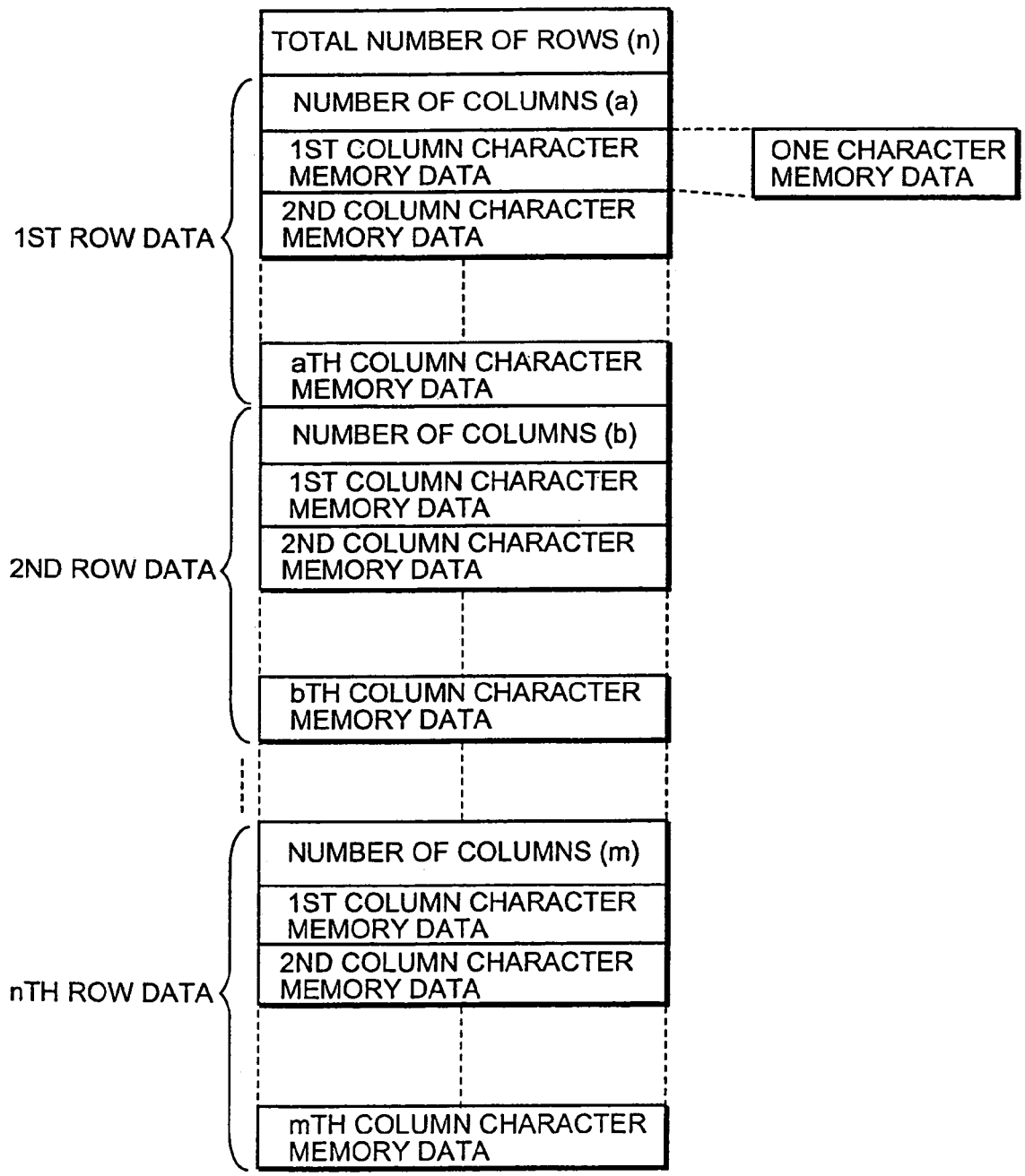
FIG. 39 is a structure diagram showing the data structure of character data in the conventional PC peripheral device.
Figure 40:
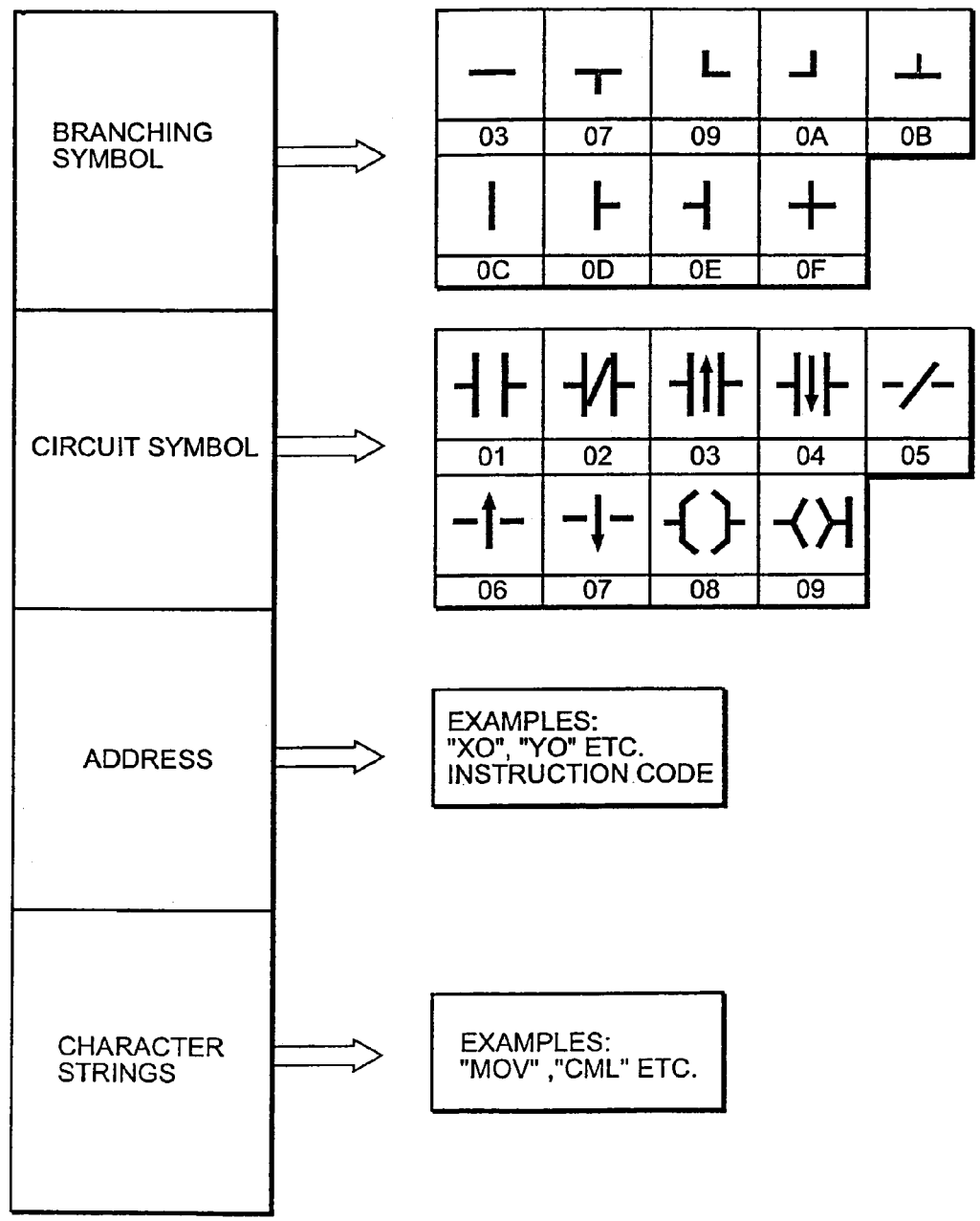
FIG. 40 is a structure diagram showing the data structure of one character memory data to be recorded in a character memory data portion of character data in the conventional PC peripheral device.
Figure 41:
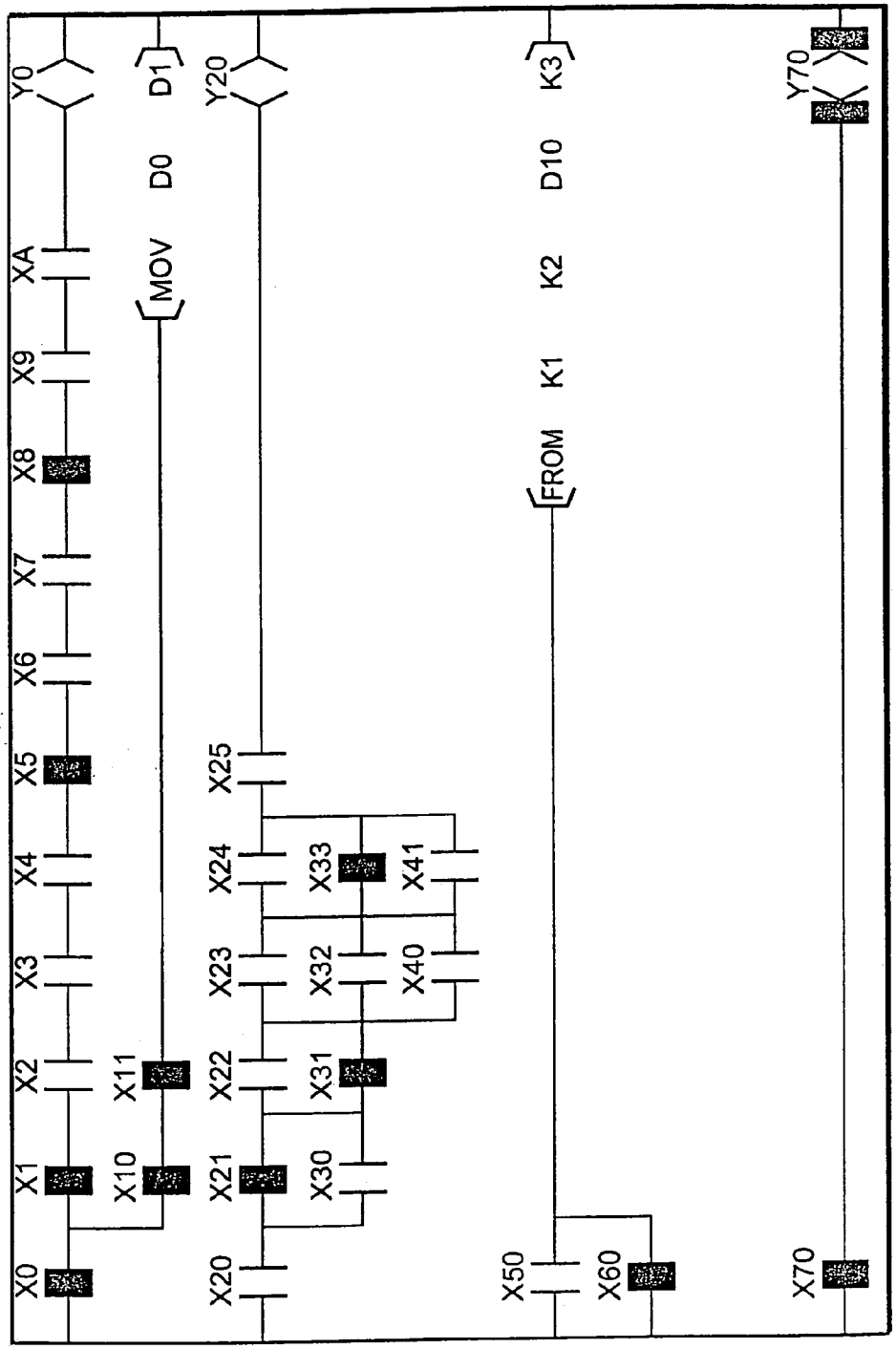
FIG. 41 shows another display example of window display that is based on character data and that is displayed on a display of the conventional PC peripheral device.
Figure 42:
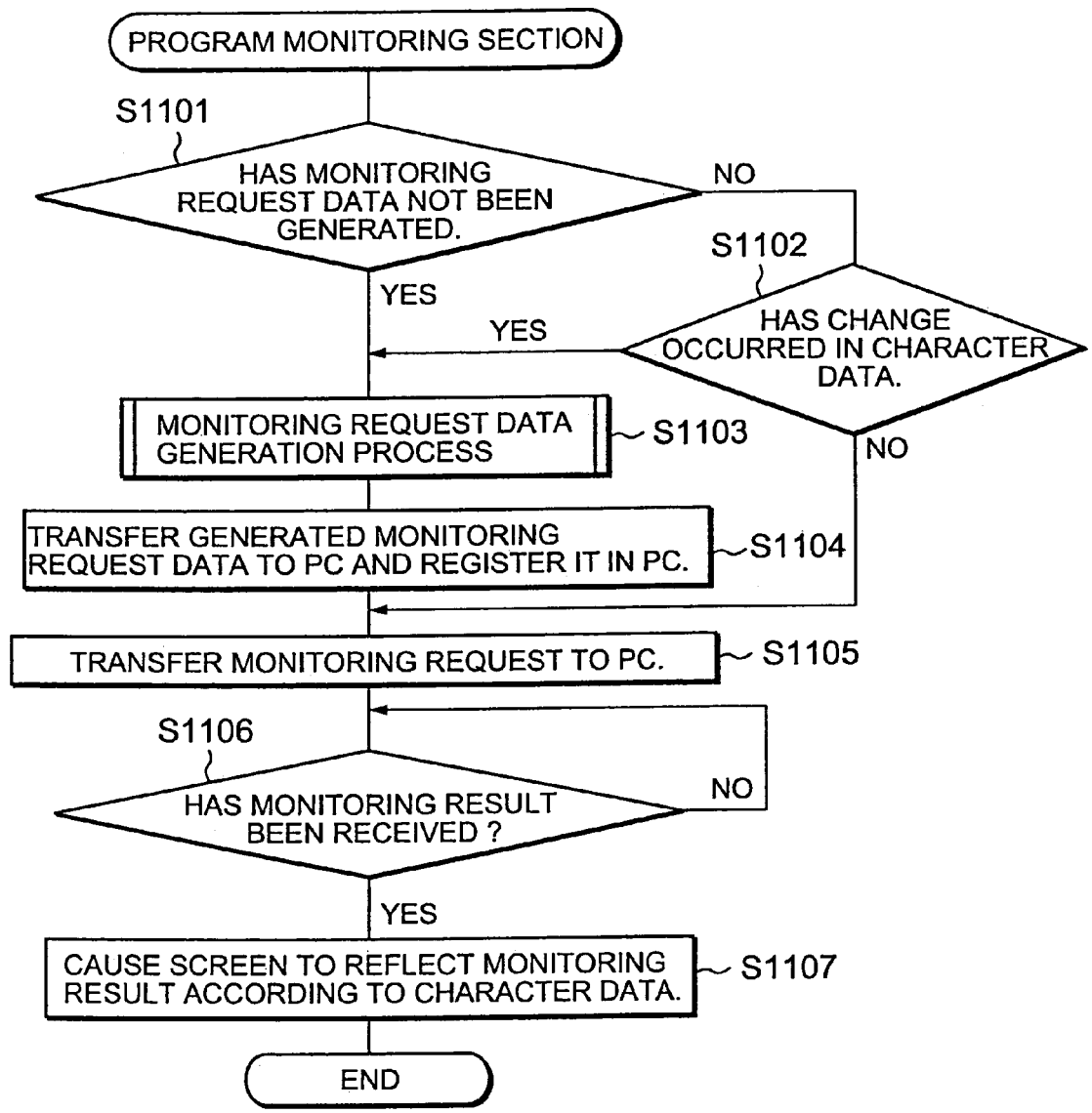
FIG. 42 is a flowchart showing a control operation of the conventional peripheral device of a PC that is performed by a program monitoring section of the conventional peripheral device of a PC.
Figure 43:
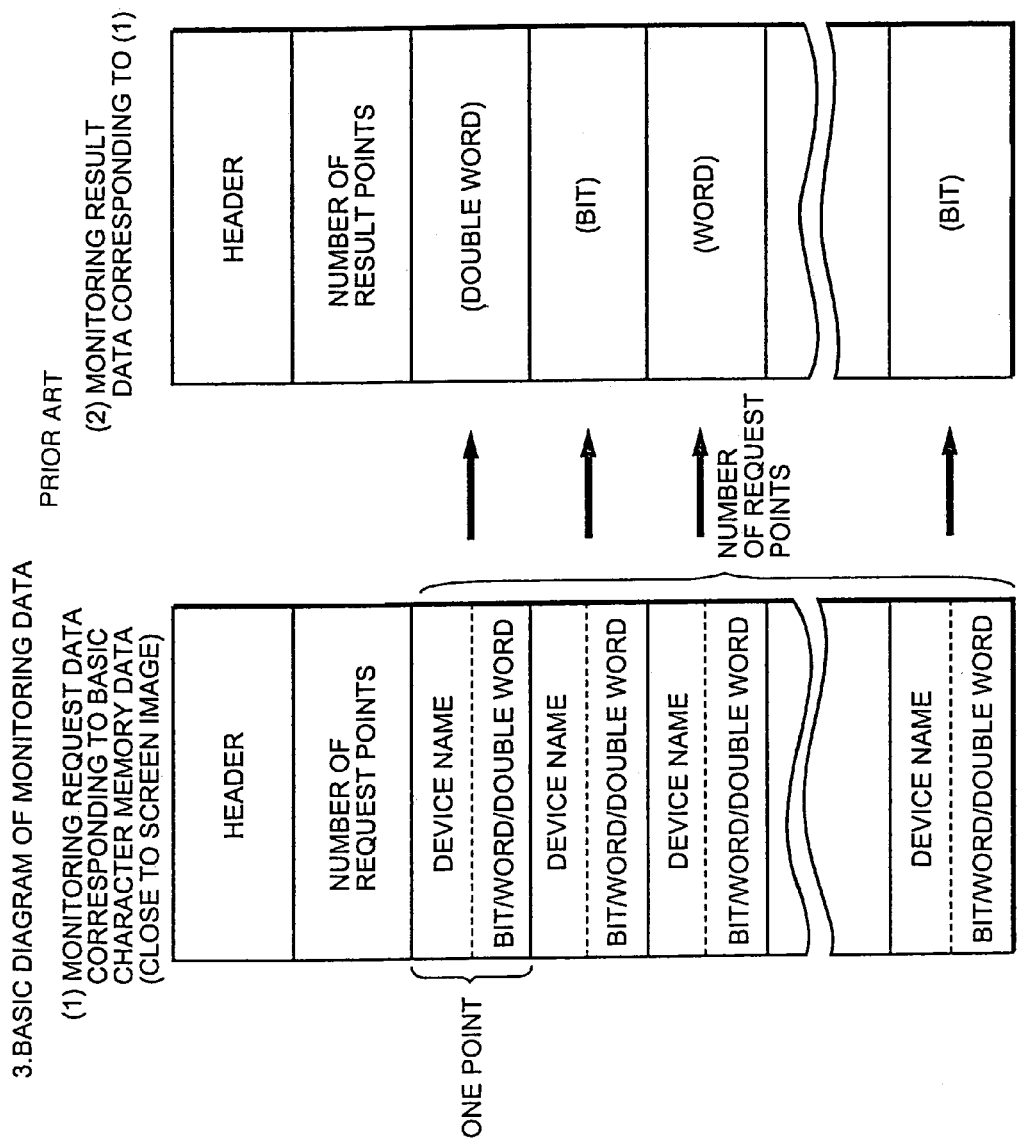
FIG. 43 is a structure diagram showing the data structure of monitoring request data that is output from the program monitoring section to the PC and the data structure of monitoring result data that is output from the PC to the program monitoring section in the conventional PC peripheral device.
Figure 44:
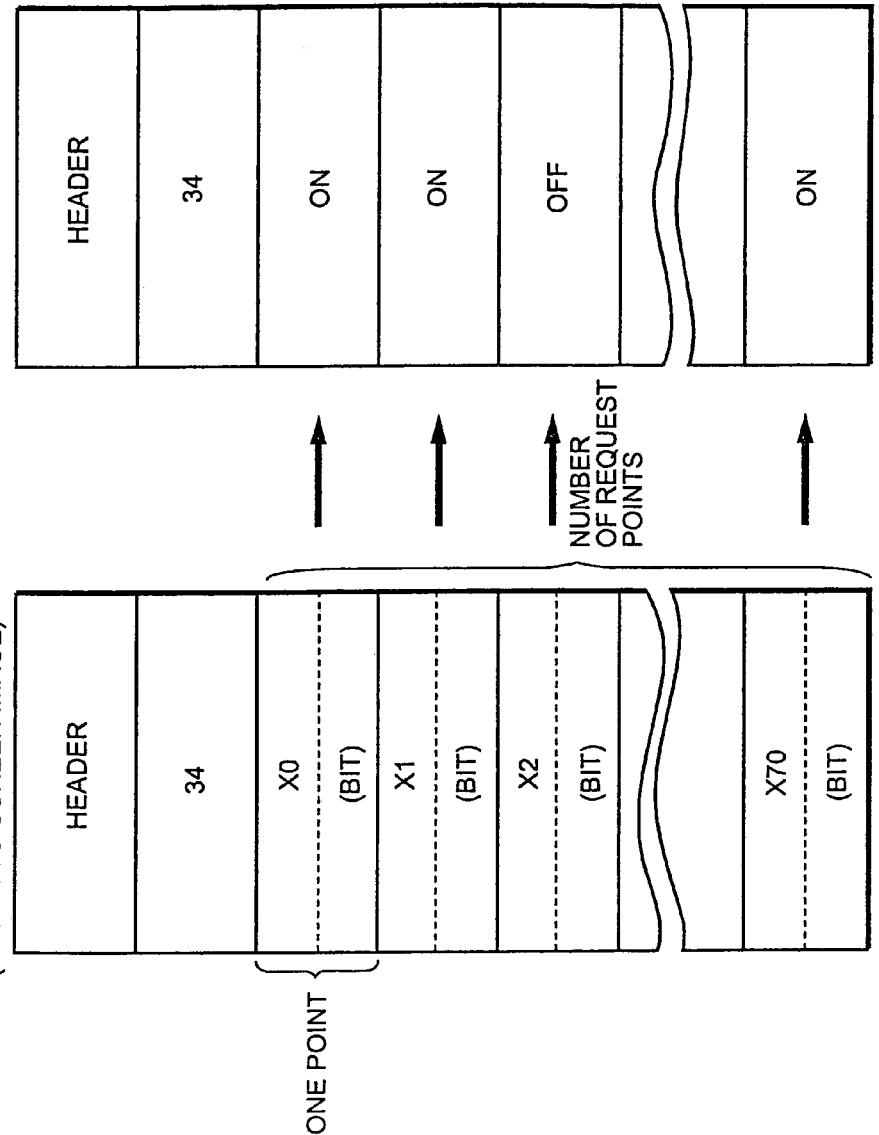
FIG. 44 is a structure diagram showing a specific data structure of monitoring request data that is output from the program monitoring section to the PC and a specific data structure of monitoring result data that is output from the PC to the program monitoring section in the conventional PC peripheral device.

The components in FIG. 1 having the same or corresponding components in FIG. 37 are given the same symbols as the latter and descriptions therefor have been omitted, and the components in FIG. 1 that are different than in FIG. 37 have been described above.

The display 9 corresponds to the display means, and the mouse 10 and the keyboard 11 correspond to the input means. The managing means consists of the window management section 7, the character memory generation section 13, the window display control section 15, the monitoring condition setting window section 21, the monitoring conditions storage section 22, the program-by-program monitoring conditions storage section 23, the active state watching means 24, the monitoring management section 25, the program monitoring section 26, etc.

Figure 2:
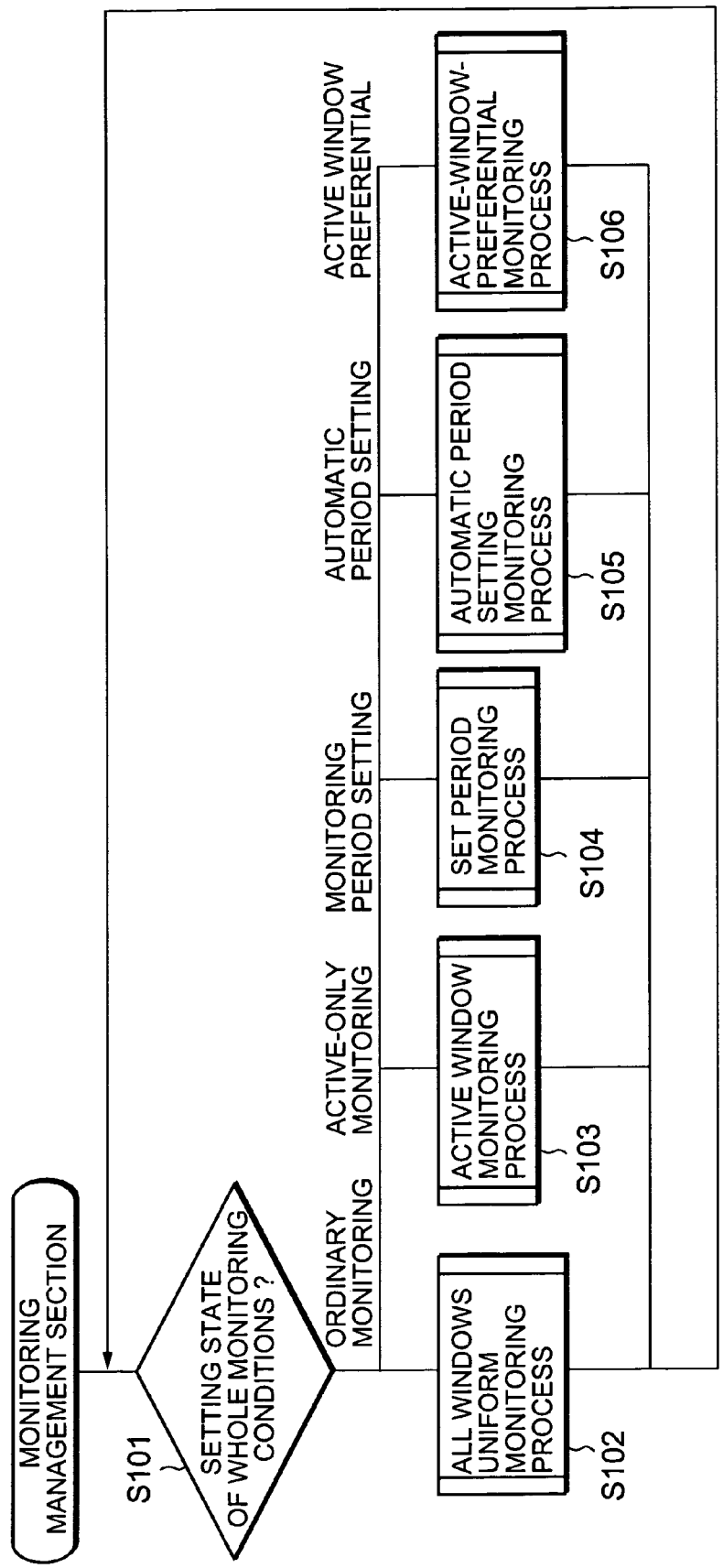
FIG. 2 is a flowchart showing a control operation of the PC peripheral device according to the invention.

Next, a control operation of the peripheral device 17 of the PC 1 according to the embodiment shown in FIG. 1 will be described with reference to FIG. 2. FIG. 2 is a flowchart showing a control operation of the peripheral device 17 of the PC 1 according to the embodiment.

At S101, the monitoring management section 25 checks various conditions relating to monitoring that are recorded on a setting state table of the whole monitoring conditions storage section 22.

If the various conditions relating to monitoring that are recorded on the setting state table relate to an ordinary monitoring method for monitoring all windows at a constant monitoring period, the process goes to S102.

If the various conditions recorded on the setting state table relate to a method for monitoring only an active window, the process goes to S103.

If the various conditions recorded on the setting state table relate to a method for monitoring windows at different monitoring periods, respectively, the process goes to S104.

If the various conditions recorded on the setting state table relate to an automatic period setting type monitoring method in which the monitoring period is varied in accordance with the active time of the window, the process goes to S105.

Further, if the various conditions recorded on the setting state table relate to a monitoring method in which priority is given to an active window, the process goes to S106. The monitoring method in which priority is given to an active window is a method in which whether windows are active is judged and the monitoring processes are performed at different monitoring periods based on resulting judgments.

Figure 3:
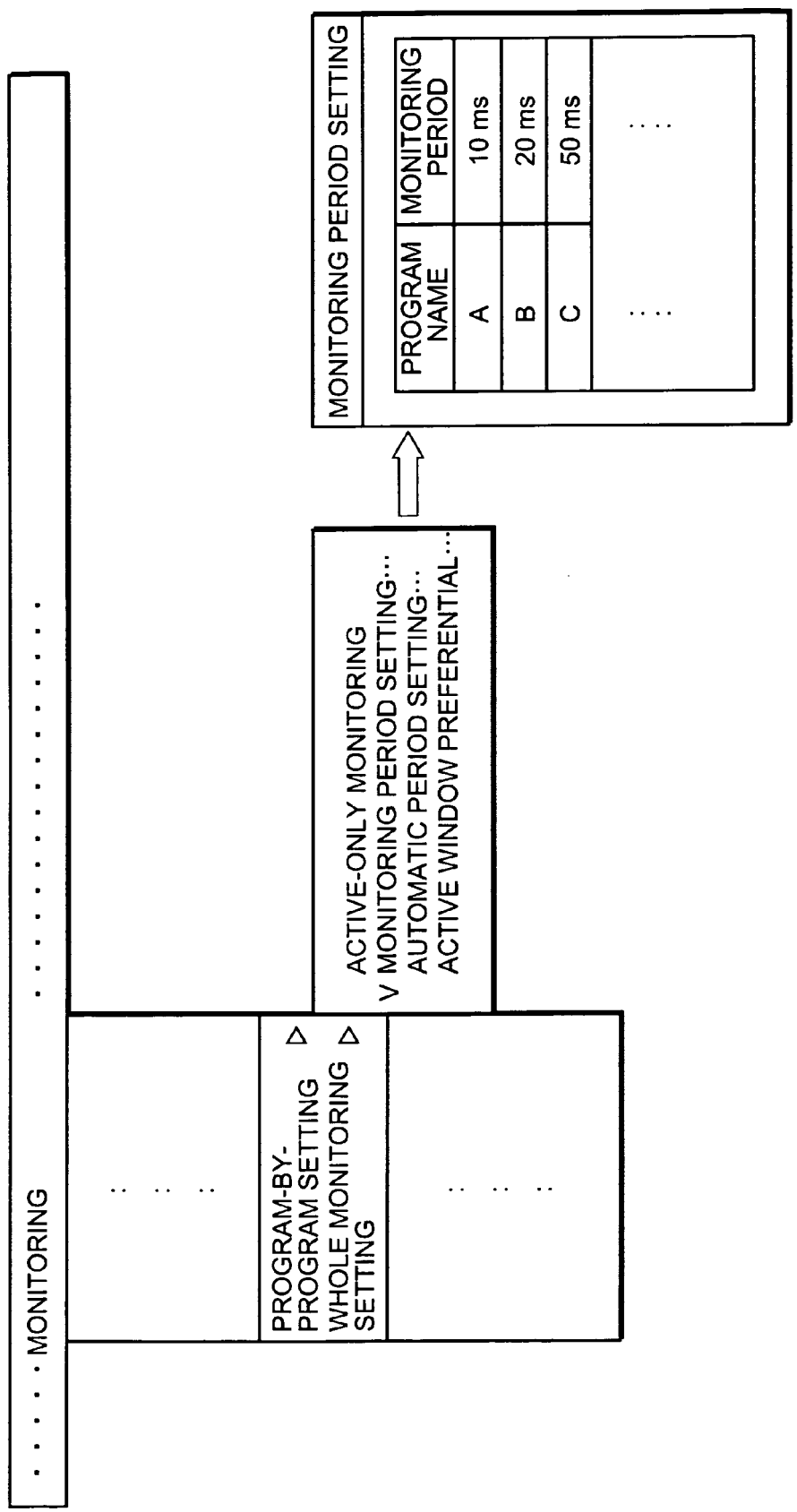
FIG. 3 is an image diagram showing an image of a whole monitoring setting menu for setting whole monitoring conditions in the PC peripheral device according to the invention.

Setting a monitoring method in the setting condition table is performed by an operator. The setting by an operator is performed according to a whole monitoring setting menu as shown in FIG. 3. A monitoring method that has been selected by an operator is recorded in the setting state table that is held by the whole monitoring conditions storage section 22. Part I of FIG. 4 is a conceptual chart of the setting state table that is held by the whole monitoring conditions storage section 22. A selected monitoring method is recorded in a setting state region shown in part I of FIG. 4.

If a monitoring method selected by an operator is such that monitoring processes of respective windows are performed at different monitoring periods, a monitoring period setting sub-window is popped up. The operator sets monitoring periods of respective program names in the sub-window. The monitoring periods of the respective program names that have been set in the sub-window are recorded in the table of periods of respective program names that is held by the whole monitoring conditions storage section 22. Part II of FIG. 4 shows the table of periods of respective program names.

At S102, the peripheral device 17 of the PC 1 according to the embodiment executes an ordinary monitoring process in which monitoring processes are uniformly executed for all windows. After completion of S102, the process returns to S101.

At S103, the peripheral device 17 of the PC 1 according to the embodiment executes a monitoring process for only an active window. After completion of S103, the process returns to S101.

At S104, the peripheral device 17 of the PC 1 according to the embodiment executes monitoring processes at different monitoring periods for respective windows. After completion of S104, the process returns to S101.

At S105, the peripheral device 17 of the PC 1 according to the embodiment executes an automatic period setting type monitoring process in which the monitoring period is varied in accordance with the active time of the window. After completion of S105, the process returns to S101.

At S106, the peripheral device 17 of the PC 1 according to the embodiment executes an active-window-preferential monitoring process in which the monitoring period is switched in accordance with whether the window is active or not. After completion of S106, the process returns to S101.

Figure 5:
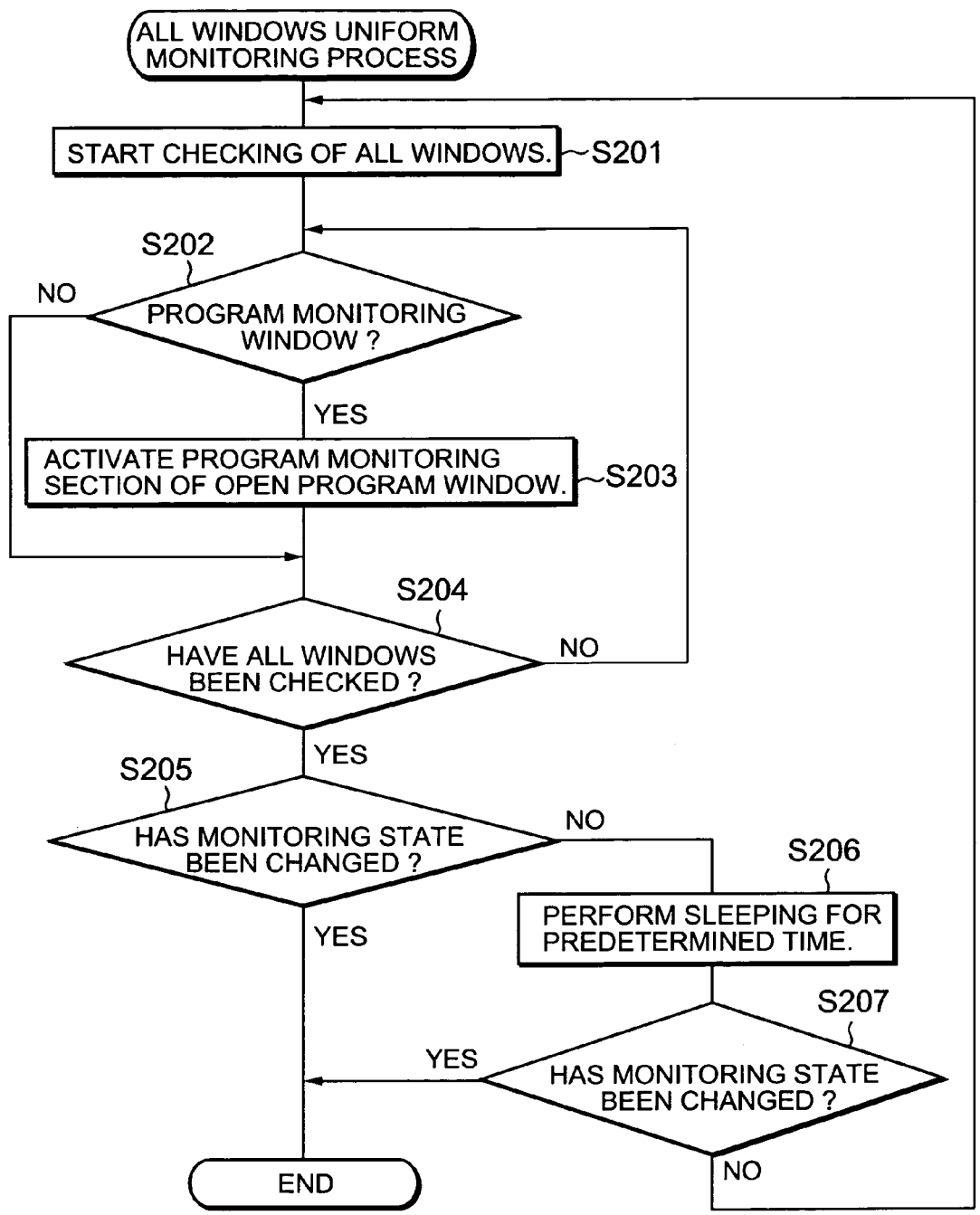
FIG. 5 is a flowchart showing an ordinary monitoring process in the PC peripheral device according to the invention.

Next, referring to FIG. 5, a description will be made of the ordinary monitoring process that is executed at S102 in FIG. 2 and in which monitoring processes of all windows are executed at a constant monitoring period. FIG. 5 is a flowchart showing the ordinary monitoring process. If the ordinary monitoring period in which monitoring processes of respective windows are executed uniformly is selected, "00" indicating selection of the ordinary monitoring process is recorded in the setting state region of the setting state table that is held by the whole monitoring conditions storage section 22.

First, at S201, the monitoring management section 25 prepares, based on window information that is acquired from the window management section 7, for checking all windows in order. After completion of S201, the process goes to S202.

At S202, the monitoring management section 25 checks whether a certain window being displayed on the display 9 is a window that relates to a program to be monitored. If the checked window is a program monitoring window which is a window that relates to a program to be monitored, the process goes to S203. If not, the process goes to S204.

At S203, the monitoring management section 25 activates a program monitoring section 26 that relates to the program monitoring window concerned. After completion of S203, the process goes to S204.

At S204, the monitoring management section 25 checks whether all windows being displayed on the display 9 have been subjected to the check as to whether the window is a program monitoring window. If all windows have been subjected to the check as to whether the window is a program monitoring window, the process goes to S205. If not all windows have been subjected to such a check, the process returns to S202.

At S205, the monitoring management section 25 checks whether the monitoring state has been changed. If the monitoring state has been changed, the execution of the series of steps is finished. If the monitoring state has not been changed, the process goes to S206. Changing of the monitoring state is made by an operator at an arbitrary time point, for example, at a time point of setting of monitoring conditions, alteration of set monitoring conditions, or end of monitoring.

At S206, the monitoring management section 25 performs sleeping for a predetermined time that is based on the monitoring period. After completion of S206, the process goes to S207.

At S207, the monitoring management section 25 checks whether the monitoring state has been changed. If the monitoring state has been changed, the execution of the series of steps is finished. If the monitoring state has not been changed, the process returns to S201.

It is understood from the above description that the monitoring management section 25 activates the program monitoring sections 26 of respective programs at a constant period.

Figure 6:
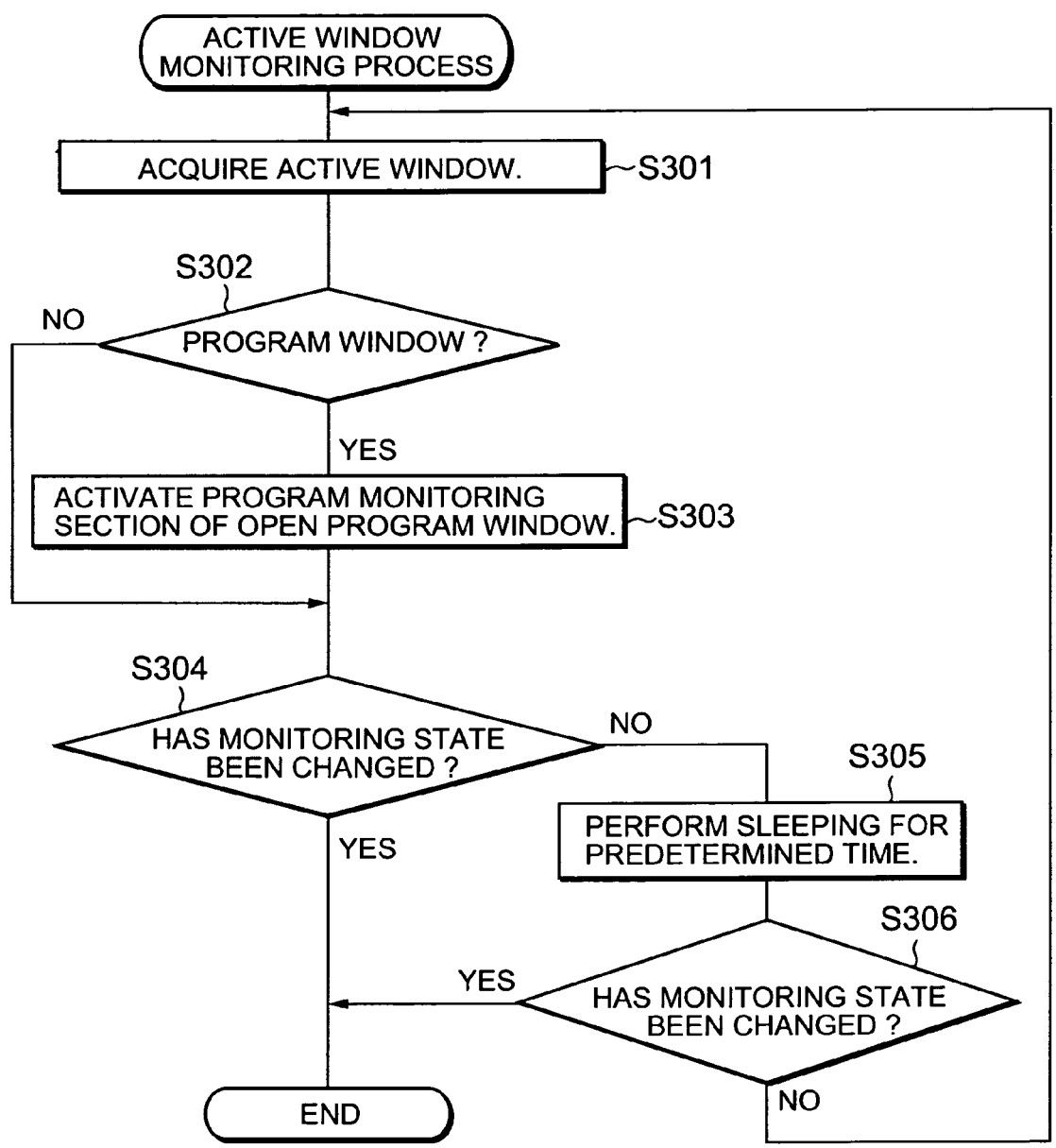
FIG. 6 is a flowchart showing a monitoring process for monitoring only an active window in the PC peripheral device according to the invention.

Next, referring to FIG. 6, a description will be made of the monitoring process that is executed at S103 in FIG. 2 and in which only devices of an active window are monitored. FIG. 6 is a flowchart showing the monitoring process for monitoring only devices of an active window.

The selection of a monitoring method is made in advance by an operator. The selection of a monitoring method by an operator is performed by using the whole monitoring setting menu as shown in FIG. 3. A monitoring method that has been selected by an operator is recorded in the setting state table that is held by the whole monitoring conditions storage section 22. The fact that the monitoring process for monitoring only devices of an active window has been selected by an operator is recorded, for example, as "01," in the setting state region of the setting state table that is held by the whole monitoring conditions storage section 22.

First, at S301, the monitoring management section 25 detects an active window, that is, a window that is in an active state, based on window information that is acquired from the window management section 7. After completion of S301, the process goes to S302.

At S302, the monitoring management section 25 checks whether the active window being displayed on the display 9 is a program monitoring window. If the checked window is a program monitoring window, the process goes to S303. If it is not a program monitoring window, the process goes to S304.

At S303, the monitoring management section 25 activates a program monitoring section 26 that relates to the program monitoring window that was checked at S302. After completion of S303, the process goes to S304.

At S304, the monitoring management section 25 checks whether the monitoring state has been changed. If the monitoring state has been changed, the execution of the series of steps is finished. If the monitoring state has not been changed, the process goes to S305.

At S305, the monitoring management section 25 performs sleeping for a predetermined time. After completion of S305, the process goes to S306.

At S306, the monitoring management section 25 checks whether the monitoring state has been changed. If the monitoring state has been changed, the execution of the series of steps is finished. If the monitoring state has not been changed, the process returns to S301.

It is understood from the above description that the monitoring management section 25 activates, at a predetermined period, the program monitoring section 26 of a program that is started by using an active window on the display 9.

Figure 7:
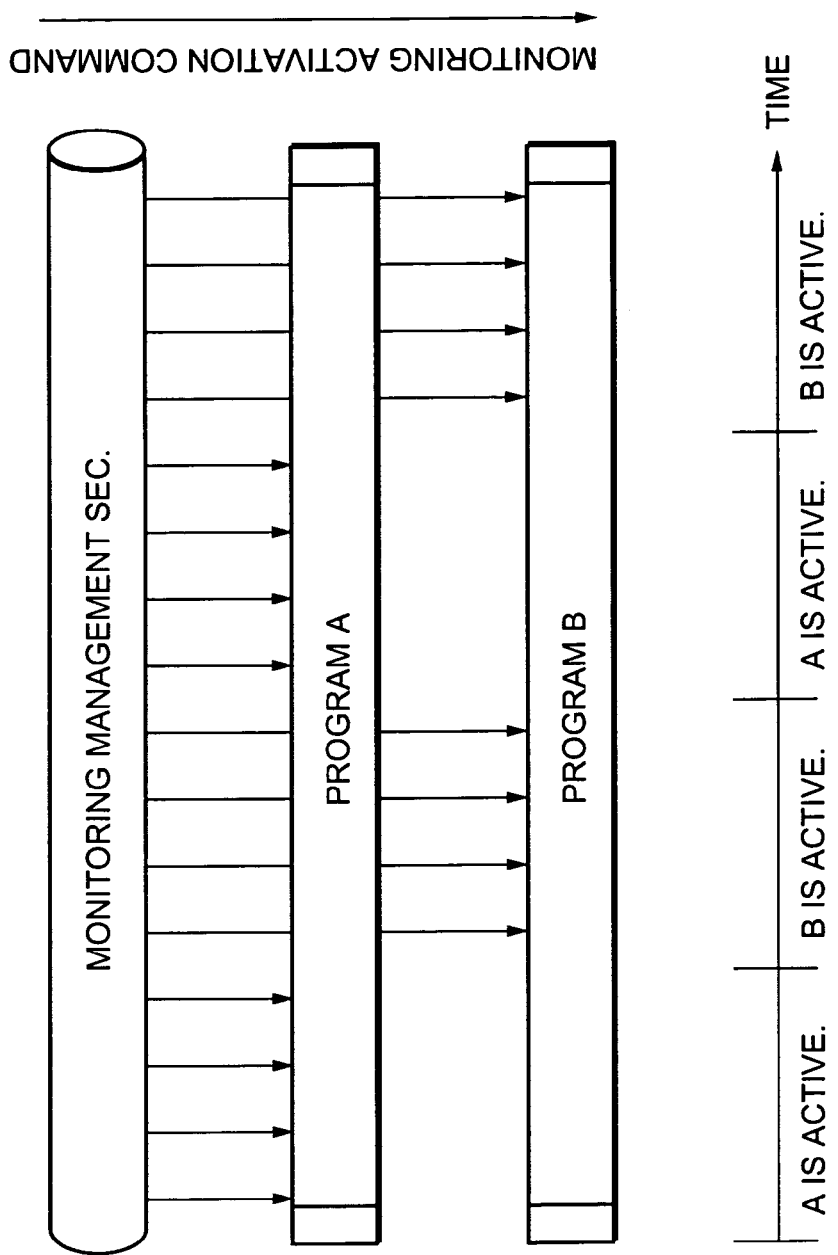
FIG. 7 is a conceptual chart showing how a monitoring management section activates program monitoring sections in the PC peripheral device according to the invention.

FIG. 7 shows how the monitoring management section 25 activates the program monitoring section 26 of only a program that is reflected by an active window. FIG. 7 is a conceptual chart showing how the monitoring management section 25 activates program monitoring sections 26. FIG. 7 shows an operation that the monitoring management section 25 sends a monitoring activation command to only program A when the window of program A is active, and sends a monitoring activation command to only program B when the window of program B is active.

Figure 8:
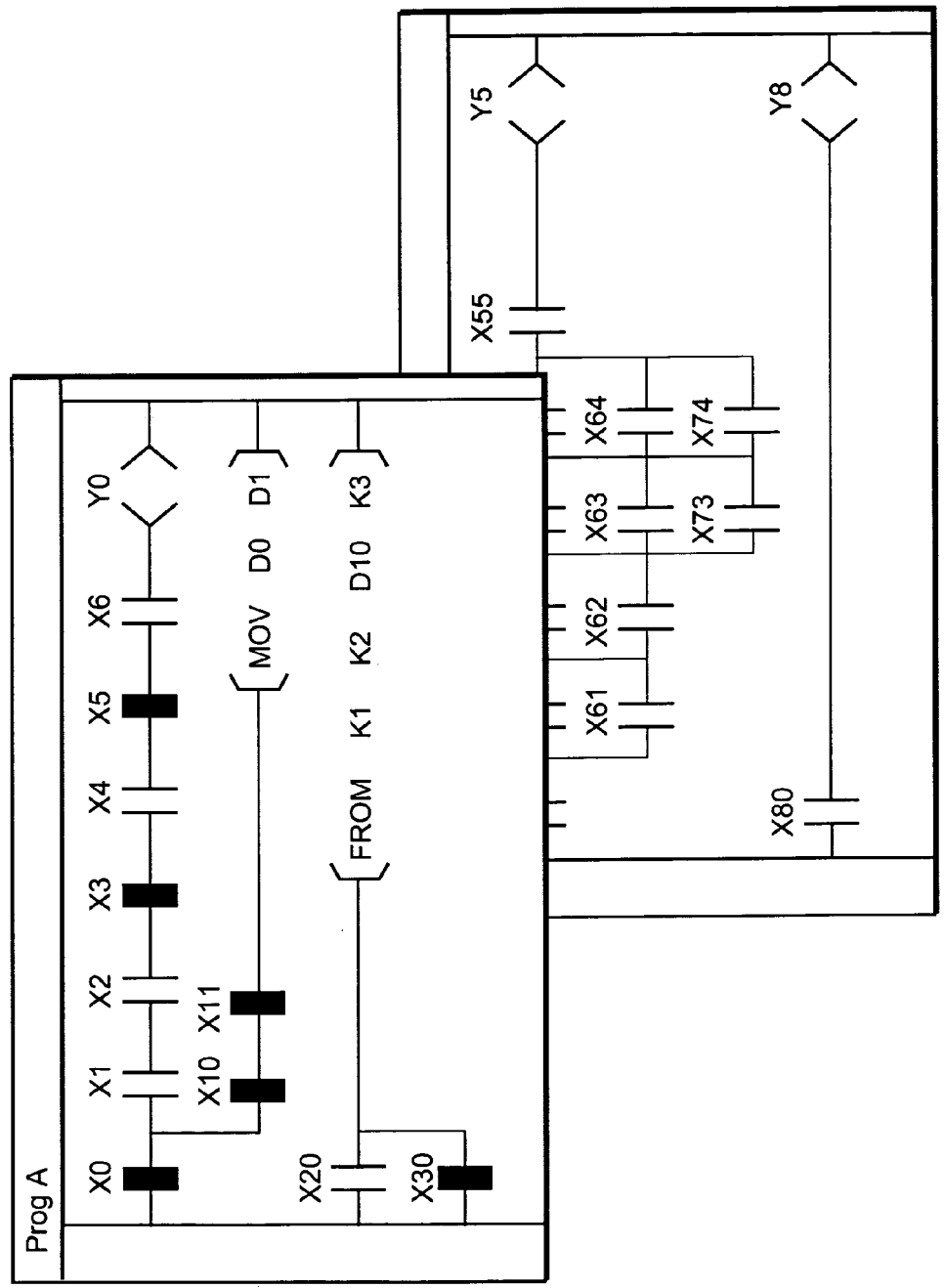
FIG. 8 is a conceptual diagram showing a state that a result of a monitoring process is reflected by only the window of an active program A on a display of the PC peripheral device according to the invention.

FIG. 8 shows a state that the window of program A is active and a monitoring activation command is sent to only program A as shown in FIG. 7 and a monitoring process is executed for only the window of program A on the display 9. FIG. 8 shows that the window relating to program A is active and the window relating to the other program is inactive. As shown in FIG. 8, marks indicating that data input or calculation is performed in a plurality of devices are shown in the ladder diagram in the window relating to the active program A. The ladder diagram is updated sequentially as long as this window remains active. On the other hand, no mark indicating data input or calculation is shown in the ladder diagram of the window relating to the other, inactive program. The ladder diagram is not updated as long as this window remains inactive.

Since as described above only a monitoring process of a program relating to an active window is executed, the communication data amount of data communications that are performed between the PC and the peripheral device and between the peripheral device and the display can be reduced. This makes it possible to provide a peripheral device of a programmable controller in which the processing result of a monitoring process is updated at a high rate.

Figure 9:
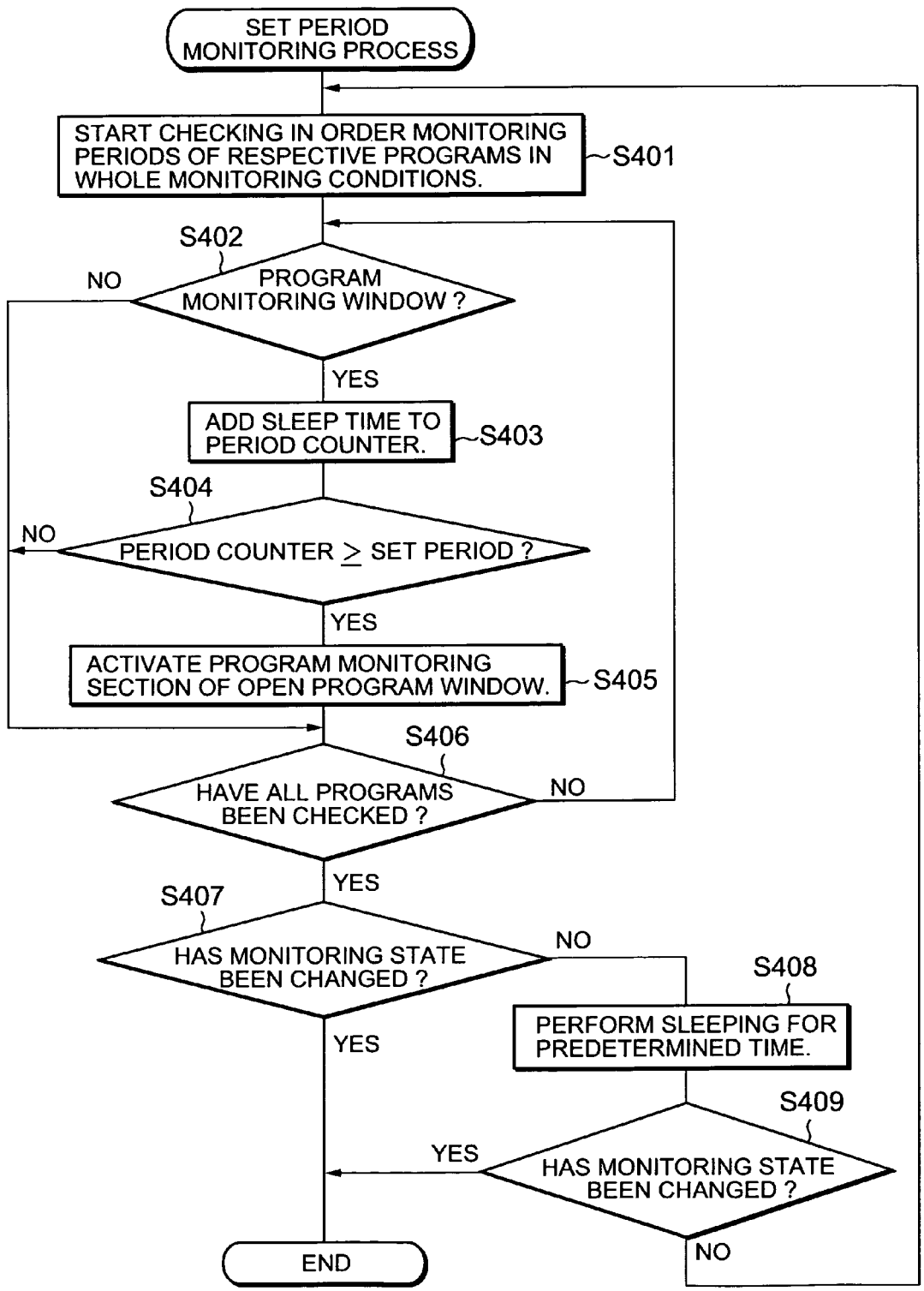
FIG. 9 is a flowchart of a set period monitoring process in the PC peripheral device according to the invention.

Next, referring to FIG. 9, a description will be made of the set period monitoring process that is executed at S104 in FIG. 2 and in which monitoring processes of respective windows are performed at different monitoring periods. FIG. 9 is a flowchart of the set period monitoring process.

The selection of a monitoring method is made in advance by an operator. The selection of a monitoring method by an operator is performed by using the whole monitoring setting menu as shown in FIG. 3. If the set period monitoring process is selected as a monitoring method, a sub-window is popped up. The set period monitoring process is realized by setting monitoring periods of respective programs in the monitoring period setting table in the sub-window. Monitoring periods of respective programs that have been set in the monitoring period setting table are recorded in the table of periods of respective program names in the whole monitoring conditions storage section 22.

A monitoring method that has been selected by an operator is recorded in the setting state table that is held by the whole monitoring conditions storage section 22. For example, if the set period monitoring process is selected by an operator, "02" or the like is recorded in the setting state region of the setting state table.

FIG. 10 shows an example of recording in the table of periods of respective program names and the setting state table that are held by the whole monitoring conditions storage section 22. FIG. 10 shows an example of recording in the table of periods of respective program names and the setting state table in the set period monitoring process.

At S401 of the set period monitoring process, the monitoring management section 25 checks in order the monitoring periods of respective programs that are recorded in the whole monitoring conditions storage section 22. After completion of S401, the process goes to S402.

At S402, the monitoring management section 25 checks whether a certain window being displayed on the display 9 is a program monitoring window. If the checked window is a program monitoring window, the process goes to S403. If it is not a program monitoring window, the process goes to S406.

At S403, the monitoring management section 25 adds a sleep time to a period counter corresponding to the program monitoring window that was checked at S402. After completion of S403, the process goes to S404. The monitoring management section 25 provides period counters for the respective program monitoring windows.

At S404, the monitoring management section 25 compares the value of the period counter with the value of the set period. If the value of the period counter becomes greater than or equal to the set period value, the process goes to S405. If the value of the period counter is smaller than the set period value, the process goes to S406.

At S405, the monitoring management section 25 activates the program monitoring section 26 of the program monitoring window concerned. After completion of S405, the process goes to S406.

At S406, the monitoring management section 25 checks whether all windows being displayed on the display 9 have been subjected to the check as to whether the window is a program monitoring window. If all windows have subjected to such a check, the process goes to S407. If not all windows have been subjected to such a check, the process returns to S402.

At S407, the monitoring management section 25 checks whether the monitoring state has been changed. If the monitoring state has been changed, the execution of the series of steps is finished. If the monitoring state has not been changed, the process goes to S408.

At S408, the monitoring management section 25 performs sleeping for a predetermined time that is based on the monitoring period. After completion of S408, the process goes to S409.

At S409, the monitoring management section 25 checks whether the monitoring state has been changed. If the monitoring state has been changed, the execution of the series of steps is finished. If the monitoring state has not been changed, the process returns to S401.

It is understood from the above description that the monitoring management section 25 activates program monitoring sections 26 of respective programs at monitoring periods that are different for respective windows.

For example, in a case where setting is made as shown in the table of periods of respective program names of FIG. 10, the window of program A is activated by the program monitoring section 26 every 10 ms and the monitoring result is thereby updated. Similarly, the monitoring result of the window of program B is updated every 20 ms and that of the window of program C is updated every 50 ms.

Figure 11:
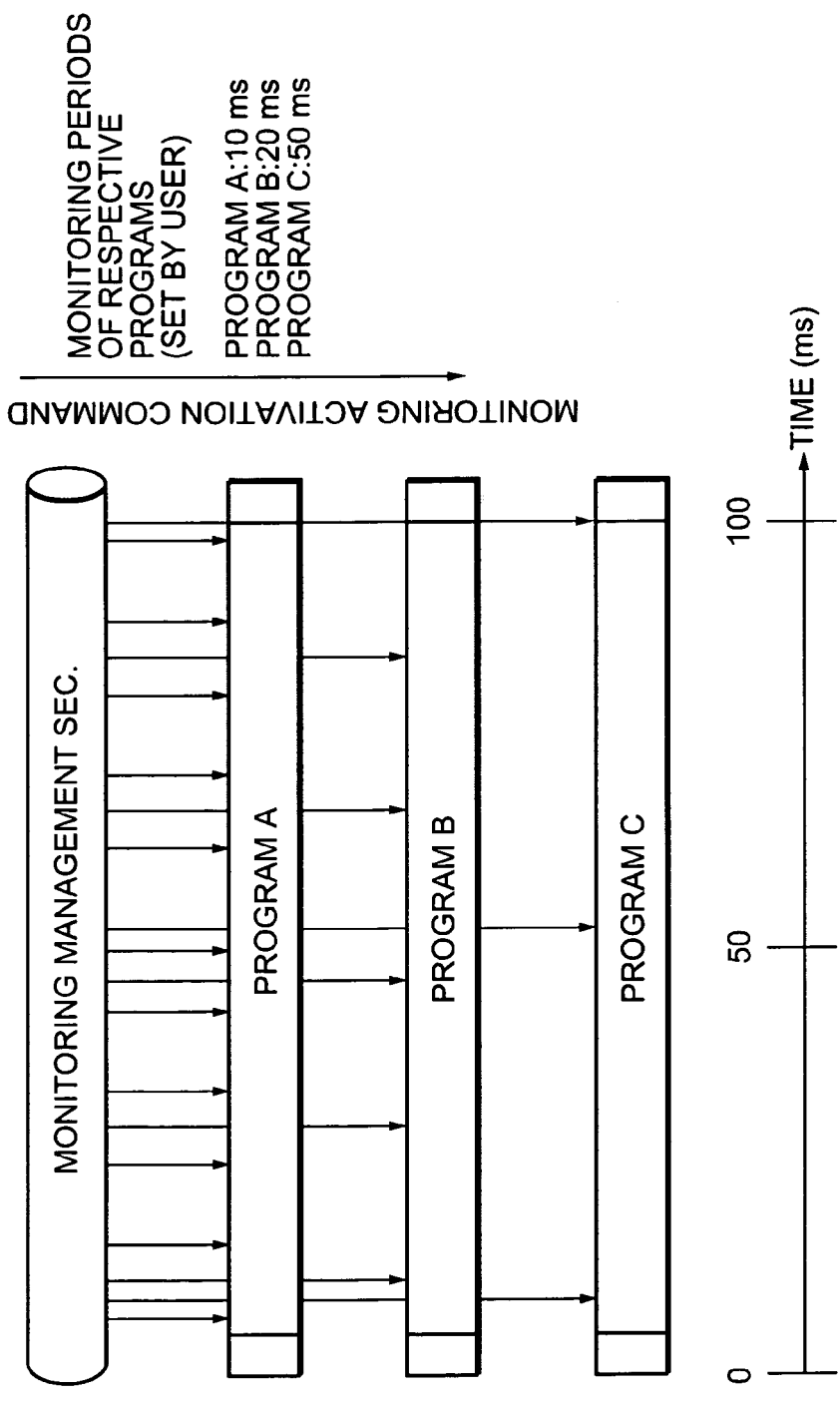
FIG. 11 is a conceptual diagram showing how program monitoring sections of respective programs are activated at monitoring periods that are different for respective windows in the PC peripheral device according to the invention.

FIG. 11 shows how program monitoring sections 26 of respective programs are activated at monitoring periods that are different for respective windows. FIG. 11 is a conceptual chart showing how the monitoring management section 25 activates program monitoring sections 26. FIG. 11 shows an operation that programs A, B, and C receive monitoring activation commands from the monitoring management section 25 at different monitoring periods.

Figure 12:
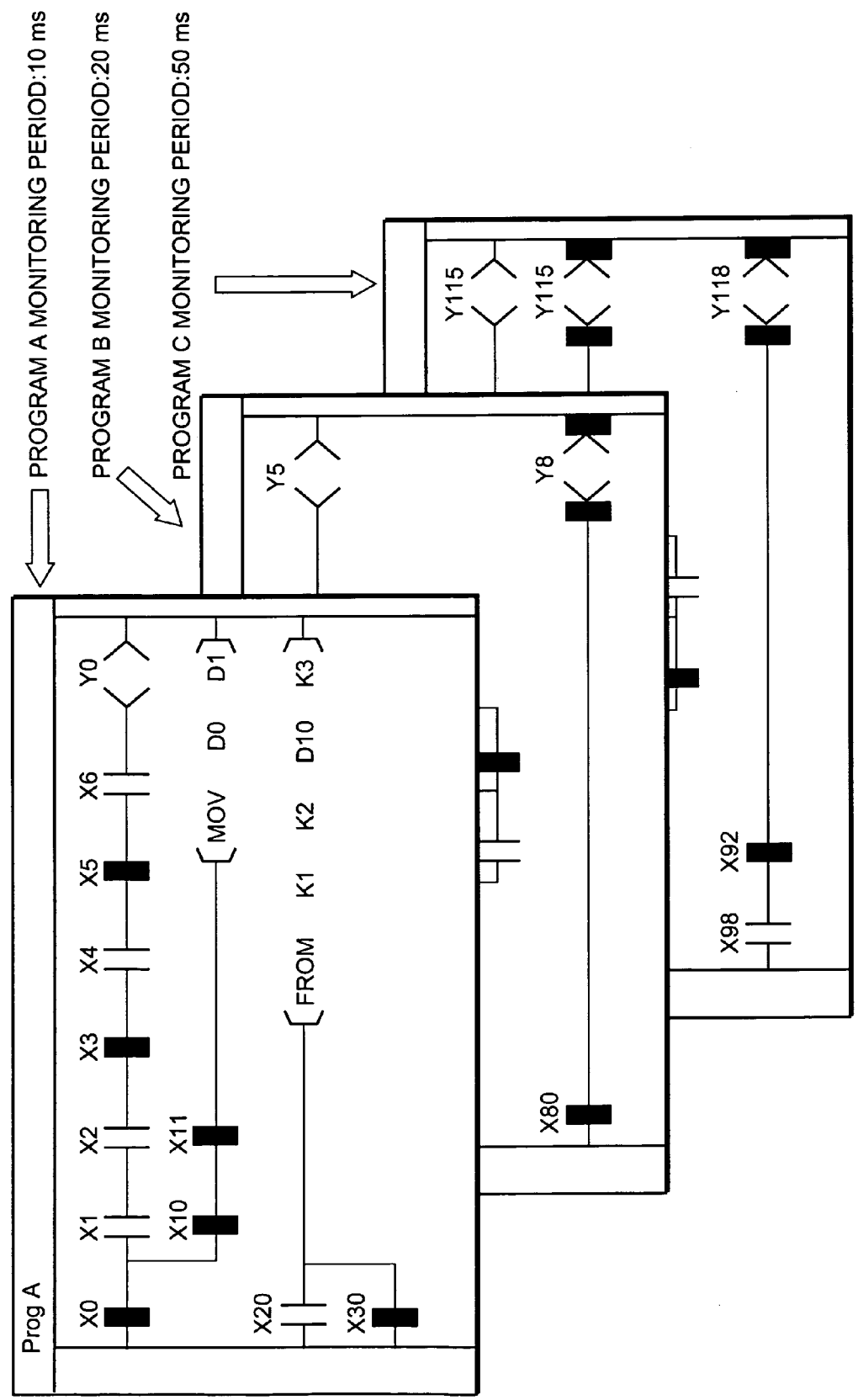
FIG. 12 is a conceptual diagram showing that respective windows on the display of the PC peripheral device according to the invention reflect results of monitoring processes using arbitrary monitoring periods that have been set by an operator.

FIG. 12 shows a state that, as shown in FIG. 11, programs A, B, and C are receiving monitoring activation commands from the monitoring management section 25 at different monitoring periods. In the window of program A shown in FIG. 12, the monitoring result is updated every 10 ms as set in the table of periods of respective programs. In the window of program B, the monitoring result is updated every 20 ms as set in the same table of periods of respective programs. Further, in the window of program C, the monitoring result is updated every 50 ms as set in the same table of periods of respective programs.

Since as described above the monitoring period of the monitoring process is varied in accordance with the program corresponding to each window, the communication frequency and the communication data amount of data communications that are performed between the PC and the peripheral device and between the peripheral device and the display can be reduced. This makes it possible to provide a peripheral device of a programmable controller in which the processing result of a monitoring process is updated at a high rate.

Figure 13:
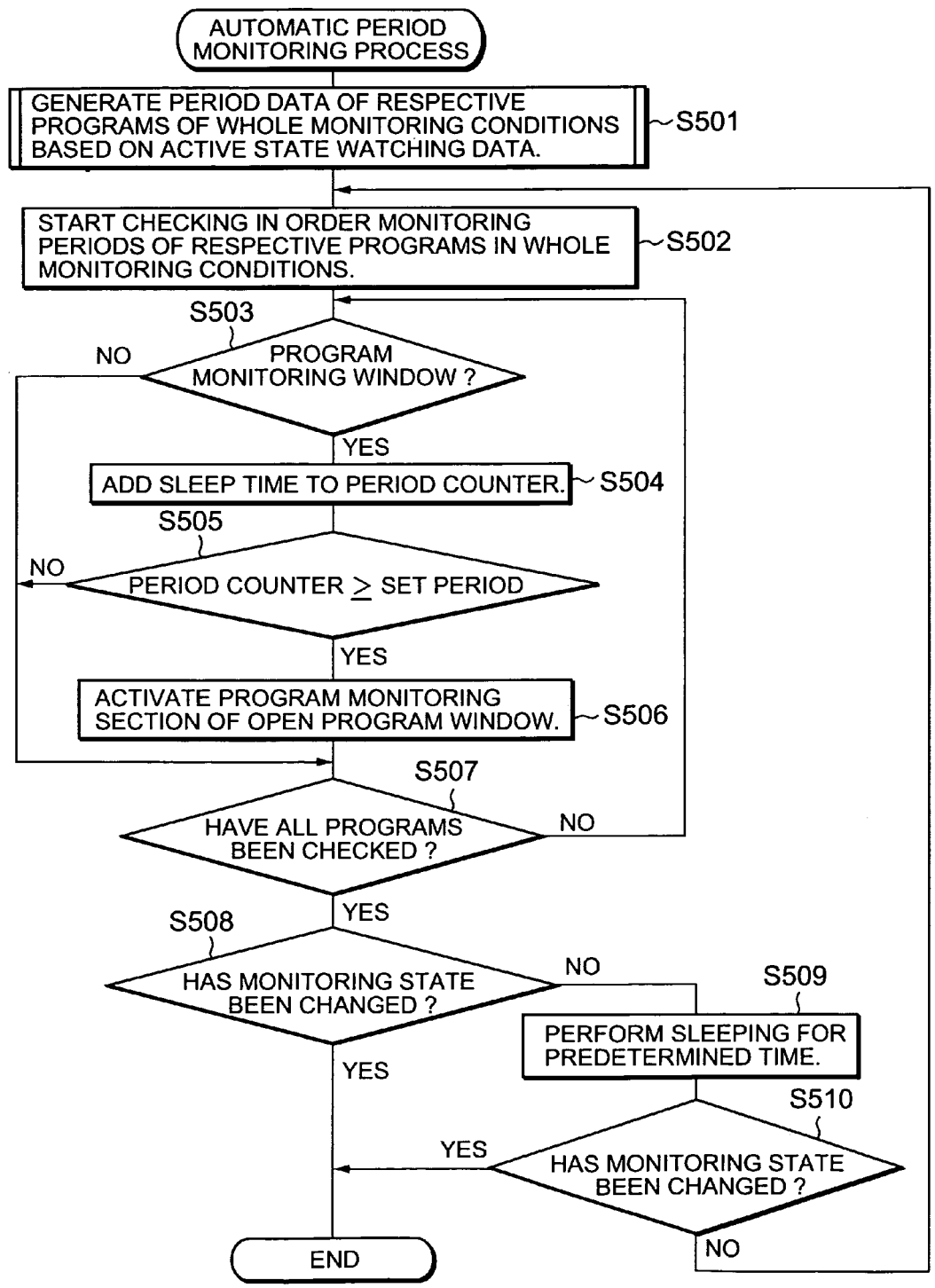
FIG. 13 is a flowchart of an automatic period setting type monitoring process in the PC peripheral device according to the invention.

Next, referring to FIG. 13, a description will be made of the automatic period setting type monitoring process that is executed at S105 in FIG. 2 and in which the monitoring period is varied in accordance with the time during which the window is active. FIG. 13 is a flowchart of the automatic period setting type monitoring process.

Figure 14:
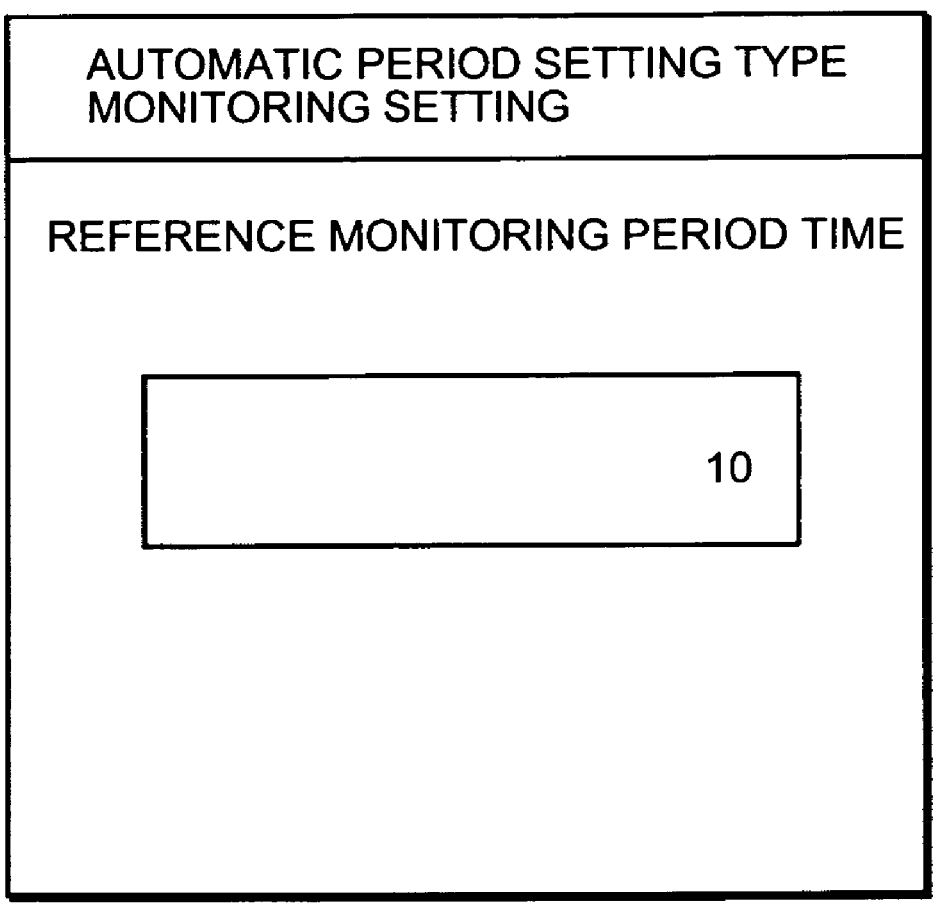
FIG. 14 is a conceptual diagram of a reference monitoring period time table that is additionally displayed on the display when an operator selects the automatic period setting type monitoring process in the PC peripheral device according to the invention.

The selection of a monitoring method is made in advance by an operator. The selection of a monitoring method by an operator is performed by using the whole monitoring setting menu as shown in FIG. 3. If the automatic period setting type monitoring process is selected as a monitoring method, a sub-window is popped up. If an arbitrary value is set in a reference monitoring period time table of the sub-window, a monitoring period is calculated based on this arbitrary value. FIG. 14 shows a reference monitoring period time table as a sub-window. FIG. 14 is a conceptual diagram of a reference monitoring period time table. An arbitrary value as a reference monitoring period time that is set in the reference monitoring period time table is recorded in the whole monitoring conditions storage section 22.

A monitoring method that has been selected by an operator is recorded in the setting state table that is held by the whole monitoring conditions storage section 22. For example, if the automatic period setting type monitoring process is selected by an operator, "03" or the like is recorded in the setting state region of the setting state table.

FIG. 15 shows an example of recording in the table of periods of respective program names, the setting state table, and the reference monitoring period time table that are held by the whole monitoring conditions storage section 22. FIG. 15 shows an example of recording in the table of periods of respective program names, the setting state table, and the reference monitoring period time table in the set period monitoring process. Periods of respective programs to be set in the table of periods of respective program names are calculated according to a prescribed calculation formula that is based on the reference monitoring period time that is set in the reference monitoring period time table and an elapsed time during which the window of the program has been active. The prescribed calculation formula is as follows. First, the maximum value of active times is divided by the active time of the processing subject data. Then, a resulting quotient is multiplied by the reference monitoring period time that is a reference period. A result obtained according to this calculation formula is registered in the table of periods of respective programs as a monitoring period.

At S501 of the automatic period setting type monitoring process, the monitoring management section 25 acquires active state watching data from the active state watching section 24. The active state watching data is for notification of whether an arbitrary window being displayed on the display 9 is active or not. Based on the acquired active state watching data and the reference monitoring period time that is recorded in the reference monitoring period time table of the whole monitoring conditions storage section 22, the monitoring management section 25 generates monitoring period data of respective programs to be set in the table of periods of respective program names of the whole monitoring conditions storage section 22. The monitoring period data of respective programs to be set in the table of periods of respective program names of the whole monitoring conditions storage section 22 are sequentially updated based on the active state watching data that is obtained from the active state watching section 24. After completion of S501, the process goes to S502.

At S502 and the following steps, the monitoring management section 25 performs monitoring based on the table of periods of respective programs of the whole monitoring conditions storage section 22 that was generated at S501. S502 and the following steps are the same as S401 and the following steps shown in FIG. 9 and descriptions therefor are omitted. In this connection, S502 corresponds to S401, S503 corresponds to S402, S504 corresponds to S403, S505 corresponds to S404, S506 corresponds to S405, S507 corresponds to S406, S508 corresponds to S407, S509 corresponds to S408, and S510 corresponds to S409.

Figures 16, 17:
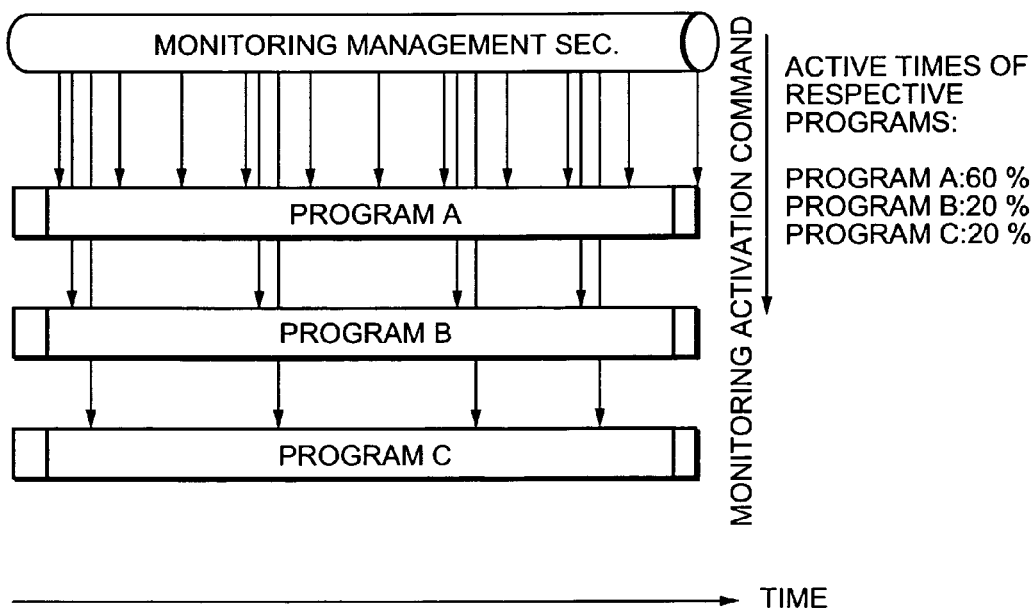
FIG. 16 shows a state table in which active times relating to respective program monitoring windows on the display are recorded in the PC peripheral device according to the invention.
FIG. 17 is a conceptual chart showing how the program monitoring sections of respective programs are activated at prescribed monitoring periods based on the active times of the respective windows in the PC peripheral device according to the invention.

Having a state table of active state watching data, the active state watching section 24 outputs active state watching data to the monitoring management section 25 based on the state table. FIG. 16 shows the state table. Active times of the windows corresponding to respective programs are recorded in the state table. The active time is obtained by measuring, with a timer, times during which the window of an arbitrary program is active in a prescribed time length having a prescribed time point as a reference and accumulating those times.

As described above, the monitoring period of a monitoring process of a program corresponding to a window that is more frequently viewed and hence is made active is decreased gradually. The monitoring period of a monitoring process of a program corresponding to a window that is less frequently viewed and hence is made active less frequently is increased gradually. Therefore, the communication frequency and the communication data amount of data communications that are performed between the PC and the peripheral device and between the peripheral device and the display can be reduced. This makes it possible to provide a peripheral device of a programmable controller in which the processing result of a monitoring process is updated at a high rate.

For example, assume that at a certain instant monitoring period data of respective programs have been set in the whole monitoring conditions storage section 22 in the manner shown in FIG. 15 by the monitoring management section 25 based on active state watching data and a reference monitoring period time. At this time, the program monitoring sections 26 of the respective program are activated by the monitoring management section 25 as shown in FIG. 17. FIG. 17 is a conceptual chart showing how the program monitoring sections 26 are activated by the monitoring management section 25.

Figure 18:
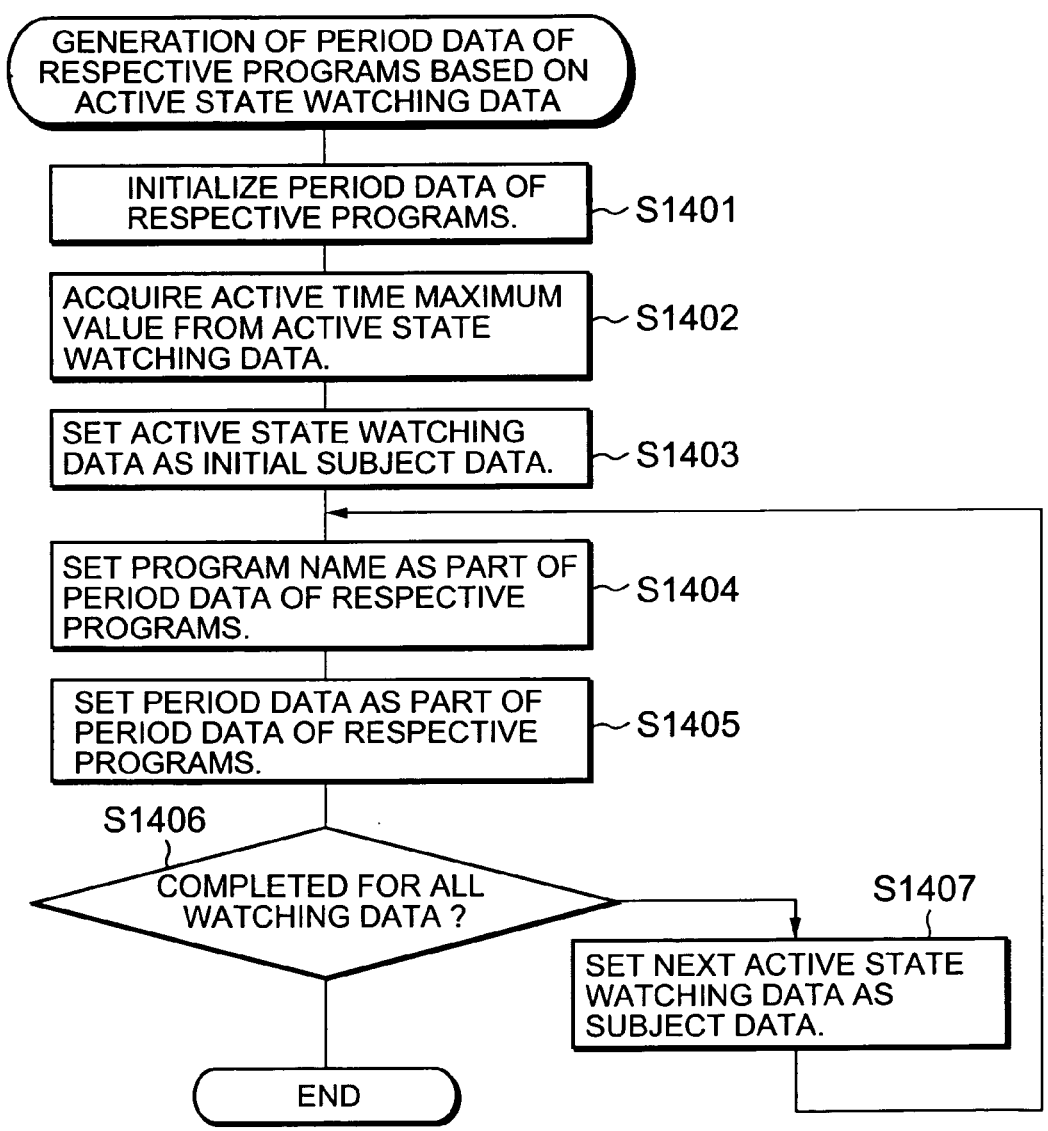
FIG. 18 is a flowchart showing a process of setting monitoring period data in the table of periods of respective programs of the whole monitoring conditions storage section that is part of the automatic period setting type monitoring process in the PC peripheral device according to the invention.

Next, referring to FIG. 18, a description will be made of a process of setting monitoring period data in the table of periods of respective programs of the whole monitoring conditions storage section 22 at S501 in FIG. 13. FIG. 18 is a flowchart showing the monitoring period data setting process.

At S1401, the monitoring management section 25 initializes the table of periods of respective program names that is held by the whole monitoring conditions storage section 22. After completion of S1401, the process goes to S1402.

At S1402, the monitoring management section 25 acquires the maximum active time (hereinafter referred to as "active time maximum value") relating to an arbitrary program from the active state watching table that is held by the active state watching section 24. The data recorded in the active state watching table are employed as active state watching data. Each active state watching data consists of a program name, an active time that indicates a time during which the window relating to the program has been active, and a presence confirmation flag that indicates whether the program concerned is recorded in the program storage section 4 or the like. After completion of S1402, the process goes to S1403.

At S1403, the monitoring management section 25 employs, as processing subject data, certain active state watching data that is registered in the active state watching table. After completion of S1403, the process goes to S1404.

At S1404, the monitoring management section 25 records the program name that is included in the processing subject data in a program name space of the table of periods of respective programs. After completion of S1404, the process goes to S1405.

At S1405, the monitoring management section 25 registers a monitoring period that is obtained according to the prescribed calculation formula in a monitoring period space of the table of periods of respective programs so that it is correlated with the program name. After completion of S1405, the process goes to S1406.

At S1406, the monitoring management section 25 judges whether the monitoring period registration has been completed for all data that are registered as the active state watching data. If the monitoring period registration has been completed for all data, the execution of the series of steps is finished. If it has not been completed for all data, the process goes to S1407.

At S1407, the monitoring management section 25 employs, as processing subject data, another active state watching data that is registered in the active state watching table. After completion of S1407, the process returns to S1404.

Figure 19:
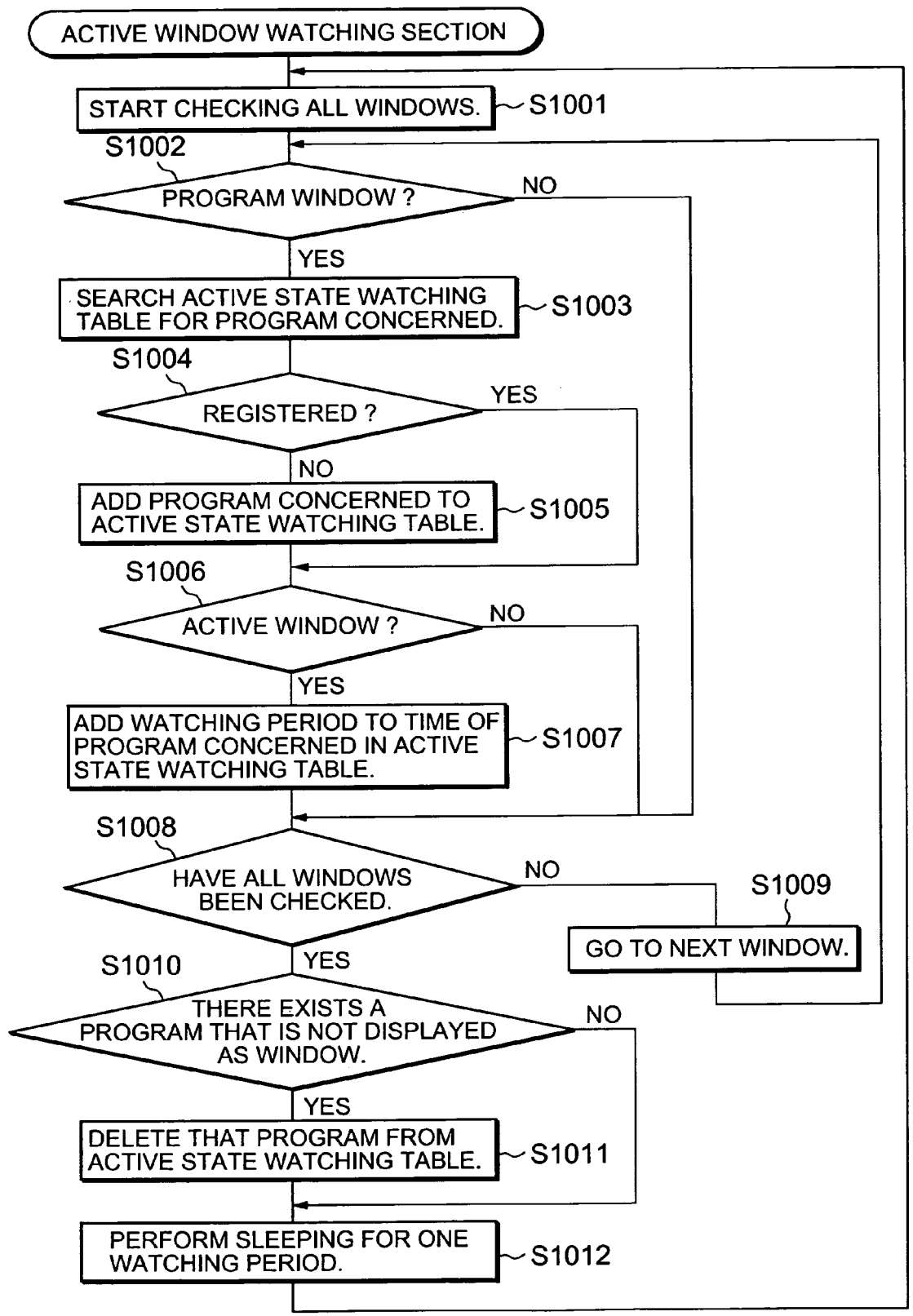
FIG. 19 is a flowchart showing a process of generating an active state watching table in the PC peripheral device according to the invention.

Next, a process of generating an active state watching table that is used in the above monitoring periods setting process will be described with reference to FIG. 19. FIG. 19 is a flowchart showing an active state watching table generation process. The active state watching table is held by the active state watching section 24.

At S1001, the active state watching section 24 prepares for checking in order all windows based on window information that is acquired from the window management section 7. Further, the active state watching section 24 sets, at "0," all presence confirmation flags of the active state monitoring table. After completion of S1001, the process goes to S1002.

At S1002, the active state watching section 24 checks whether a certain window being displayed on the display 9 is a program monitoring window. If the checked window is a program monitoring window, the process goes to S1003. If it is not a program monitoring window, the process goes to S1008. The program monitoring window is a window in which a monitoring result is outputted based on a program.

At S1003, the active state watching section 24 checks whether the program name of the program relating to the checked program monitoring window is registered in the active state watching table. After completion of S1003, the process goes to S1004.

At S1004, the active state watching section 24 checks a search result of S1003. If the program name concerned is registered in the active state watching table, the process goes to S1006. If it is not registered, the process goes to S1005.

At S1005, the active state watching section 24 registers the program name in the active state watching table and sets the corresponding active time at "0." After completion of S1005, the process goes to S1006.

At S1006, for indication of the fact that the program name concerned is registered in the active state watching table and hence is present, the active state watching section 24 sets "1" in the presence confirmation flag space of the active state watching table that corresponds to the program name. Then, the active state watching section 24 judges whether the program monitoring window relating to the program of the program name concerned is active. If the program monitoring window relating to the program name is active, the process goes to S1007. If it is not active, the process goes to S1008.

At S1007, the active state watching section 24 adds a prescribed watching period time to the time in the active time space of the active state watching table that corresponds to the program name concerned. The watching period time corresponds to an updating period of active state watching data that is regularly acquired by the active state watching section 24. After completion of S1007, the process goes to S1008.

At S1008, the active state watching section 24 checks whether all windows have been checked. If all windows have been checked, the process goes to S1010. If not all windows have been checked, the process goes to S1009.

At S1009, the active state watching section 24 prepares for the check as to whether a window that is different from the so far checked windows is a program monitoring window. After completion of S1009, the process returns to S1002.

At S1010, the active state watching section 24 checks whether there exists a window whose presence confirmation data in the active state watching table is set at "0" and whether there exists a program that is not displayed on the display 9 as a window. If there exits a program that is not displayed as a window, the process goes to S1011. If there exists no such program, the process goes to S1012.

At S1011, the active state watching section 24 deletes the data relating to a program for which "0" is recorded in the presence confirmation flag space of the active state watching table. After completion of S1011, the process goes to S1012.

At S1012, the active state watching section 24 performs sleeping for a prescribed time. The prescribed time corresponds to the watching period time that is the updating period of active state watching data that is regularly acquired by the active state watching section 24. After completion of S1012, the process returns to S1001.

For example, three programs having program names A, B, and C are recorded in the active state watching table shown in FIG. 16. This active state watching table shows that the program monitoring windows of the program names A, B, and C have been active for 60 seconds, 20 seconds, and 20 seconds, respectively.

Assume that, as shown in FIG. 14, "10 ms" has been set in the reference monitoring period time table in an automatic period setting monitoring setting screen.

Through the above setting of the active state watching table and the reference monitoring period time table, the respective program names are set in the table of periods of respective program names shown in FIG. 15 and monitoring periods corresponding to the program monitoring windows of the respective program names are set in the period spaces. If the active times and the reference monitoring period time are set as shown in FIGS. 16 and 14, respectively, the monitoring periods for the program monitoring windows of the program names A, B, and C become 10 ms, 30 ms, and 30 ms, respectively.

Figure 20:
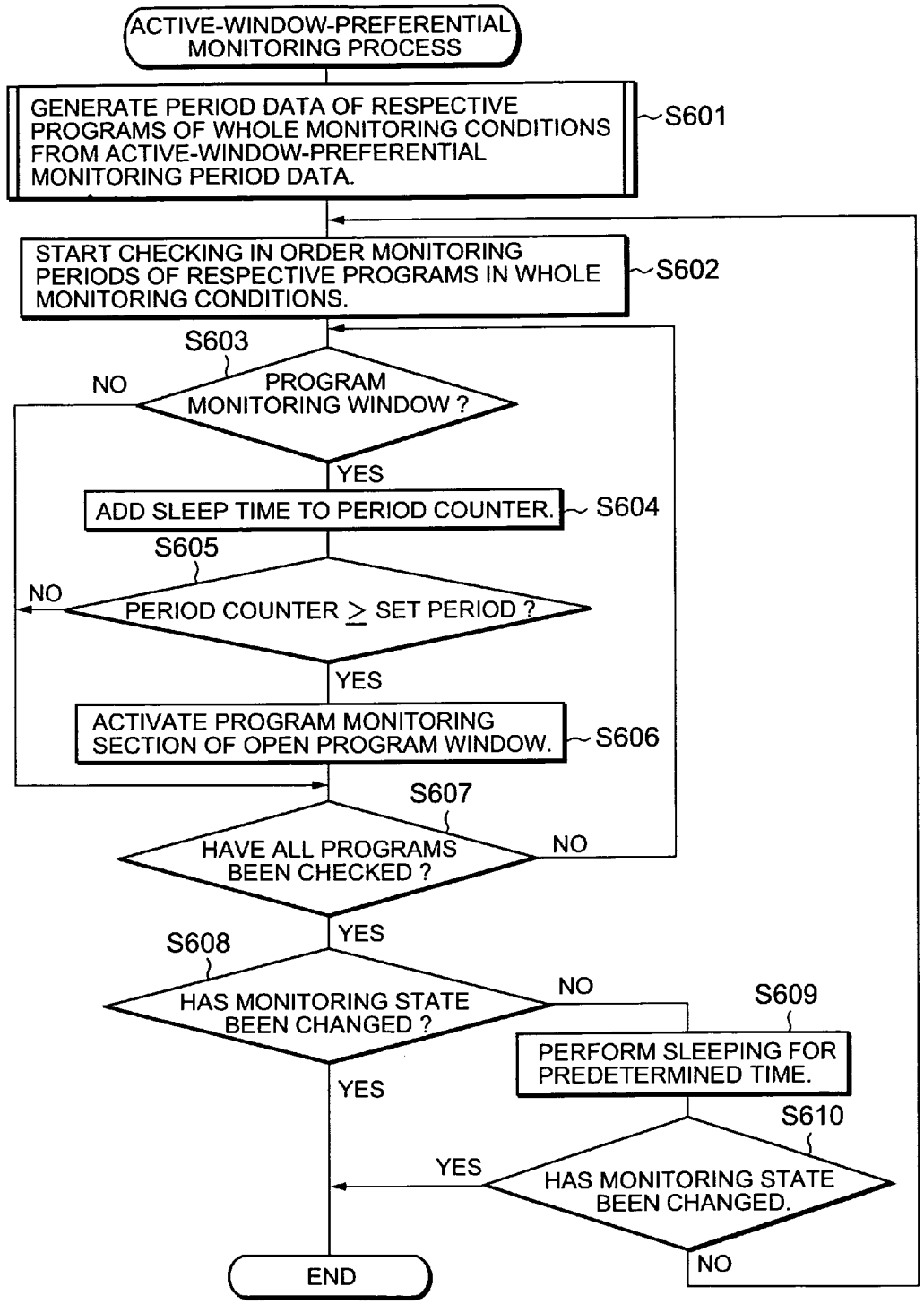
FIG. 20 is a flowchart showing an active-window-preferential monitoring process in the PC peripheral device according to the invention.

Next, referring to FIG. 20, a description will be made of the active-window-preferential monitoring process that is executed at S106 in FIG. 2 and in which the monitoring period is switched in accordance with whether the window is active. FIG. 20 is a flowchart of the active-window-preferential monitoring process.

The selection of a monitoring method is made in advance by an operator. The selection of a monitoring method by an operator is performed by using the whole monitoring setting menu as shown in FIG. 3. If the active-window-preferential monitoring process is selected as a monitoring method, a sub-window is popped up on the display 9. An active-window-preferential setting table that is displayed as a sub-window is provided with an active window monitoring period time space in which a monitoring time for an active window is to be set and an inactive window monitoring period time space in which a monitoring time for an inactive window is to be set.

Figure 21:
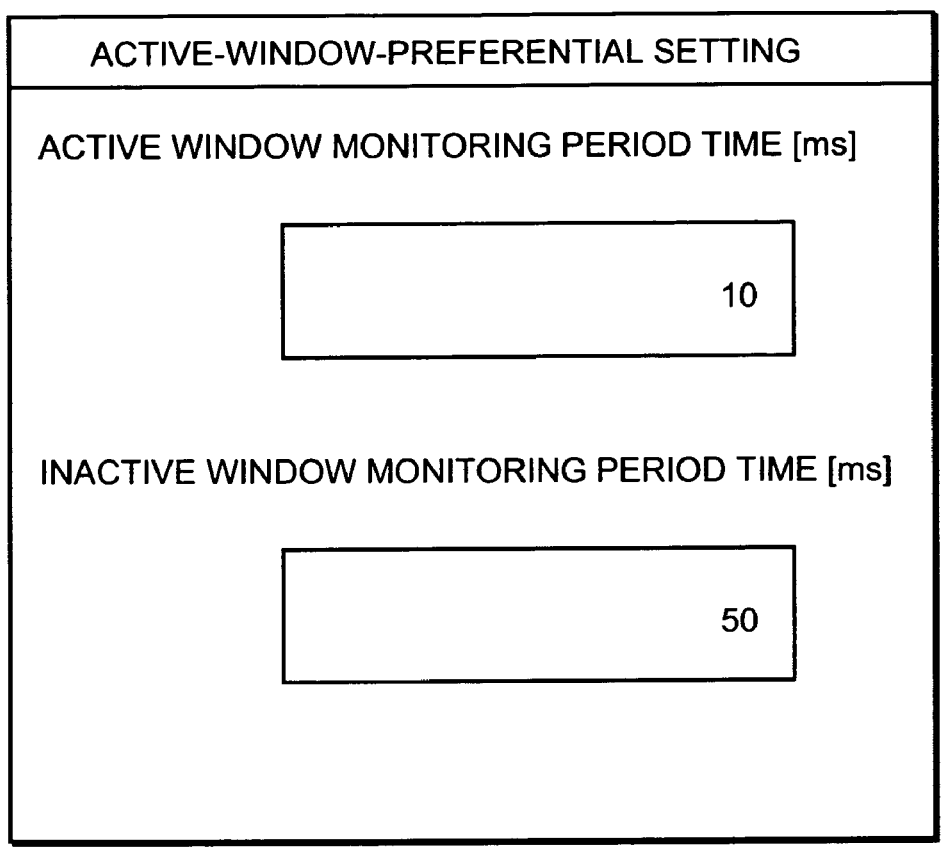
FIG. 21 is a conceptual diagram of an active-window-preferential setting table that is displayed on the display when an operator has selected the active-window-preferential monitoring process in the PC peripheral device according to the invention.

FIG. 21 shows the active-window-preferential setting table as a sub-window. FIG. 21 is a conceptual diagram of the active-window-preferential setting table. When arbitrary values are set in the active window monitoring period time space and the in active window monitoring period time space, the monitoring management section 25 executes monitoring processes of respective windows based on the values set in these spaces. The active-window-preferential setting table is provided in the whole monitoring conditions storage section 22.

A monitoring method that has been selected by an operator is recorded in the setting state table of the whole monitoring conditions storage section 22. For example, if the active-window-preferential monitoring process is selected by an operator, "04" or the like is recorded in the setting state region of the setting state table.

FIG. 22 shows an example of recording in the table of periods of respective program names, the setting state table, and the reference monitoring period time table that are held by the whole monitoring conditions storage section 22. FIG. 22 shows an example of recording in the table of periods of respective program names, the setting state table, and the active-window-preferential monitoring period table in the set period monitoring process. Instead of providing the table of periods of respective program names in the whole monitoring conditions storage section 22, the monitoring management section 25 may activate program monitoring sections 26 of respective programs by referring to the active-window-preferential monitoring period table.

At S601 of the active-window-preferential monitoring process, the monitoring management section 25 sets prescribed monitoring period data that is obtained from the active-window-preferential monitoring period table in the table of periods of respective programs of the whole monitoring conditions storage section 22 in accordance with whether each window is in an active state or an inactive state. After completion of S601, the process goes to S602.

At S602 and the following steps, the monitoring management section 25 performs monitoring based on the table of periods of respective programs of the whole monitoring conditions storage section 22 that was generated at S601. S602 and the following steps are the same as S401 and the following steps shown in FIG. 9 and hence descriptions therefor are omitted. In this connection, S602 corresponds to S401, S603 corresponds to S402, S604 corresponds to S403, S605 corresponds to S404, S606 corresponds to S405, S607 corresponds to S406, S608 corresponds to S407, S609 corresponds to S408, and S610 corresponds to S409.

As described above, the monitoring period of a monitoring process of a program corresponding to an active window is made short and the monitoring period of a monitoring process of a program corresponding to an inactive window is made long. Therefore, the communication frequency and the communication data amount of data communications that are performed between the PC and the peripheral device and between the peripheral device and the display can be reduced. This makes it possible to provide a peripheral device of a programmable controller in which the processing result of a monitoring process is updated at a high rate.

Figure 23:
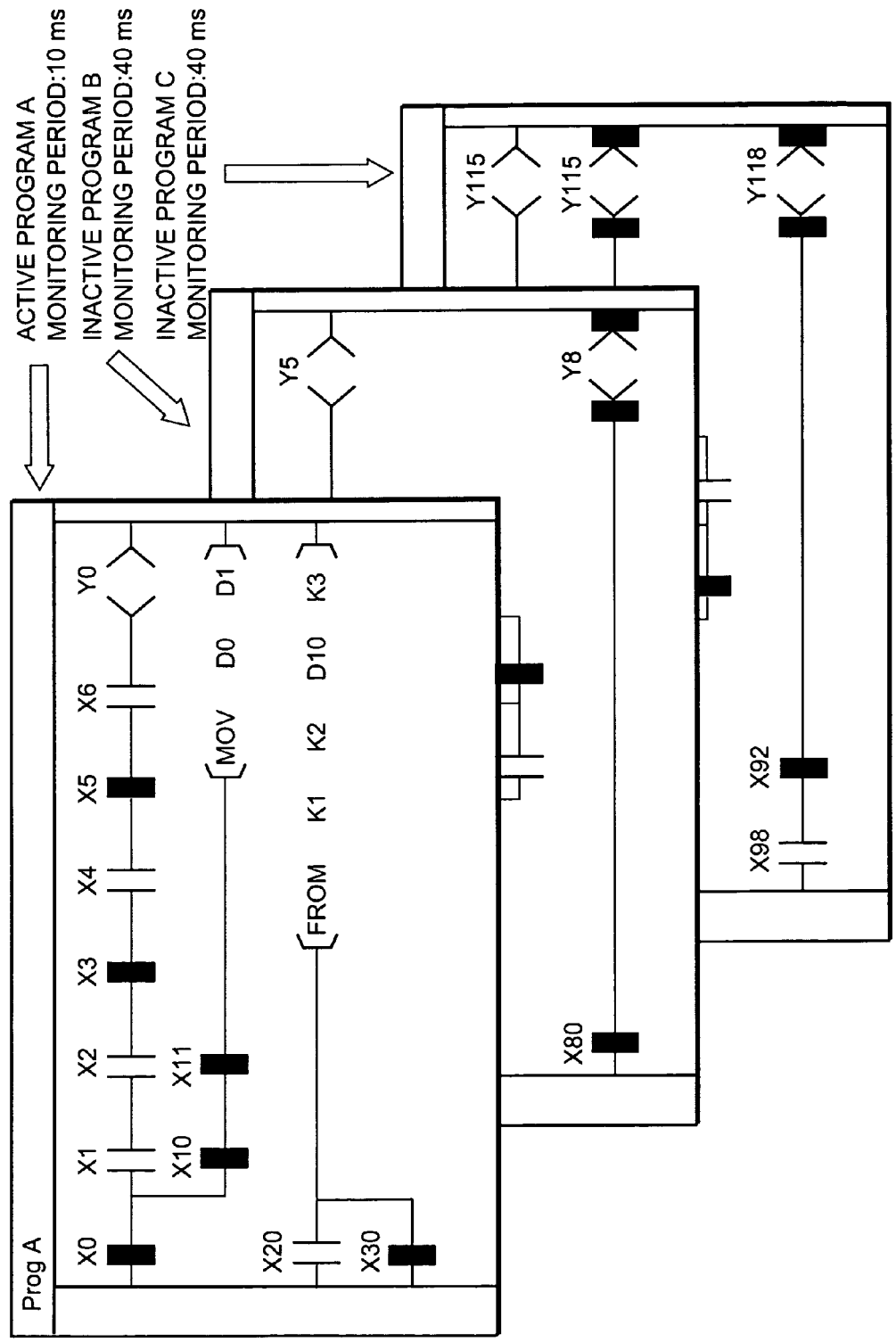
FIG. 23 is a conceptual diagram showing how windows on the display are subjected to monitoring processes at monitoring periods that are different depending on whether they are active or not in the PC peripheral device according to the invention.

For example, in a case where, as shown in FIG. 23, windows relating to programs A–C are open on the display 9 and only the window relating to program A is active, among the monitoring processes of the respective windows only the one relating to program A is monitoring-processed at the monitoring period that is set in the active monitoring time space of the active-window-preferential monitoring period table. On the other hand, the monitoring processes relating to programs B and C are executed at the monitoring period that is set in the inactive monitoring period time space of the active-window-preferential monitoring period table because the windows corresponding to programs B and C are inactive.

To execute a monitoring process on the windows that are in the state shown in FIG. 23, the setting state table, the table of periods of respective program names, and the active-window-preferential monitoring table of the whole monitoring conditions storage section 22 are set as shown in FIG. 22.

Figure 24:
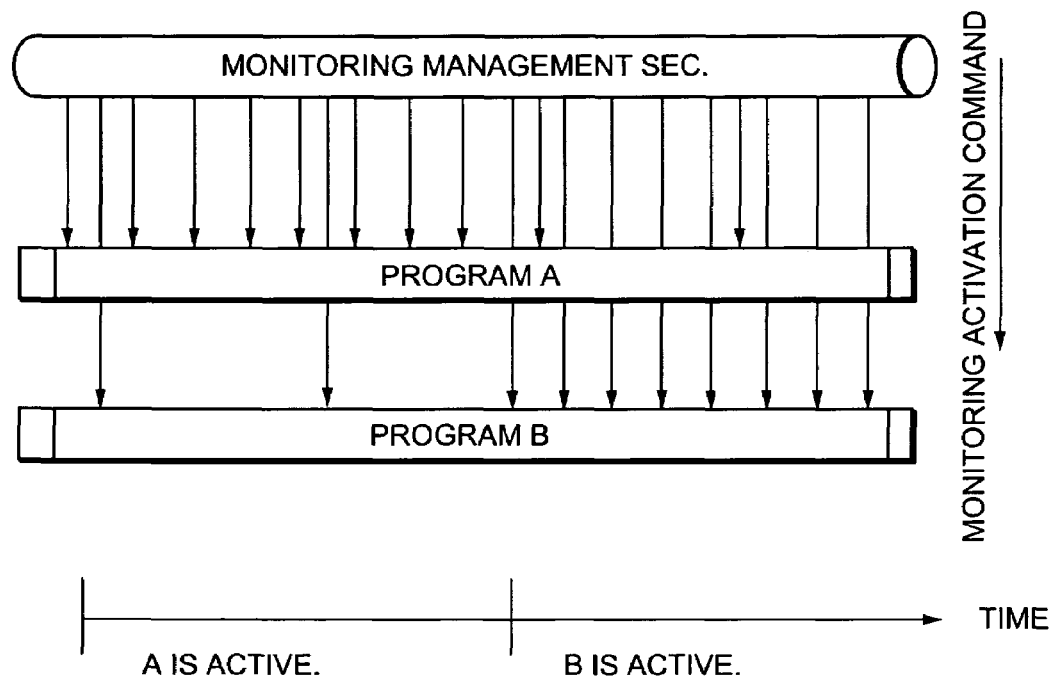
FIG. 24 is a conceptual chart showing how the program monitoring sections of respective programs are activated at prescribed monitoring periods that depend on whether the windows are active or not in the PC peripheral device according to the invention.

FIG. 24 shows an operation that program monitoring sections 26 are activated by the monitoring management section 25 at monitoring periods that are different for an active window and an inactive window. FIG. 24 is a conceptual chart showing how program monitoring sections 26 are activated by the monitoring management section 25. FIG. 24 shows how the programs receive monitoring activation commands from the monitoring management section 25 while the monitoring period is changed as the active state is switched between programs A and B.

Figure 25:
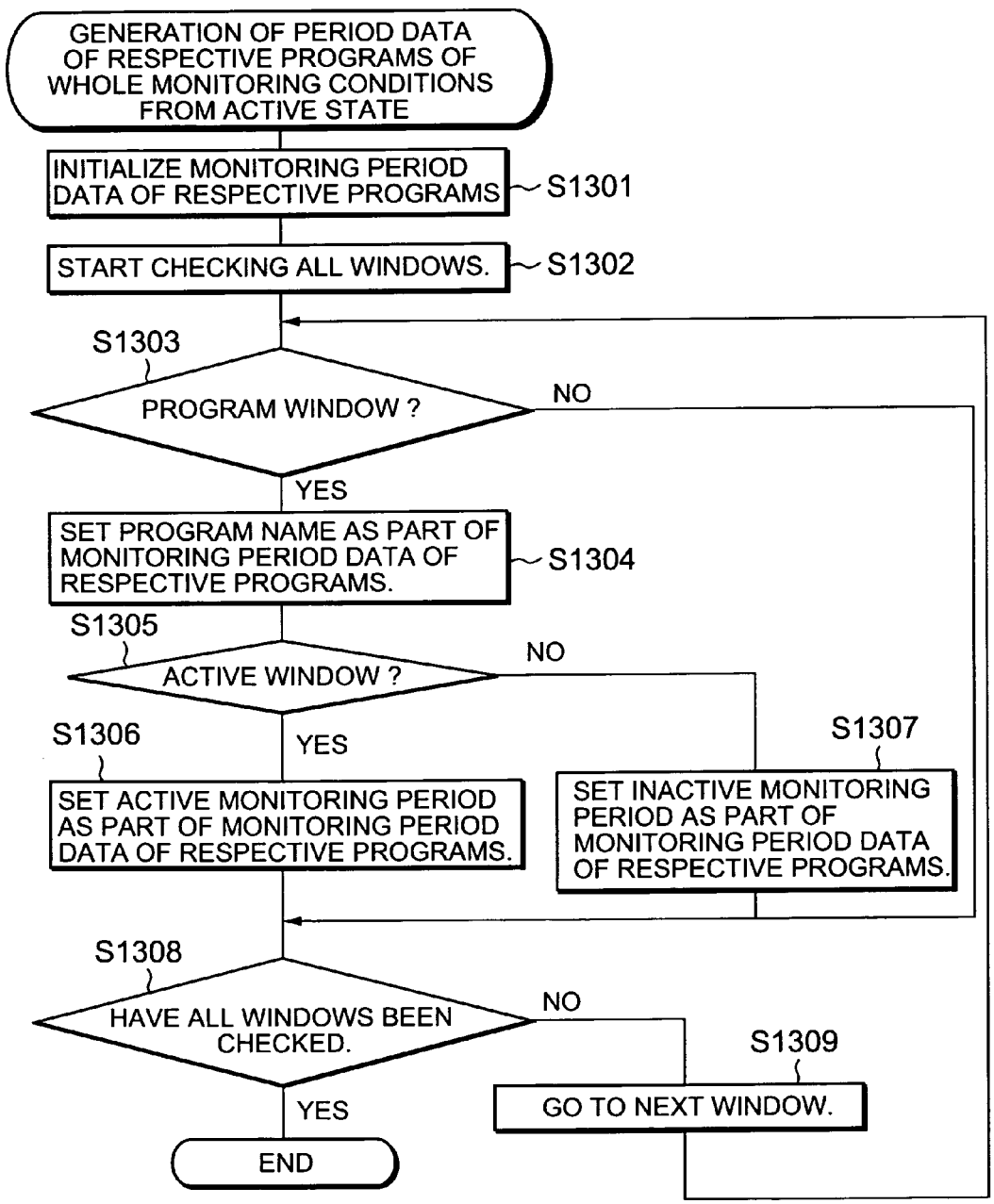
FIG. 25 is a flowchart showing a process of setting monitoring period data in the table of periods of respective programs of the whole monitoring conditions storage section that is part of the active-window-preferential monitoring process in the PC peripheral device according to the invention.

Next, referring to FIG. 25, a description will be made of a process that is executed at S601 in FIG. 20 and in which monitoring period data are set in the table of periods of respective programs of the whole monitoring conditions storage section 22. FIG. 25 is a flowchart showing the monitoring period data setting process.

At S1301, the monitoring management section 25 initializes the table of periods of respective program names that is held by the whole monitoring conditions storage section 22. After completion of S1301, the process goes to S1302.

At S1302, the monitoring management section 25 prepares for checking in order all windows based on window information that is acquired from the window management section 7. After completion of S1302, the process goes to S1303.

At S1303, the monitoring management section 25 checks whether a certain window being displayed on the display 9 is a program monitoring window. If the checked window is a program monitoring window, the process goes to S1304. If it is not a program monitoring window, the process goes to S1308.

At S1304, the monitoring management section 25 registers the program name concerned in the table of periods of respective programs of the whole monitoring conditions storage section 22. After completion of S1304, the process goes to S1305.

At S1305, the monitoring management section 25 judges whether the program monitoring window relating to the program of the program name concerned is active. If the program monitoring window relating to the program name concerned in active, the process goes to S1306. If it is not active, the process goes to S1307.

At S1306, the monitoring management section 25 sets the active monitoring time that is registered in the active window monitoring period table in a period space of the table of periods of respective programs as a monitoring period of the program concerned. The table of periods of respective programs and the active window monitoring period table are held by the whole monitoring conditions storage section 22. After completion of S1306, the process goes to S1308.

At S1307, the monitoring management section 25 sets the inactive monitoring time that is registered in the active window monitoring period table in a period space of the table of periods of respective programs as a monitoring period of the program concerned. After completion of S1307, the process goes to S1308.

At S1308, the monitoring management section 25 checks whether all windows have been checked. If all windows have been checked, the execution of the series of steps is finished. If not all windows have been checked, the process goes to S1309.

At S1309, the monitoring management section 25 prepares for the check as to whether a window that is different from so far checked windows is a program monitoring window. After completion of S1309, the process returns to S1303.

It is understood from the above description that the monitoring management section 25 activates the program monitoring sections 26 of respective programs at different monitoring periods in accordance with whether the windows are in an active state or an inactive state.

For example, assume that, as shown in FIG. 21, the active window monitoring period time has been set at 10 ms and the inactive window monitoring period time has been set at 50 ms in the active-window-preferential setting table. Also assume that, as shown in FIG. 23, among the program monitoring windows being displayed on the display 9 the program monitoring window that is based on program A is active. Further assume that the program monitoring windows that are based on programs B and C and are being displayed on the display in similar manners are inactive.

In this case, the table of periods of respective programs that is held by the whole monitoring conditions storage section 22 is set as shown in FIG. 22. That is, the monitoring period of the program monitoring window corresponding to the program name A is set at 10 ms, the monitoring period of the program monitoring window corresponding to the program name B is set at 50 ms, and the monitoring period of the program monitoring window corresponding to the program name C is also set at 50 ms. The monitoring processes of respective program monitoring windows are performed based on these settings.

Figure 26:
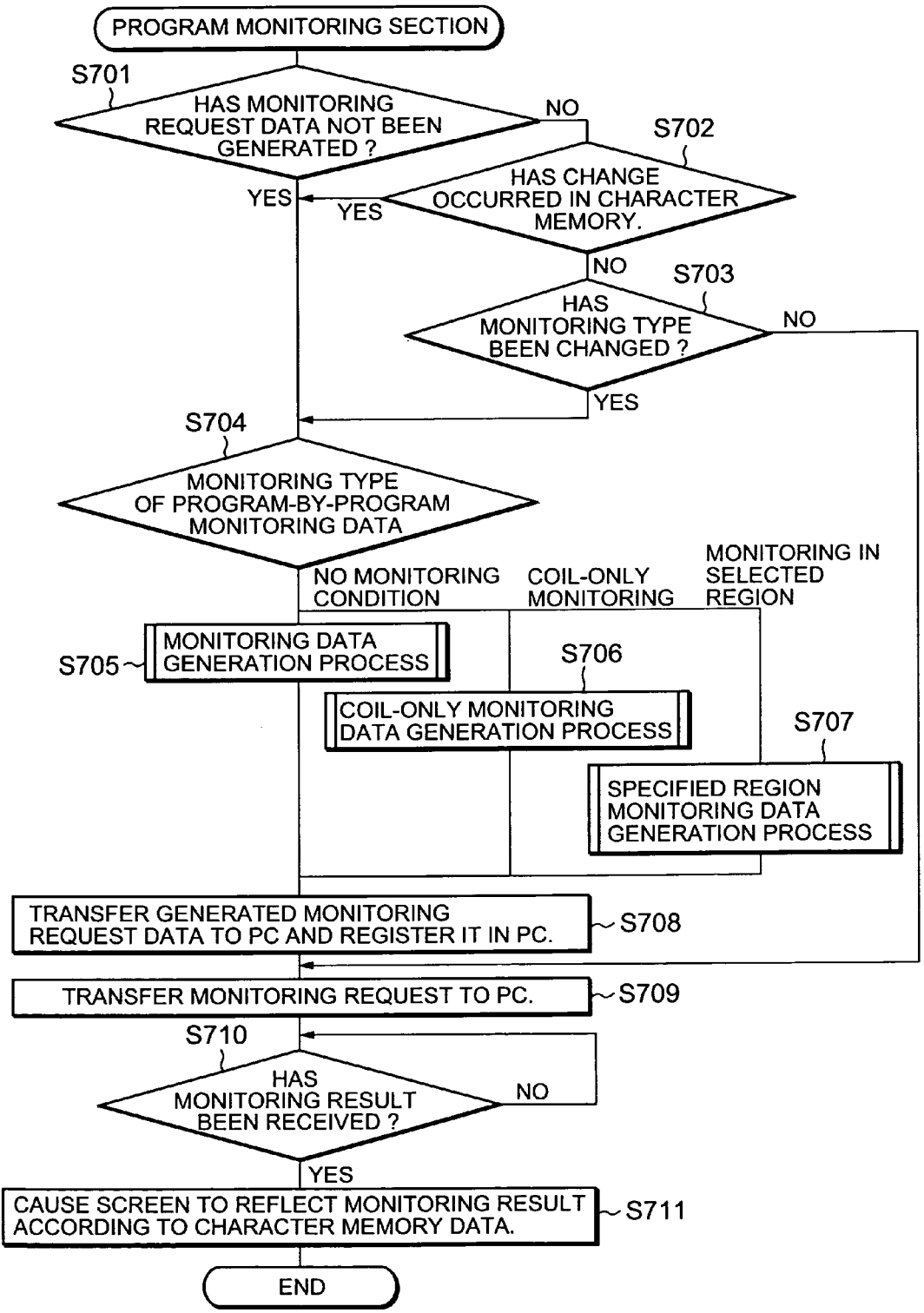
FIG. 26 is a flowchart showing a processing operation of each program monitoring section that operates based on activation by the monitoring management section in the PC peripheral device according to the invention.

Next, the operation of each program monitoring section 26 that is activated by the monitoring management section 25 will be described with reference to FIG. 26. FIG. 26 is a flowchart showing the operation of each program monitoring section 26. Program monitoring sections 26 are provided so as to correspond to respective program monitoring windows.

First, at S701, the program monitoring section 26 judges whether monitoring request data has not been generated yet. If monitoring request data has not been generated yet, the process goes to S704. If monitoring request data has already been generated, the process goes to S702. Monitoring request data is output from the program monitoring section 26 based on an instruction from the monitoring management section 25 to register items to be monitored in the PC 1.

At S702, the program monitoring section 26 judges whether character data has been changed. If the character data has been changed, the process goes to S704. If the character data has bot been changed, the process goes to S703. The character data is changed by an operator at an arbitrary time point, for example, at a time point of alteration of monitoring items or alteration of a program.

At S703, the program monitoring section 26 checks program-by-program monitoring data that is stored in the program-by-program monitoring conditions storage section 23 and judges whether the monitoring type that is recorded in the program-by-program monitoring data has been changed. If the monitoring type has been changed, the process goes to S704. If it has not been changed, the process goes to S709. The monitoring type is changed by an operator at an arbitrary time point, for example, a time point of setting of a monitoring type, changing of a set monitoring type, or end of monitoring. A monitoring type to be recorded as part of program-by-program monitoring data is selected by an operator from a program-by-program setting menu shown in FIG. 27. There are three monitoring types: "no monitoring condition," "coil-only monitoring," and "monitoring in selected region." FIG. 28 shows the structure of the program-by-program monitoring data. FIG. 28 is a structure diagram showing the structure of the program-by-program monitoring data.

At S704, the program monitoring section 26 judges the monitoring type that is recorded as part of the program-by-program monitoring data. If the monitoring type that is recorded as part of the program-by-program monitoring data is "no monitoring condition," the process goes to S705. If it is "coil-only monitoring," the process goes to S706. If it is "monitoring in specified region," the process goes to S707.

At S705, the program monitoring section 26 generates monitoring request data that is similar to the conventional monitoring request data. After completion of S705, the process goes to S708.

At S706, the program monitoring section 26 generates coil-only monitoring request data. The coil-only monitoring request data is output from the program monitoring section 26 to the PC 1 to execute a "coil-only monitoring" process. Based on the received coil-only monitoring request data, the PC 1 sets processing conditions of the monitoring process. After completion of S706, the process goes to S708.

At S707, the program monitoring section 26 generates specified region monitoring request data. The specified region monitoring request data is output from the program monitoring section 26 to the PC 1 to execute a "specified region monitoring" process. Based on the received specified region monitoring request data, the PC 1 sets processing conditions of the monitoring process. After completion of S707, the process goes to S708.

At S708, the program monitoring section 26 transfers the generated monitoring request data whose type is one of various monitoring request data types to the PC 1 and has it registered in the PC 1. After completion of S708, the process goes to S709.

At S709, the program monitoring section 26 transfers, at a prescribed output period, monitoring requests corresponding to the monitoring request data that has been registered in the PC 1 to the PC 1. The monitoring request is a request instruction for requesting execution of the monitoring process relating to the items that have been registered in the PC 1 based on the monitoring request data. That is, the setting of conditions of a monitoring process in the PC 1 is performed by using monitoring request data and an actual monitoring process is executed in the PC 1 upon input of a monitoring request to the PC 1. Therefore, once conditions are set by using monitoring request data, usually only monitoring requests are output for execution of a monitoring process. When it is necessary to alter conditions relating to a monitoring process, monitoring request data is output from the program monitoring section 26. After completion of S709, the process goes to S710.

At S710, the program monitoring section 26 waits for an event that monitoring result data that is a processing result corresponding to a monitoring request that was transferred from the program monitoring section 26 to the PC 1 at S709 is output from the PC 1 and input to the program monitoring section 26 concerned. Monitoring result data are input at a prescribed updating period based on the output period of monitoring requests. If monitoring result data is input to the program monitoring section 26, the process goes to S711. If it is not input, the program monitoring section 26 continues to wait for an input.

At S711, by referring to the received monitoring result data and the character data, the program monitoring section 26 causes, via the window display control section 15, the display 9 to reflect the monitoring result data. The display is caused to reflect monitoring result data based on the updating period at which the monitoring result data are input from the PC 1 to the program monitoring section 26. After completion of S711, the execution of the series of steps is also finished.

Figure 29:
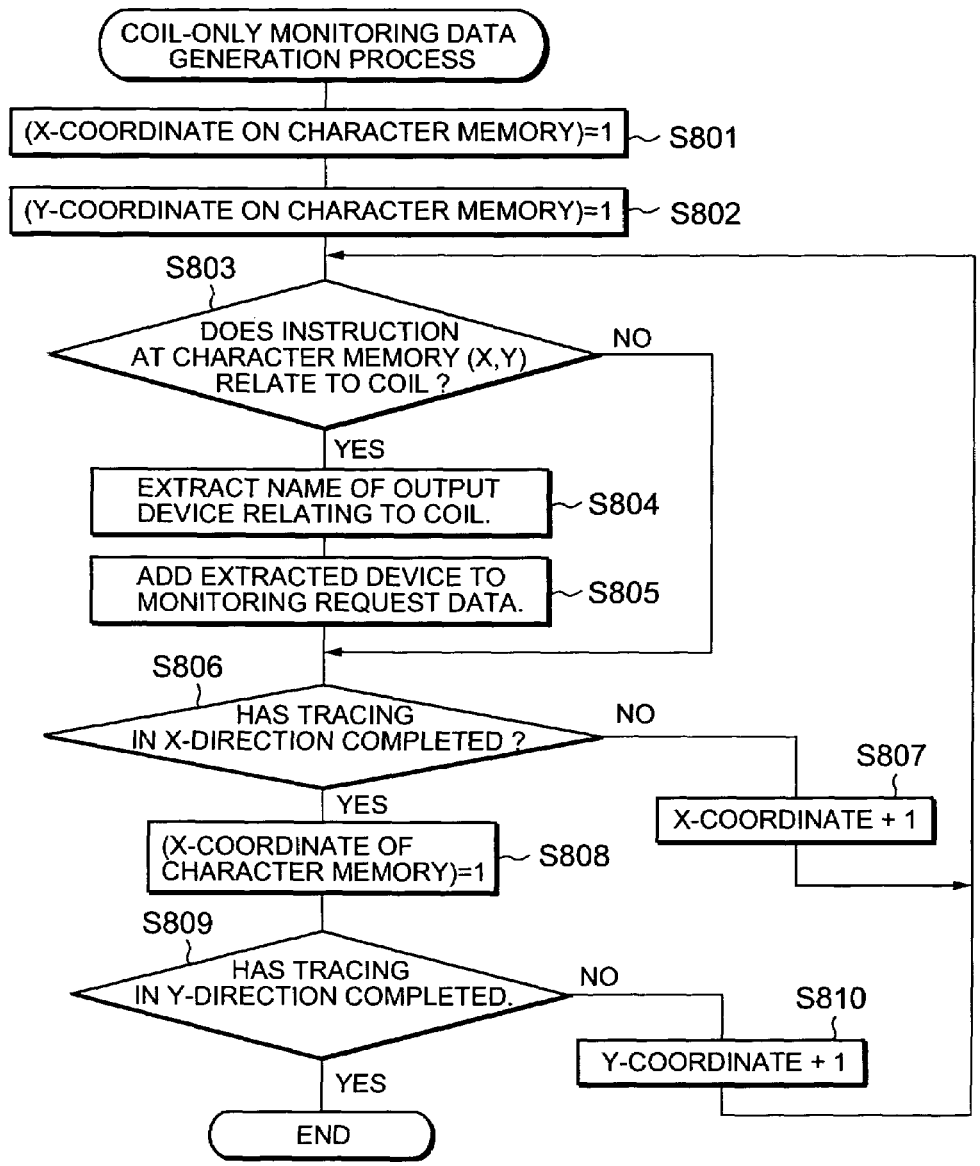
FIG. 29 is a flowchart showing a process of generating coil-only monitoring request data in each program monitoring section of the PC peripheral device according to the invention.

Next, the process of generating coil-only monitoring request data at S706 in FIG. 26 will be described with reference to FIG. 29. FIG. 29 is a flowchart showing the process of generating coil-only monitoring request data. The term "coil" means a portion where an output result is displayed.

Figure 30:
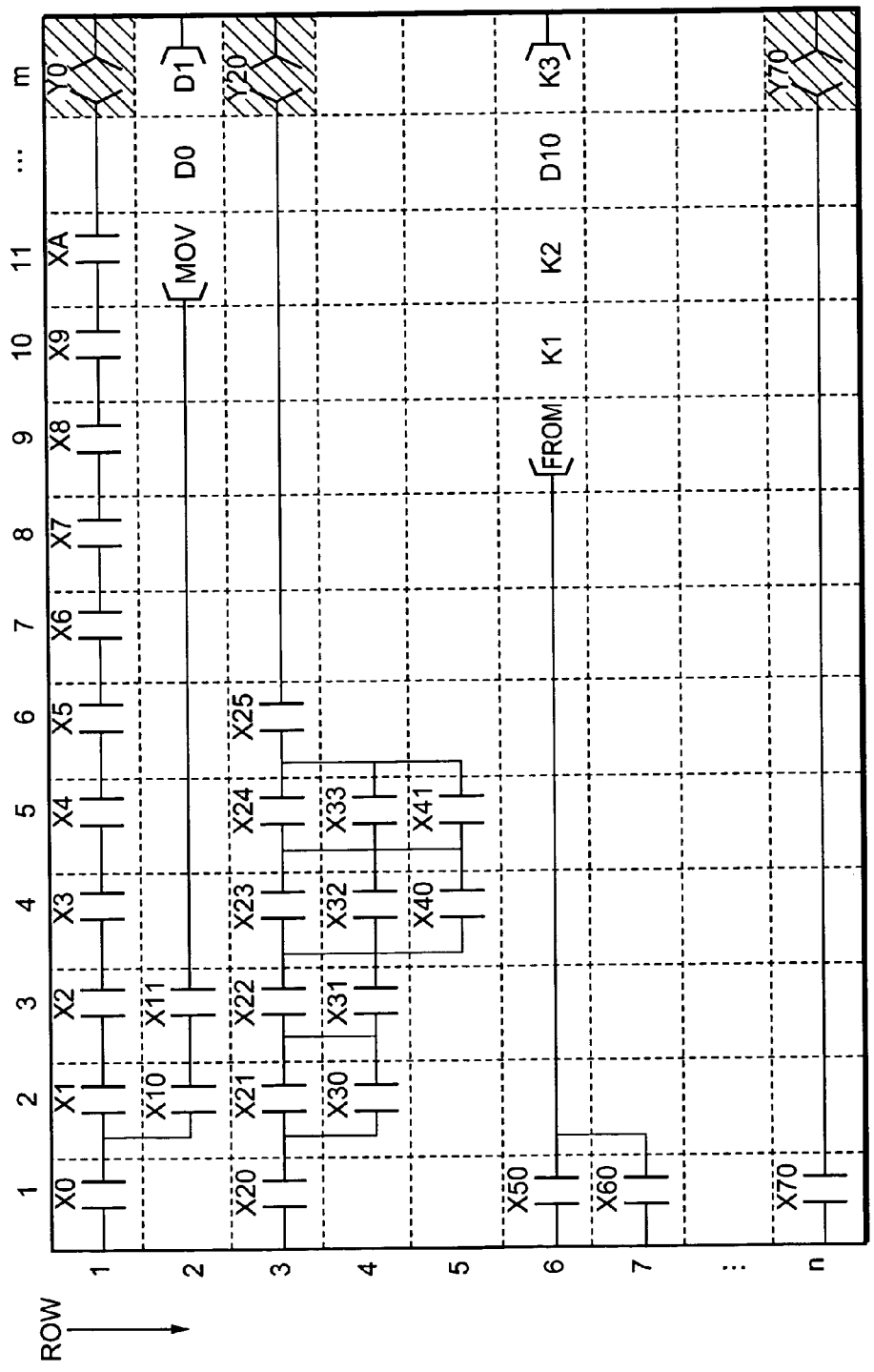
FIG. 30 shows a display example of a window in which only coils are monitored in the PC peripheral device according to the invention.

First, at S801, the program monitoring section 26 initializes, to "1," an X counter that indicates the X-coordinate position of window display that is based on character data. This initialization renders the program monitoring section 26 in a state that it can recognize the left-end position of window display that is based on, for example, character data shown in FIG. 30. FIG. 30 is a display example of window display that is based on character data. After completion of S801, the process goes to S802.

At S802, the program monitoring section 26 initializes, to "1," a Y counter that indicates the Y-coordinate position of window display that is based on the character data. This initialization renders the program monitoring section 26 in a state that it can recognize the top position of window display that is based on, for example, character data shown in FIG. 30. After completion of S802, the process goes to S803.

At S803, the program monitoring section 26 starts sequential tracing in the direction in which the X-coordinate increases in the window display that is based on the character data. The program monitoring section 26 checks whether an instruction relating to a certain coil as an output device is set as an instruction at an arbitrary position indicated by the X-counter and the Y-counter in the window display that is based on the character data. If an instruction relating to a coil is set as an instruction at the traced position, the process goes to S804. If no such instruction is set, the process goes to S806.

At S804, the program monitoring section 26 extracts the name or address of an output device relating to the coil that is set in the instruction that was recognized at S803. After completion of S804, the process goes to S805.

Figure 31:
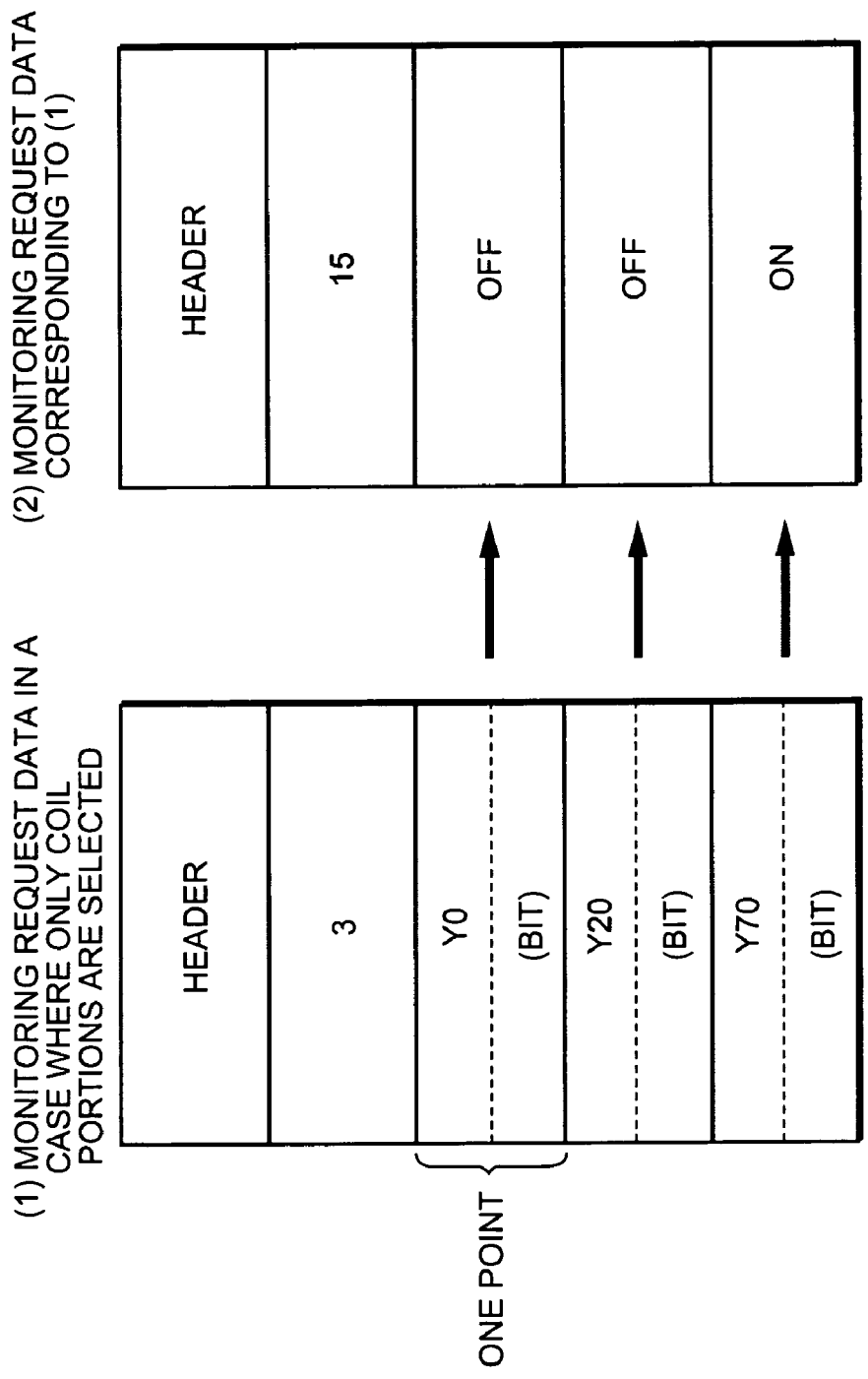
FIG. 31(1) is a structure diagram showing a specific data structure of coil-only monitoring request data that is output from each program monitoring section to the PC, and FIG. 31(2) is a structure diagram showing a specific data structure of coil-only monitoring result data that is output from the PC to each program monitoring section in the PC peripheral device according to the invention.

At S805, the program monitoring section 26 sets, as part of coil-only monitoring request data as shown in FIG. 31(1), the name or address of the output device that was extracted at S804. FIG. 31(1) is a structure diagram showing a specific data structure of coil-only monitoring request data that is output from the program monitoring section 26 to the PC 1. FIG. 31(2) shows a specific example of coil-only monitoring result data that is output from the PC 1 to the program monitoring section 26 in response to the coil-only monitoring request data shown in FIG. 31(1). FIG. 31(2) is a structure diagram showing a specific data structure of coil-only monitoring result data that is output from the PC 1 to the program monitoring section 26. After completion of S805, the process goes to S806.

At S806, the program monitoring section 26 judges whether the end position tracing of the X-coordinate tracing for the prescribed Y-coordinate has finished. If the end position tracing for the prescribed Y-coordinate has finished, the process goes to S808. If it has not finished yet, the process goes to S807.

At S807, the program monitoring section 26 adds 1 to the X counter. Then, the process returns to S803 and the next position of the window display that is based on the character data is traced.

At S808, the program monitoring section 26 initializes the X counter to "1." Then, the process goes to S809.

At S809, the program monitoring section 26 judges whether tracing of the Y-coordinate end position has finished. If the tracing of the Y-coordinate end position has finished, the execution of the series of steps is finished. If it has not finished yet, the process goes to S810.

At S810, the program monitoring section 26 adds "1" to the Y counter. Then, the process returns to S803 and the next position of the window display that is based on the character data is traced.

After completion of the execution of the above series of steps, the program monitoring section 26 outputs generated coil-only monitoring request data to the PC 1. Then, the program monitoring section 26 outputs, at the prescribed period, coil-only monitoring requests for execution of the coil-only monitoring process that is based on the conditions that were set in the PC 1 by using the coil-only monitoring request data. The program monitoring section 26 receives coil-only monitoring result data that are data relating to coil-only monitoring results that are based on the coil-only monitoring requests from the PC1. The coil-only monitoring result data are input at a prescribed updating period based on the output period of the coil-only monitoring requests. The program monitoring section 26 causes the program monitoring window concerned on the display 9 to reflect the received coil-only monitoring result data. The display is caused to reflect the coil-only monitoring result data based on the updating period at which the coil-only monitoring result data are input from the PC 1 to the program monitoring section 26.

Figure 32:
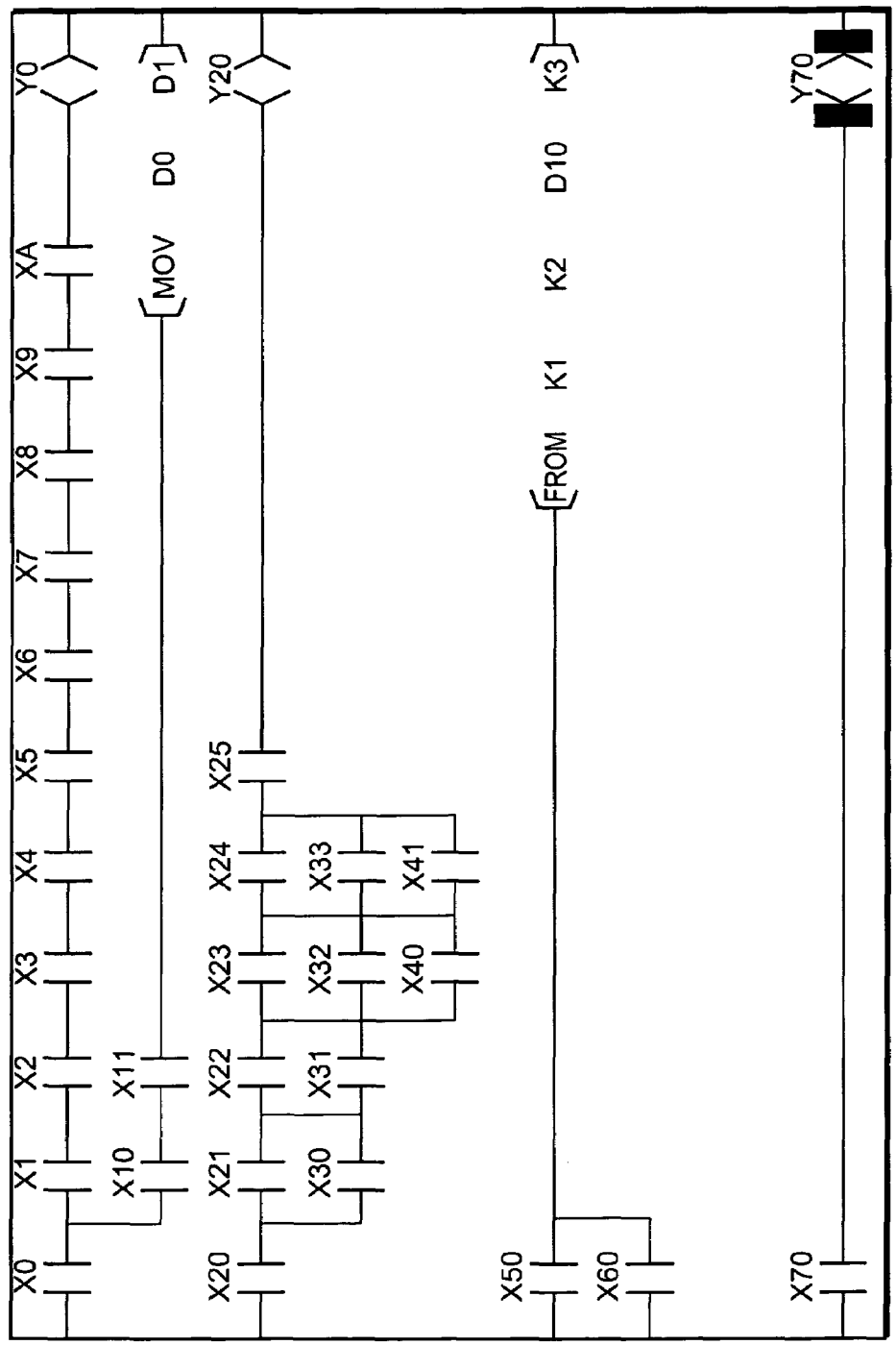
FIG. 32 shows another display example of a window in which only coils are monitored and that is displayed on the display of the PC peripheral device according to the invention.

FIG. 32 is a display example in which such coil-only monitoring result data are reflected by the program monitoring window concerned on the display 9. FIG. 32 is a display example of window display on the display 9 that is based on character data.

Since as described above only coil portions being displayed in a window are subjected to a monitoring process, the communication data amount of data communications that are performed between the PC and the peripheral device and between the peripheral device and the display can be reduced. This makes it possible to provide a peripheral device of a programmable controller in which the processing result of a monitoring process is updated at a high rate.

Figure 33:
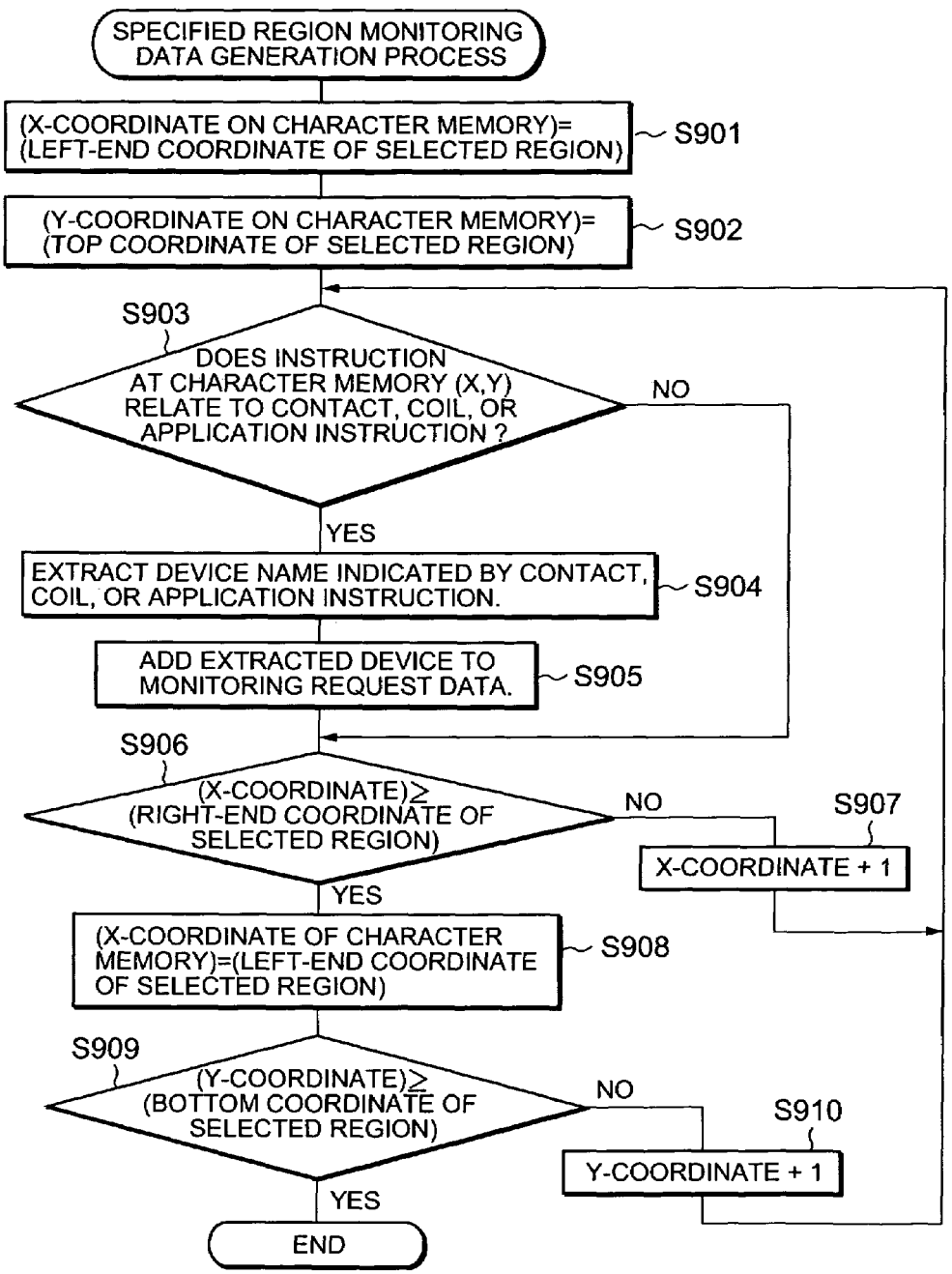
FIG. 33 is a flowchart showing a process of generating specified region monitoring request data in each program monitoring section of the PC peripheral device according to the invention.

Next, the process of generating specified region monitoring request data at S707 in FIG. 26 will be described with reference to FIG. 33. FIG. 33 is a flowchart showing the process of generating specified region monitoring request data.

Figure 27:
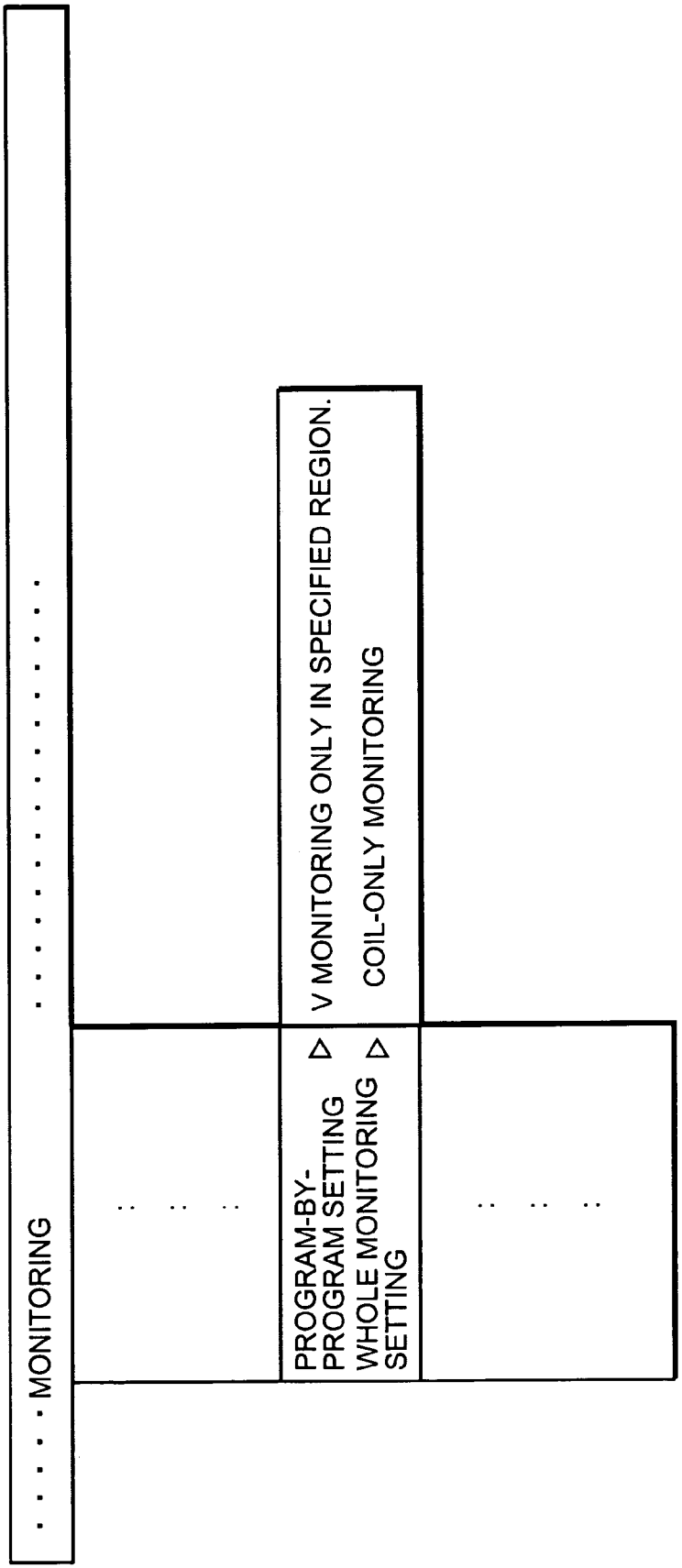
FIG. 27 is an image diagram showing an image of a program-by-program monitoring setting menu for setting of program-by-program monitoring conditions in the PC peripheral device according to the invention.
Figure 28:
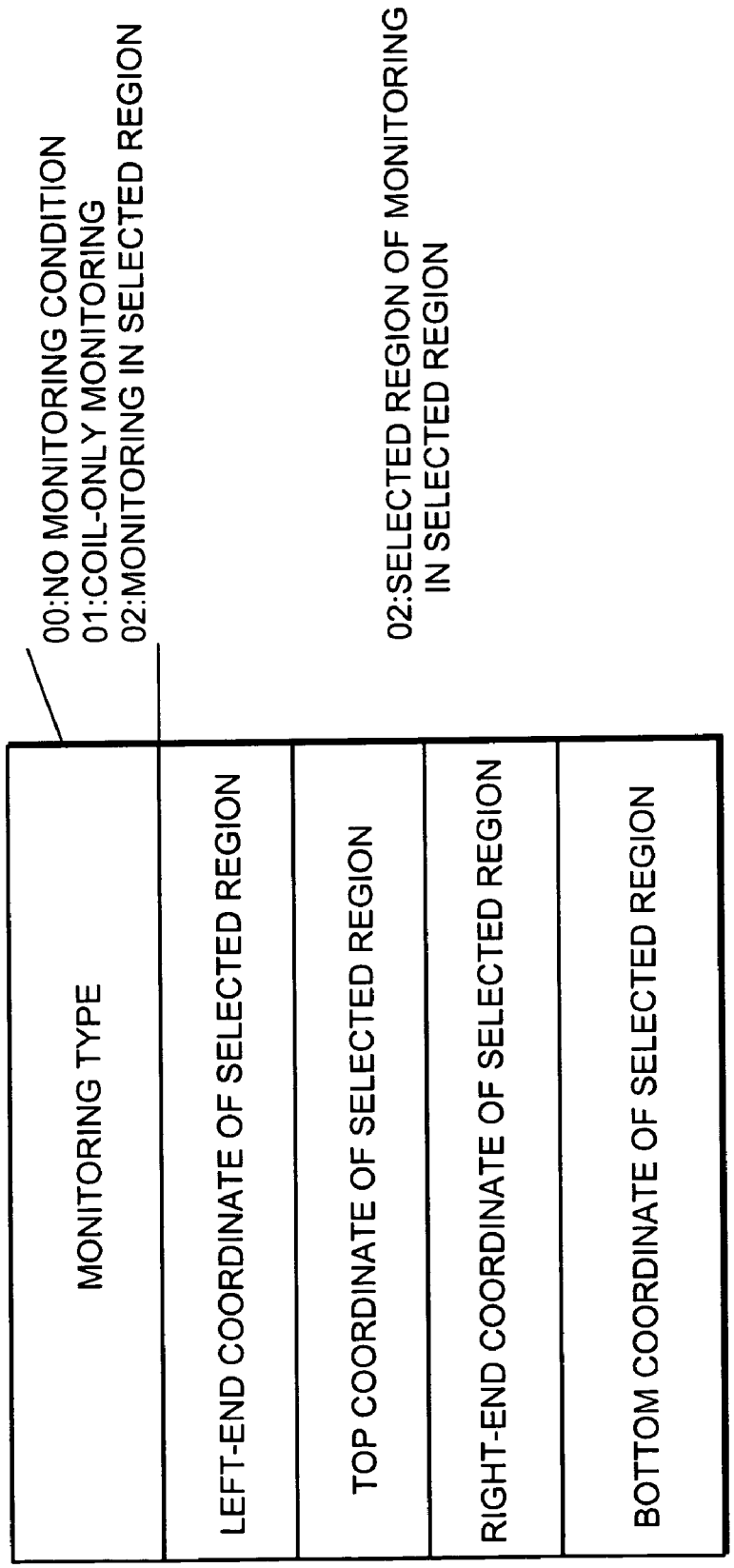
FIG. 28 is a structure diagram showing the structure of program-by-program monitoring data in the PC peripheral device according to the invention.

In generating specified region monitoring request data, an operator selects a prescribed item in the program-by-program setting menu shown in FIG. 27. The prescribed items are an item meaning that a result of a monitoring process only in a selected region is to be displayed. After selecting such an item, the operator specifies a portion as a selected region by using an input means such as a mouse 10.

Specified region monitoring request data is generated based on data relating to the above-mentioned prescribed item and selected region. Specifically, the type of monitoring process that has been selected by the operator and a left-end coordinate, a top coordinate, a right-end coordinate, and a bottom coordinate of the selected region that have also been specified by the operator are recorded in the specified region monitoring request data. The generated specified region monitoring request data is stored in the program-by-program monitoring conditions storage section 23.

Figure 34:
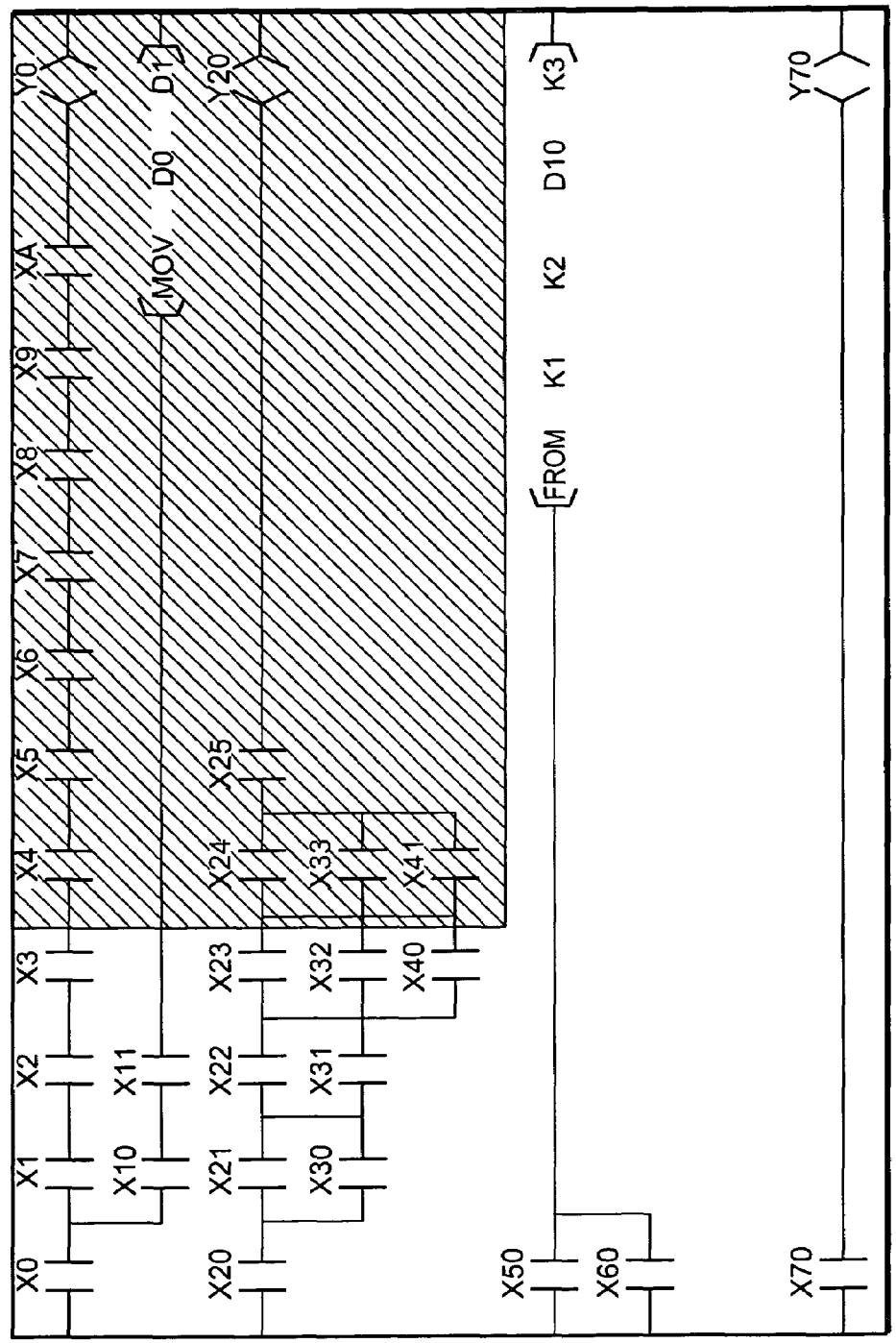
FIG. 34 shows a display example of a window in which only an arbitrary selected region is monitored in the PC peripheral device according to the invention.

For example, FIG. 34 shows a state that a certain selected region is specified in a program monitoring window. FIG. 34 is a display example in which a portion as a display region in a program monitoring window is indicated.

At S901, the program monitoring section 26 sets the X counter that indicates the X-coordinate position in window display that is based on character data to the left-end coordinate of a selected region that is recorded as part of program-by-program monitoring data.

This setting renders the program monitoring section 26 in a state that it can recognize the left-end position of the color-changed portion of the window shown in FIG. 34 that is based on the character data.

The program-by-program monitoring data that is used at S901 is one that is based on the display example of the display region shown in FIG. 34 and is stored in the program-by-program monitoring conditions storage section 23.

The program monitoring section 26 executes S901 by referring to the program-by-program monitoring conditions storage section 23. After completion of S901, the process goes to S902.

At S902, the program monitoring section 26 sets the Y counter that indicates the Y-coordinate position in the window display that is based on the character data to the top coordinate of the selected region that is recorded as part of the program-by-program monitoring data.

This setting renders the program monitoring section 26 in a state that it can recognize the top position of the color-changed portion of the window shown in FIG. 34 that is based on the character data.

The program-by-program monitoring data is stored in the program-by-program monitoring conditions storage section 23. The program monitoring section 26 executes S902 by referring to the program-by-program monitoring conditions storage section 23. After completion of S902, the process goes to S903.

At S903, the program monitoring section 26 starts tracing in the direction in which the X-coordinate position in the window display that is based on the character data is sequentially increased by 1 each time. The program monitoring section 26 reads an instruction at an arbitrary position indicated by the X counter and the Y counter in the window display that is based on the character data, and checks whether the read-out instruction relates to a contact, a coil, or an application instruction for manipulating data. If the read-out instruction relates to a contact, a coil, or an application instruction, the process goes to S904. If it is not any of those, the process goes to S906.

At S904, the program monitoring section 26 extracts, from the data structure concerned, the name or address of an input/output device such as a contact, a coil, or an application instruction indicated by the instruction that was recognized at S903. After completion of S904, the process goes to S905.

Figure 35:
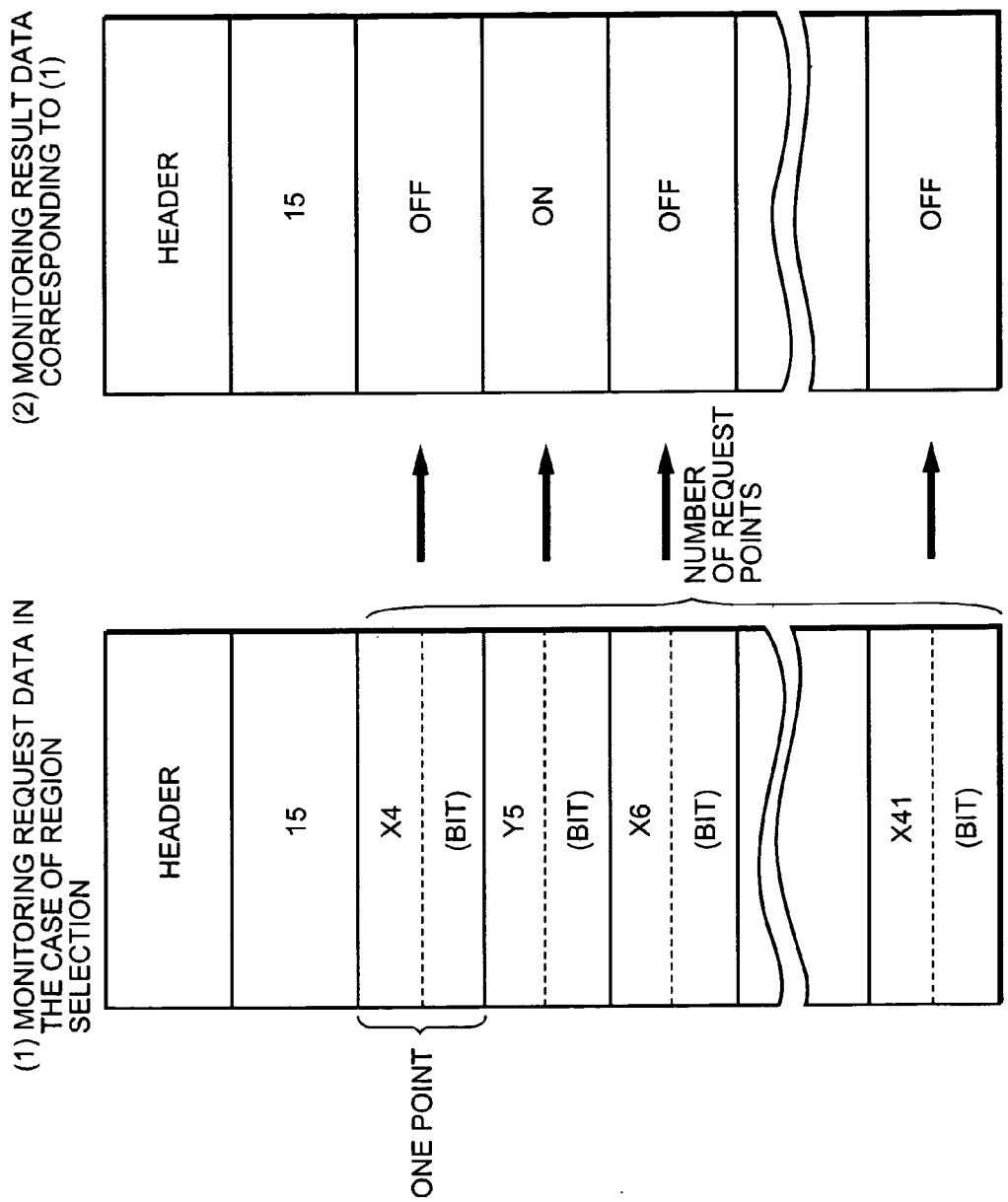
FIG. 35(1) is a structure diagram showing a specific data structure of selected-region-only monitoring request data that is output from each program monitoring section to the PC, and FIG. 35(2) is a structure diagram showing a specific data structure of selected-region-only monitoring result data that is output from the PC to each program monitoring section in the PC peripheral device according to the invention.

At S905, the program monitoring section 26 sets the name or address of the input/output device that was extracted at S904 as part of specified region monitoring request data as shown in FIG. 35(1). FIG. 35(1) is a structure diagram showing a specific data structure of specified region monitoring request data that is output from the program monitoring section 26 to the PC 1.

FIG. 35(2) shows a specific example of specified region monitoring result data that is output from the PC 1 to the program monitoring section 26 in response to the specified region monitoring request data shown in FIG. 35(1). FIG. 35(2) is a structure diagram showing a specific data structure of specified region monitoring result data that is output from the PC 1 to the program monitoring section 26. After completion of S905, the process goes to S906.

At S906, the program monitoring section 26 judges whether the end position tracing of the X-coordinate tracing for the prescribed Y-coordinate has finished. In this case, the end position means the right-end coordinate of the selected region that is indicated in the program-by-program monitoring data. If the end position tracing for the prescribed Y-coordinate has finished, the process goes to S908. If it has not finished yet, the process goes to S907.

At S907, the program monitoring section 26 adds 1 to the X counter. Then, the process returns to S903 and the next position of the window display that is based on the character data is traced.

At S908, the program monitoring section 26 initializes the X counter to "1." Then, the process goes to S909.

At S909, the program monitoring section 26 judges whether tracing of the end Y-coordinate has finished. In this case, the end Y-coordinate means the bottom coordinate of the selected region that is indicated in the program-by-program monitoring data. If the tracing of the end Y-coordinate has finished, the execution of the series of steps is finished. If it has not finished yet, the process goes to S910.

At S910, the program monitoring section 26 adds "1" to the Y counter. Then, the process returns to S903 and the next position of the window display that is based on the character data is traced.

After completion of the execution of the above series of steps, the program monitoring section 26 outputs generated specified region monitoring request data to the PC 1. Then, the program monitoring section 26 outputs, at the prescribed output period, specified region monitoring requests for execution of the specified region monitoring process that is based on the conditions that were set in the PC 1 by using the specified region monitoring request data. The program monitoring section 26 receives specified region monitoring result data that are data relating to specified region monitoring results that are based on the specified region monitoring requests from the PC 1. The specified region monitoring result data are input at a prescribed updating period based on the output period of the specified region monitoring requests.

The program monitoring section 26 causes the program monitoring window concerned on the display 9 to reflect the received specified region monitoring result data. The display is caused to reflect the specified region monitoring result data based on the updating period at which the specified region monitoring result data are input from the PC 1 to the program monitoring section 26.

Figure 36:
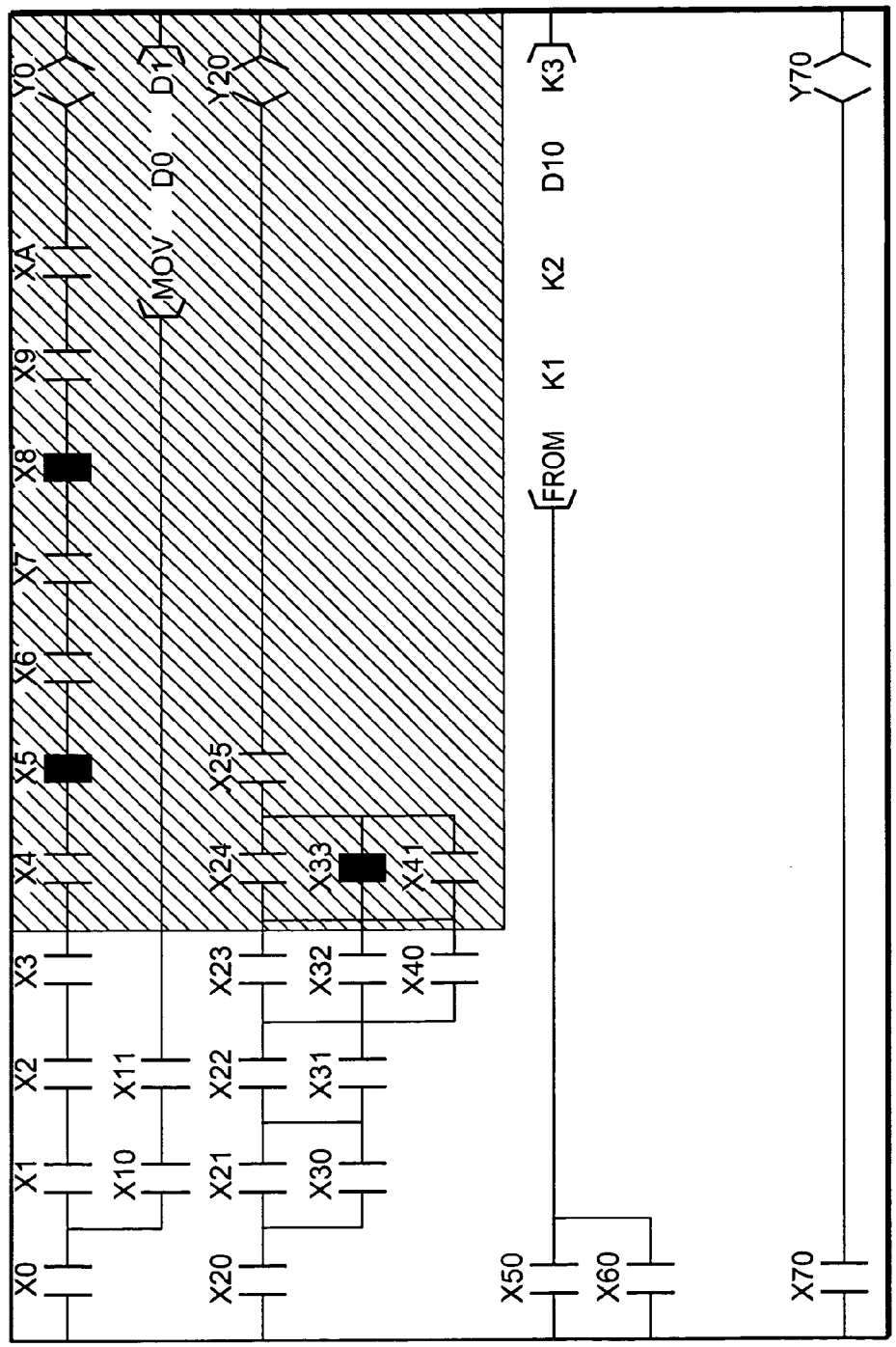
FIG. 36 shows another display example of a window in which only an arbitrary selected region is monitored and that is displayed on the display of the PC peripheral device according to the invention.

FIG. 36 is a display example in which such specified region monitoring result data is reflected by the program monitoring window concerned on the display 9. FIG. 36 is another display example of window display on the display 9 that is based on character data.

Since as described above only a specified region of a window that is specified with the mouse or the keyboard is subjected to a monitoring process, the communication data amount of data communications that are performed between the PC and the peripheral device and between the peripheral device and the display can be reduced. This makes it possible to provide a peripheral device of a programmable controller in which the processing result of a monitoring process is updated at a high rate.

As described above, a peripheral device of a programmable controller according to the invention comprises display means on which a plurality of windows are displayed; and managing means for outputting, to programmable controllers corresponding to the windows, processing requests that request execution of monitoring processes in the programmable controllers, and for outputting, when receiving a processing result of the monitoring processes in the programmable controllers that are based on the processing requests, the received processing result to the windows, wherein the processing requests are output at output periods that are different for the respective programmable controllers corresponding to the respective windows. Therefore, there is obtained a peripheral device of a programmable controller having a fast processing speed which can reduce the total amount of communications of processing requests and processing results that are performed between the programmable controller and the managing means, and which prevents a delay from request of a monitoring process to display, in a window, of a processing result corresponding to the request that would otherwise be caused by a large total amount of such communications.

Another peripheral device of a programmable controller according to the invention comprises display means on which a window is displayed; input means for specifying an arbitrary portion of the window; and managing means for outputting, to a programmable controller corresponding to the window, a processing request that requests the programmable controller to execute a monitoring process relating to only the specified portion of the window, and for outputting, when receiving a processing result of the monitoring process in the program controller that is based on the processing request and relates to only the specified portion of the window, the received processing result to the window. This peripheral device reduces the number of monitoring-requested locations per unit processing request as well as the processing result communication data amount per unit processing result. Therefore, there is obtained a peripheral device of a programmable controller having a fast processing speed which can reduce the total amount of communications of processing requests and processing results that are performed between the programmable controller and the managing means, and which prevents a delay from request of a monitoring process to display, in a window, of a processing result corresponding to the request that would otherwise be caused by a large total amount of such communications.

The peripheral device of a programmable controller according to the invention is such that the processing results of the monitoring processes in the programmable controllers that are output to the windows are updated at updating periods that are different for the respective programmable controllers based on the output periods of the processing requests that were output from the managing means to the programmable controllers. Therefore, there is obtained a peripheral device of a programmable controller having a fast processing speed which can reduce the total amount of communications of processing results that are performed between the display means and the managing means, and which prevents a delay from request of a monitoring process to display, in a window, of a processing result corresponding to the request that would otherwise be caused by a large total amount of such communications.

A monitoring method of a peripheral device of a programmable controller according to the invention comprises a first step of outputting processing requests that request execution of monitoring processes in programmable controllers corresponding to respective windows being displayed on display means to the programmable controllers at output periods that are different for the respective programmable controllers; a second step of receiving, based on the output periods, processing results of the monitoring processes in the programmable controllers that are based on the processing requests; and a third step of outputting the received processing results to the windows. Therefore, there is obtained a monitoring method of a peripheral device of a programmable controller having a fast processing speed which can reduce the total amount of communications of processing requests and processing results that are performed between the programmable controller and the managing means, and which prevents a delay from request of a monitoring process to display, in a window, of a processing result corresponding to the request that would otherwise be caused by a large total amount of such communications.

The monitoring method of a peripheral device of a programmable controller according to the invention comprises a fourth step of specifying, with input means, an arbitrary portion of a window, wherein the first step outputs a processing request that requests a programmable controller corresponding to the window having the specified portion to execute a monitoring process relating to the specified portion. This monitoring method reduces the number of monitoring-requested locations per unit processing request as well as the processing result communication data amount per unit processing result. Therefore, there is obtained a monitoring method of a peripheral device of a programmable controller having a fast processing speed which can reduce the total amount of communications of processing requests and processing results that are performed between the programmable controller and the managing means, and which prevents a delay from request of a monitoring process to display, in a window, of a processing result corresponding to the request that would otherwise be caused by a large total amount of such communications.

INDUSTRIAL APPLICABILITY

As described above, the present invention relates to a peripheral device of a programmable controller. In particular, the invention relates to a peripheral device of a program controller in which the updating rate of a monitoring result that is displayed on its display is high, as well as to a monitoring method of the peripheral device.

The invention claimed is:

1. A peripheral device of a programmable controller, comprising:
    display means on which a plurality of windows are displayed;
    managing means for outputting, to programmable controllers corresponding to the windows, processing requests that request execution of monitoring processes in the programmable controllers, and for outputting, when receiving a processing result of the monitoring processes in the program controllers that are based on the processing requests, the processing result received to the windows, wherein the processing requests are output at output periods that are different for the respective programmable controllers corresponding to the respective windows;
    input means for selecting an arbitrary window from the plurality of windows; and
    a timer for measuring, for each of the plurality of windows, a time during which the arbitrary window is selected by the input means, wherein the managing means outputs the processing requests to the respective programmable controllers corresponding to the respective windows at output periods that are based on the times that have been measured by the timer.

2. The peripheral device of a programmable controller according to claim 1, wherein the output period of the processing request that is output to the programmable controller corresponding to the arbitrary window is obtained by selecting a maximum value from the times during which the respective windows have been selected by the input means and that have been measured by the timer, dividing the selected maximum value by the time of the arbitrary window, and multiplying a resulting quotient by a reference period that is input through the input means.

3. The peripheral device of a programmable controller according to claim 1, wherein the processing results of the monitoring processes in the programmable controllers that are output to the windows are updated at updating periods that are different for the respective programmable controllers based on the output periods of the processing requests that were output from the managing means to the programmable controllers.

4. A method of monitoring a peripheral device of a programmable controller, comprising:
    outputting processing requests that request execution of monitoring processes in programmable controllers corresponding to respective windows being displayed on display means to the programmable controllers at output periods that are different for the respective programmable controllers;
    receiving, based on the output periods, processing results of the monitoring processes in the programmable controllers that are based on the processing requests;
    outputting the processing results received to the windows;
    selecting, with input means, an arbitrary window from the plurality of windows; and
    measuring and accumulating, with a timer, for each of the plurality of windows, a time during which the arbitrary window is selected with the input means, wherein the processing requests are output at output periods that are based on the times that have been measured with the timer.

5. The peripheral device of a programmable controller according to claim 2, wherein the processing results of the monitoring processes in the programmable controllers that are output to the windows are updated at updating periods that are different for the respective programmable controllers based on the output periods of the processing requests that were output from the managing means to the programmable controllers.

* * * * *